(12) United States Patent
Morales et al.

(10) Patent No.: US 12,734,413 B2
(45) Date of Patent: Sep. 15, 2026

(54) GOLF CLUB FACE PLATES WITH INTERNAL CELL LATTICES AND RELATED METHODS

(71) Applicant: KARSTEN MANUFACTURING CORPORATION, Phoenix, AZ (US)

(72) Inventors: Eric J. Morales, Laveen, AZ (US); Erik M. Henrikson, Phoenix, AZ (US); Joshua B. Matthews, Chino Hills, CA (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 149 days.

(21) Appl. No.: 18/603,034

(22) Filed: Mar. 12, 2024

(65) Prior Publication Data

US 2024/0216765 A1 Jul. 4, 2024

Related U.S. Application Data

(60) Continuation of application No. 17/103,760, filed on Nov. 24, 2020, now Pat. No. 11,925,839, which is a (Continued)

(51) Int. Cl.
*A63B 53/04* (2015.01)
*B23K 20/02* (2006.01)
(Continued)

(52) U.S. Cl.
CPC .......... *A63B 53/04* (2013.01); *A63B 53/0466* (2013.01); *B23K 20/021* (2013.01); *B23K 20/023* (2013.01); *B23K 20/233* (2013.01); *B32B 3/12* (2013.01); *A63B 53/0408* (2020.08); *A63B 53/042* (2020.08); *A63B 53/0425* (2020.08); *A63B 53/0429* (2020.08); *A63B 53/0454* (2020.08); *A63B 53/0458* (2020.08); *A63B 53/0462* (2020.08); *A63B 53/047* (2013.01); *A63B 53/0487* (2013.01); *A63B 2053/0491* (2013.01); *A63B 2209/00* (2013.01); *B23K 2103/14* (2018.08); *Y10T 29/49826* (2015.01)

(58) Field of Classification Search
CPC ... A63B 53/04; A63B 53/0454; A63B 53/047; A63B 53/0487; A63B 2053/0491; A63B 60/02; A63B 2209/00
USPC .......................................................... 473/345
See application file for complete search history.

(56) References Cited

U.S. PATENT DOCUMENTS 1,854,548 A 4/1932 Hunt
4,630,826 A 12/1986 Nishigaki
(Continued)

FOREIGN PATENT DOCUMENTS

CN 110665198 1/2010
JP S59-122160 8/1984

OTHER PUBLICATIONS

International Search Report and Written Opinion for PCT Application No. PCT/US2012/038689, 11 pages, Nov. 23, 2012.
(Continued)

*Primary Examiner* — John E Simms, Jr.

(57) ABSTRACT

Embodiments of golf club face plates with internal cell lattices are presented herein. Other examples and related methods are also disclosed herein.

19 Claims, 27 Drawing Sheets

Related U.S. Application Data continuation-in-part of application No. 16/989,747, filed on Aug. 10, 2020, now Pat. No. 11,247,104, which is a continuation of application No. 16/405,904, filed on May 7, 2019, now Pat. No. 10,737,147, which is a continuation of application No. 15/859,912, filed on Jan. 2, 2018, now Pat. No. 10,322,320, which is a division of application No. 15/162,482, filed on May 23, 2016, now Pat. No. 9,889,347, which is a continuation-in-part of application No. 14/157,345, filed on Jan. 16, 2014, now Pat. No. 9,409,065, which is a continuation of application No. 13/352,086, filed on Jan. 17, 2012, now Pat. No. 8,663,027.

(60) Provisional application No. 62/940,696, filed on Nov. 26, 2019, provisional application No. 62/293,914, filed on Feb. 11, 2016, provisional application No. 62/165,683, filed on May 22, 2015, provisional application No. 61/537,278, filed on Sep. 21, 2011.

(51) Int. Cl.

*B23K 20/233* (2006.01)
*B32B 3/12* (2006.01)
*B23K 103/14* (2006.01)

(56) References Cited

U.S. PATENT DOCUMENTS 4,681,322 A 7/1987 Straza
5,004,242 A 4/1991 Iwanaga
5,301,941 A 4/1994 Allen
5,377,986 A 1/1995 Viollaz
5,397,126 A 3/1995 Allen
5,401,021 A 3/1995 Allen
5,425,538 A 6/1995 Vincent
5,497,993 A 3/1996 Shan
5,499,814 A 3/1996 Lu
5,669,826 A * 9/1997 Chang .................... A63B 53/04 473/332
5,681,227 A 10/1997 Sayrizi
5,711,722 A 1/1998 Miyajima
5,735,755 A 4/1998 Kobayashi
5,766,094 A 6/1998 Mahaffey
D398,687 S 9/1998 Miyajima
5,827,131 A 10/1998 Mahaffey
RE35,955 E 11/1998 Lu
5,944,619 A 8/1999 Cameron
6,001,495 A 12/1999 Bristow
6,074,309 A 6/2000 Mahaffey
6,077,171 A 6/2000 Yoneyama
6,114,050 A 9/2000 Westre
6,183,381 B1 2/2001 Grant
6,193,615 B1 2/2001 Hirota
6,240,640 B1 6/2001 Matsuoka
6,319,150 B1 11/2001 Werner
6,368,231 B1 4/2002 Chen
6,454,665 B2 9/2002 Antonious
6,932,716 B2 8/2005 Ehlers
6,984,180 B2 1/2006 Hasebe
6,986,715 B2 1/2006 Mahaffey
7,101,289 B2 9/2006 Gibbs
7,108,614 B2 9/2006 Lo
7,112,147 B2 9/2006 Solheim
7,281,990 B2 10/2007 Hagood
7,367,898 B2 5/2008 Hawkins
7,367,899 B2 5/2008 Rice
7,461,726 B2 12/2008 Hawkins
7,500,923 B2 3/2009 Tateno
7,527,565 B1 5/2009 Ehlers
7,708,653 B2 5/2010 Hawkins
7,846,039 B2 12/2010 Gilbert
7,874,936 B2 1/2011 Chao
7,946,929 B2 5/2011 Wahlin
8,007,373 B2 8/2011 Soracco
8,070,623 B2 12/2011 Stites
8,282,506 B1 10/2012 Holt
8,323,122 B2 12/2012 Soracco
8,663,027 B2 3/2014 Morales
8,915,794 B2 12/2014 Stites
9,089,747 B2 7/2015 Boyd
9,138,622 B1 * 9/2015 DeMille ................. A63B 60/00
9,194,452 B2 11/2015 Hawkins
9,199,141 B2 12/2015 Cardani
9,216,327 B2 12/2015 Morin
9,220,959 B2 12/2015 Roach
9,330,406 B2 5/2016 Soracco
9,370,697 B2 6/2016 Beno
9,452,323 B2 9/2016 Kronenberg
9,724,575 B2 8/2017 Morin
9,889,347 B2 2/2018 Morales
9,925,432 B2 3/2018 Morales
10,016,661 B2 7/2018 Madson
10,086,238 B1 10/2018 Roach
10,391,370 B2 8/2019 Tassistro
10,398,951 B2 9/2019 Golden
10,463,933 B2 11/2019 Mata
10,675,517 B2 6/2020 Spackman
10,716,977 B2 7/2020 Aplin
10,894,193 B2 1/2021 Chen
11,642,578 B2 * 5/2023 Oldknow ................. A01H 5/10 473/324
11,857,848 B1 * 1/2024 Roach ..................... B22F 10/14
2002/0019265 A1 2/2002 Allen
2002/0037776 A1 3/2002 Krumme
2004/0009829 A1 1/2004 Kapilow
2004/0082405 A1 4/2004 Sano
2005/0020378 A1 1/2005 Krumme
2007/0225084 A1 9/2007 Schweigert
2007/0293343 A1 12/2007 Lai
2008/0076595 A1 3/2008 Lai
2014/0274459 A1 * 9/2014 Kronenberg ........... A63B 53/04 473/345
2017/0246515 A1 8/2017 Lytle
2017/0246517 A1 8/2017 Ueda
2018/0133568 A1 * 5/2018 Chen .................. A63B 53/0475
2019/0255397 A1 * 8/2019 Hebreo ................ A63B 53/047
2020/0086386 A1 3/2020 Koehler
2020/0129820 A1 * 4/2020 Abe ..................... A63B 53/042
2020/0139206 A1 * 5/2020 Thaon d'Arnoldi ... A63B 53/02
2022/0080270 A1 * 3/2022 Brubaker ........... A63B 53/0412
2022/0280848 A1 * 9/2022 Milleman .......... A63B 53/0408
2022/0401799 A1 * 12/2022 DeMille .............. A63B 53/045

OTHER PUBLICATIONS

International Search Report for PCT Application No. PCT/US2016/033822, 2 pages, Aug. 19, 2016.

* cited by examiner 20522
20510
20100
20521
20500
20600
20520

21522
21520
21523
21100
21500
21524
21510
21600
21521

22510
22520
22522
22521
22600
22100
22523
22524
22500

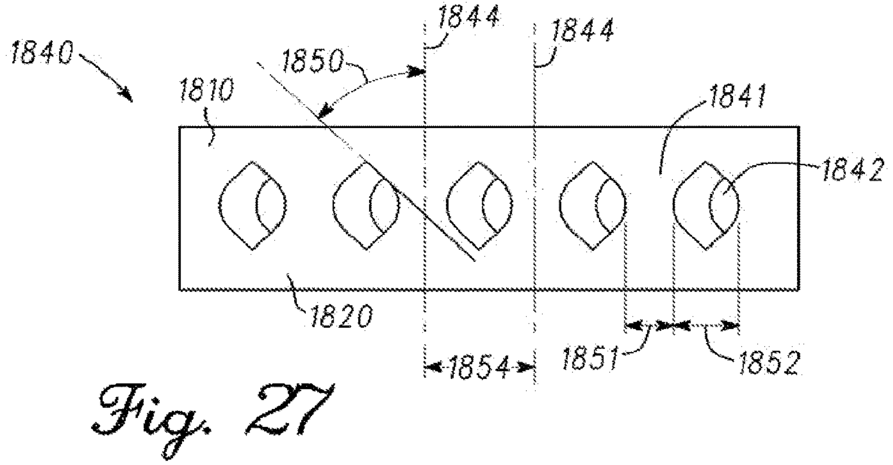
Fig. 27
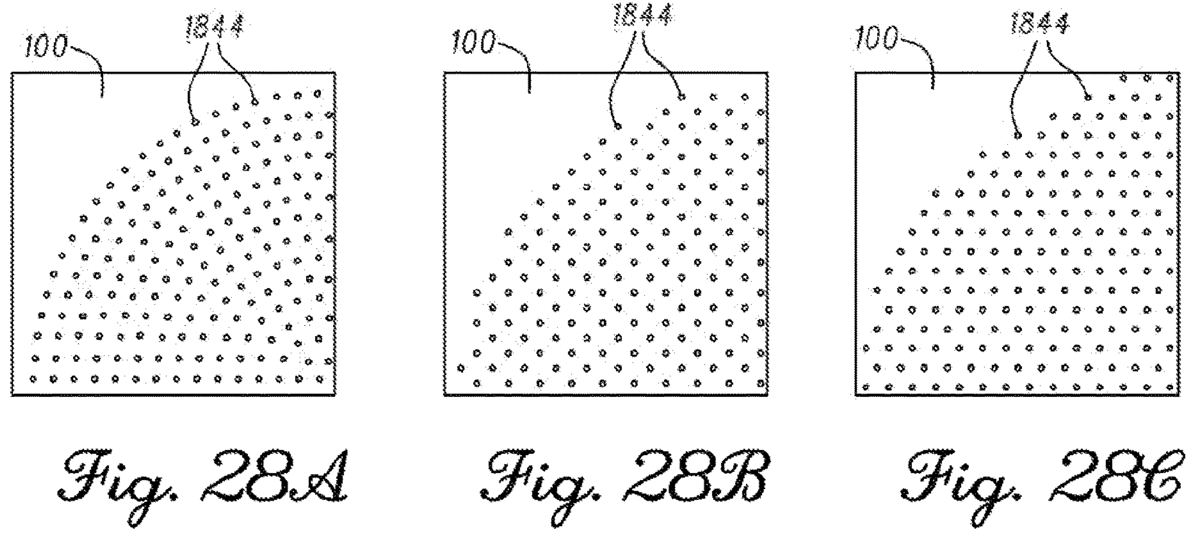
Fig. 28A
Fig. 28B
Fig. 28C

GOLF CLUB FACE PLATES WITH INTERNAL CELL LATTICES AND RELATED METHODS

CROSS-REFERENCE TO RELATED APPLICATIONS

This is a continuation of U.S. patent application Ser. No. 17/103,760, filed on Nov. 24, 2020, now U.S. Pat. No. 11,925,839, issued Mar. 12, 2024, which claims the benefit of U.S. Provisional Patent Application No. 62/940,696, filed on Nov. 26, 2019, and is a continuation-in-part of U.S. patent application Ser. No. 16/989,747, filed Aug. 10, 2020, now U.S. Pat. No. 11,247,104, issued Feb. 15, 2022, which is a continuation of U.S. patent application Ser. No. 16/405,904, filed May 7, 2019, now U.S. Pat. No. 10,737,147, issued Aug. 11, 2020, which is a continuation of U.S. patent application Ser. No. 15/859,912, filed Jan. 2, 2018, now U.S. Pat. No. 10,322,320 issued Jun. 18, 2019, which is a divisional of U.S. patent application Ser. No. 15/162,482, filed on May 23, 2016, now U.S. Pat. No. 9,889,347, issued Feb. 13, 2018, which claims the benefit of U.S. Provisional Patent Application No. 62/293,914, filed on Feb. 11, 2016, and U.S. Provisional Patent Application No. 62/165,683, filed on May 22, 2015, and is a continuation-in-part of U.S. patent application Ser. No. 14/157,345, filed on Jan. 16, 2014, now U.S. Pat. No. 9,409,065, which is a continuation of U.S. patent application Ser. No. 13/352,086, filed on Jan. 17, 2012, now U.S. Pat. No. 8,663,027, which claims the benefit of U.S. Provisional Patent Application No. 61/537,278, filed on Sep. 21, 2011, the contents of all which are incorporated fully herein by reference.

TECHNICAL FIELD

The present disclosure relates generally to sports equipment, and relates, more particularly, to golf club face plates with internal cell lattices and related methods.

BACKGROUND

The development of golf club head technology has been characterized in part by the desire to enhance playability characteristics while managing weight and mass location considerations. The ability to alter or redistribute mass at or around locations of high stress and/or of limited thickness in a golf club head, however, has to be balanced with respect to structural resilience considerations. Considering the above, further developments in terms of weight redistribution will advance the playability characteristics of golf club heads.

BRIEF DESCRIPTION OF THE DRAWINGS

The present disclosure will be better understood from a reading of the following detailed description of examples of embodiments, taken in conjunction with the accompanying figures in the drawings.

FIG. 27 illustrates a side view of a portion of a cell lattice of a face plate.

FIG. 28A illustrates a front cross sectional view of a portion of a face plate having a cell lattice according to one embodiment.

FIG. 28B illustrates a front cross sectional view of a portion of a face plate having a cell lattice according to one embodiment.

FIG. 28C illustrates a front cross sectional view of a portion of a face plate having a cell lattice according to one embodiment.

Figure 1:
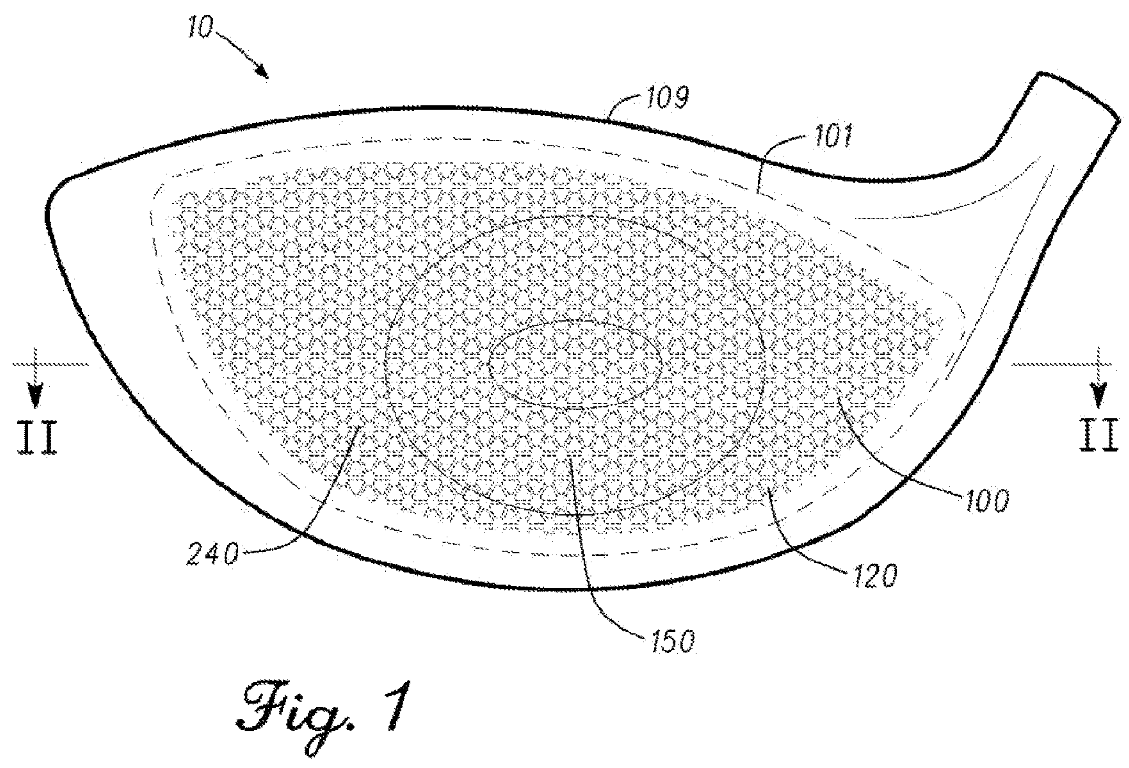
FIG. 1 illustrates a front perspective view of a golf club head comprising a face plate coupled to a club head body.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “include,” and “have,” and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION

In one embodiment, a method for providing a face plate for a golf club head can comprise providing an inner skin of the face plate, providing an outer skin of the face plate, providing a midsection of the face plate, and bounding the midsection between the inner skin and the outer skin. Providing the midsection can comprise providing a plurality of midsection layers comprising a first midsection layer and a second midsection layer, forming a first lattice pattern through the first midsection layer, and forming a second lattice pattern through the second midsection layer. Providing the inner skin, the outer skin, and the midsection can comprise providing each of the midsection, the inner skin, or the outer skin as separate distinct pieces. Bounding the midsection can comprise diffusion bonding the inner skin, the midsection, and the outer skin together, including the first and second midsection layers, into a single integral piece of material that is substantially seamless between the inner skin and the midsection and between the midsection and the outer skin. After the diffusion bonding, a midsection central area of the midsection can comprise a cell lattice, the cell lattice can comprise a plurality of walls defining a plurality of cells in a hexagonal pattern, the plurality of walls and the plurality of cells of the cell lattice can be defined at least in part by the first and second lattice patterns, the cell lattice can be fully bounded between the inner and outer skins of the face plate, and a midsection perimeter area of the midsection can bound the midsection central area and can be devoid of the cell lattice. Forming the first lattice pattern through the first midsection layer can comprise forming a first cutout through the first midsection layer, the first cutout configured to define a first volume portion of a first cell of the cell lattice. Forming the second lattice pattern through the second midsection layer can comprise forming a second cutout through the second midsection layer, the second cutout configured to define a second volume portion of the first cell. Bounding the midsection can comprise aligning the second midsection layer over the first midsection layer such that the first and second cutouts are centered about a first cell axis of the first cell.

In one embodiment, a method for providing a face plate for a golf club head can comprise providing an inner skin of the face plate, providing an outer skin of the face plate, providing a midsection of the face plate, and coupling the midsection between the inner skin and the outer skin such that an inner midsection end of the midsection is coupled to the inner skin of the face plate, and such that an outer midsection end of the midsection is coupled to the outer skin of the face plate. Providing the midsection can comprise providing a cell lattice in the midsection, the cell lattice comprising a plurality of walls defining a plurality of cells.

In one embodiment, a face plate for a golf club head can comprise an inner skin, an outer skin, and a midsection. The midsection can comprise an inner midsection end coupled to the inner skin, an outer midsection end coupled to the outer skin, and a cell lattice comprising a plurality of walls defining a plurality of cells between the inner midsection end and the outer midsection end.

Other examples and embodiments are further disclosed herein. Such examples and embodiments may be found in the figures, in the claims, and/or in the present description.

Figure 2:
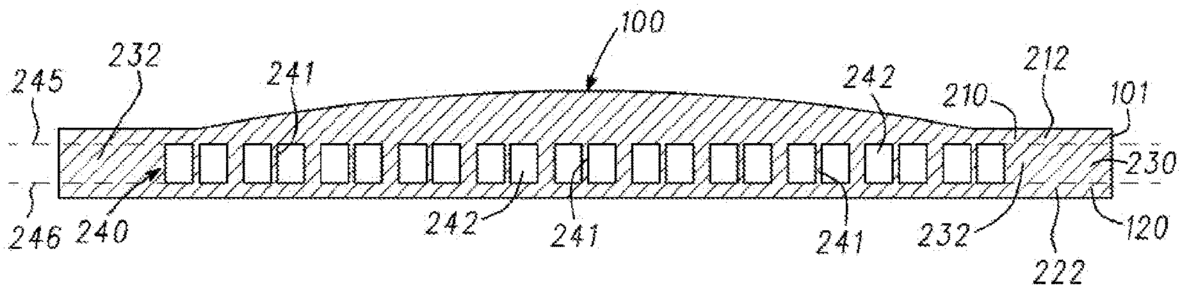
FIG. 2 illustrates a cross-sectional view of the face plate of FIG. 1, cut along line II-II.

Turning to the drawings, FIG. 1 illustrates a front perspective view of golf club head 10 comprising face plate 100 coupled to club head body 109. FIG. 2 illustrates a cross-sectional view of face plate 100 cut along line II-II of FIG. 1. As can be seen in FIG. 2, face plate 100 comprises inner skin 210, outer skin 120, and midsection 230 between inner skin 210 and outer skin 120, where midsection 230 comprises cell lattice 240 having walls 241 defining cells 242. In the present example, cell lattice 240 extends from inner midsection end 245 (where cell lattice 240 is coupled to inner skin 210), to outer midsection end 246 (where cell lattice 240 is coupled to inner skin 210). Cell lattice 240 is thus fully encapsulated within faceplate 100 in the present example, between inner skin 120 and outer skin 210, and by perimeter midsection area 232. Although inner midsection end 245 and outer midsection end 246 are represented along dotted lines in FIG. 2, in the present embodiment the interface between midsection 230 and inner skin 210 or outer skin 120 may be seamless or imperceptible visually and/or structurally.

The different portions of faceplate 100 can comprise different thicknesses. In the present example, the thickness of outer skin 120 is approximately 0.03 inches (approximately 0.08 millimeters (mm); the thickness of midsection 230 is approximately 0.07 inches (approximately 1.78 mm); and the thickness of inner skin varies, being approximately 0.05 inches (approximately 0.13 mm) towards the center, and approximately 0.03 inches (approximately 0.08 mm) towards the perimeter. The thickness of inner skin 210 is greater than the thickness of outer skin 120 in the present example, where inner skin 210 faces away from the impact surface of faceplate 100, to better distribute impact stresses throughout the faceplate. In some examples, the thickness of inner skin 210 and outer skin 120 can be substantially similar to each other, and/or may not vary.

Figure 5:
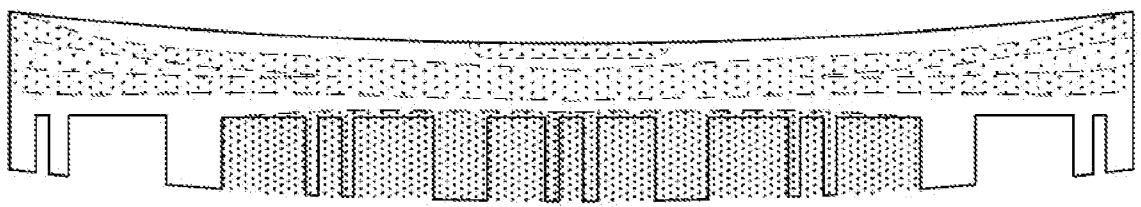
FIG. 5 illustrates a finite element analysis graphic showing uneven stress distribution detrimentally concentrated in and around void portions of an exposed cell lattice in an embodiment of a face plate lacking an inner skin layer.

In the present example, face plate 100 is shown with inner skin 210, outer skin 120, and midsection 230 merged together into a single integral piece of material. In some examples, inner skin 210, outer skin 120, and/or midsection 230 may be merged together without using adhesives or fasteners, such as via a high-pressure and/or high-heat process. In the same or other examples, such process may comprise a diffusion bonding process. The ability to combine midsection 230 between inner skin 210 and outer skin 120 and into a single integral piece of material can provide many benefits, such as a reduction in the weight of face plate 100 via cell lattice 240. In some examples, encapsulating cell lattice 240 within face plate 100 can permit weight savings of approximately 8% to approximately 25%. Such results can be achieved without compromising the strength or durability of face plate 100, and without introducing detrimental bending, elastic and/or flexing susceptibilities that would result from uneven stress distribution if, for example, face plate 100 were made with cell lattice 240 exposed and/or without one of inner skin 210 or outer skin 120. As an example, and skipping ahead in the figures, FIG. 5 illustrates a cross-sectional view of a finite element analysis graphic showing uneven stress distribution detrimentally concentrated, as denoted by the heavily-dotted center region, in and around the void portions of an exposed cell lattice in an embodiment comprising only a single skin coupled to the cell lattice.

Figure 3:
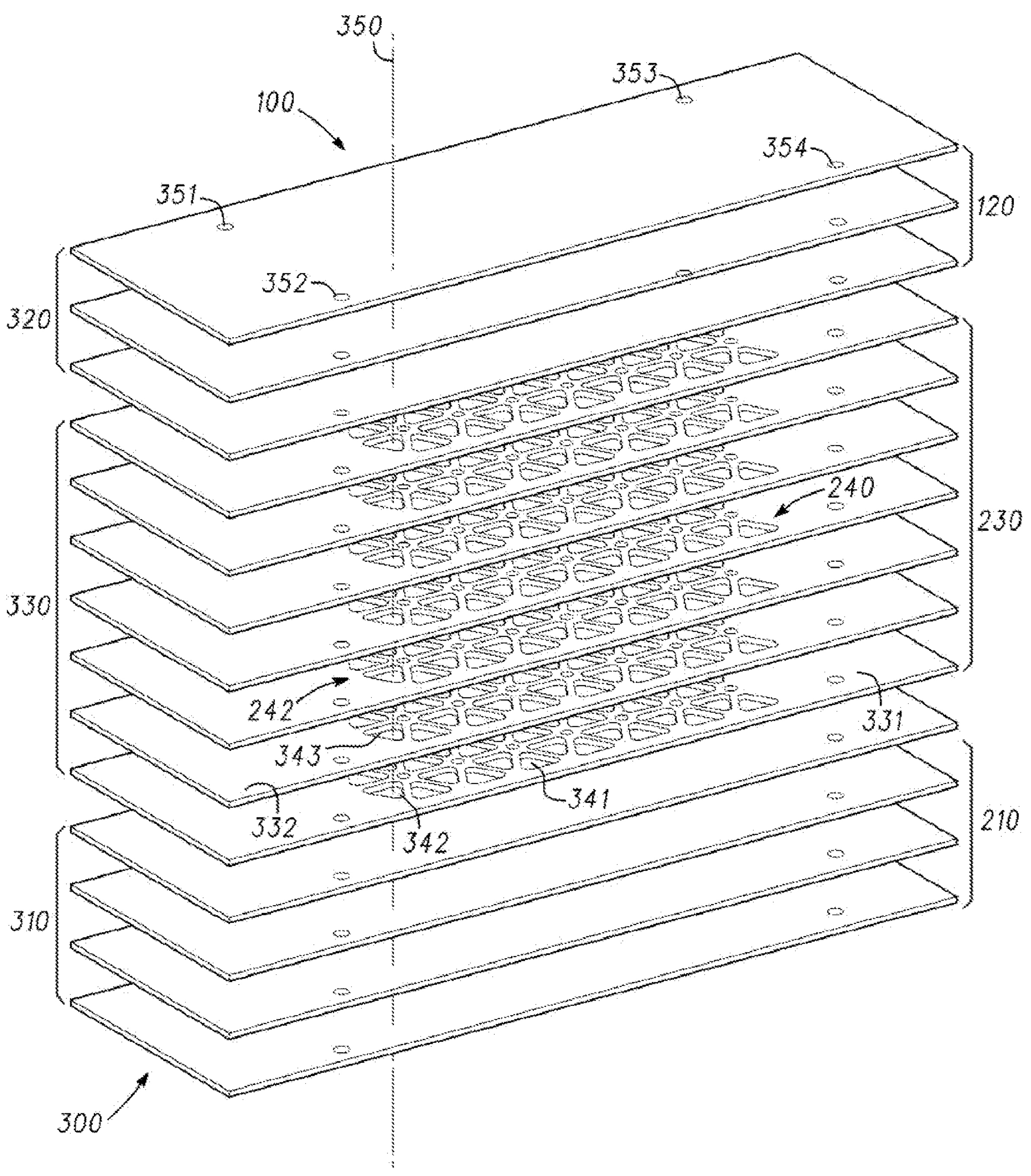
FIG. 3 illustrates a perspective view of portions of different layers comprising the face plate of FIG. 1 prior to being merged together.

Backtracking to FIG. 3, a perspective view is illustrated of portions of different layers 300 comprising face plate 100 prior to being merged together, including midsection layers 330. In the present example, midsection 230 comprises midsection layers 330 merged together into the single integral piece of material of face plate 100. In the same or other examples, the plurality of midsection layers 330 can be merged together via the high-pressure and high-heat process described above. As can be seen in FIG. 3, inner skin 210 and outer skin 120 can also be formed out of several layers, such as outer skin layers 320 and inner skin layers 310, which may be merged together into the single integral piece of material of face plate 100. Although in the present embodiment inner skin 210 comprises more inner skin layers 310 than outer skin 120 comprises outer skin layers 320, there can be other embodiments where such relationship is inverse, or where both skins comprise the same number of layers. There may be other embodiments, however, where one or more of inner skin 210, outer skin 120, and/or midsection 230 may originally comprise a single layer, rather than a plurality of layers coupled together.

Figure 4:
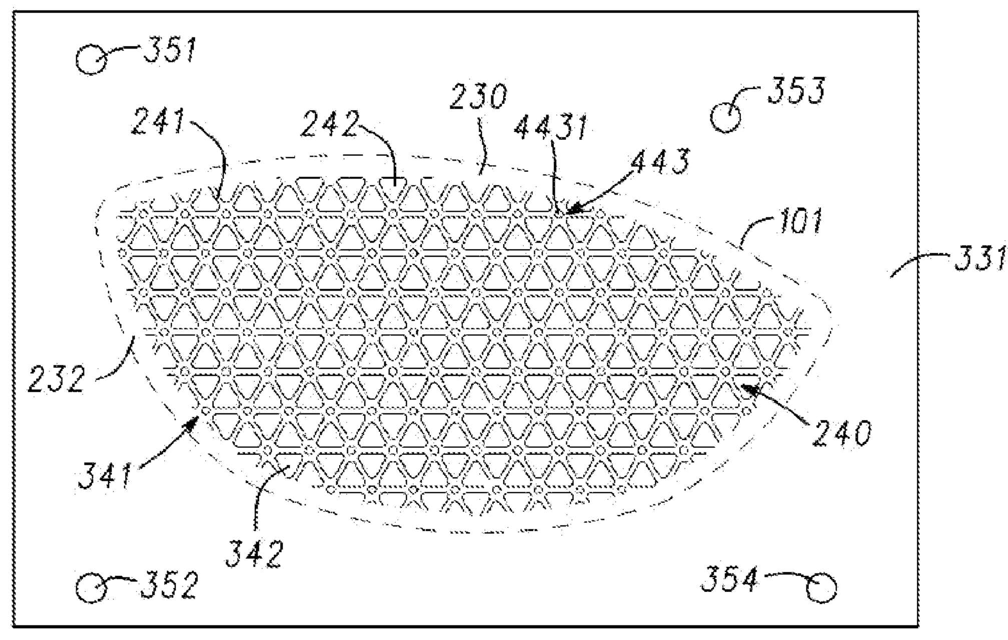
FIG. 4 illustrates a front view of a midsection layer of the face plate of FIG. 1, comprising a lattice pattern and alignment elements.

FIG. 3 shows portions of layers 300 as sheets of metallic material, and illustrate midsection layers 330 with representative cutouts configured to form cell lattice 240 when merged together. FIG. 4 illustrates a front view of midsection layer 331 of midsection 230, comprising lattice pattern 341 and alignment elements 351-354. Lattice pattern 341 comprises a plurality of cutouts, such as cutout 342, that define a layer portion of walls 241 and a layer portion of the volume of cells 242 of cell lattice 240. In some examples, cell lattice 240 may be formed by one or more processes, such as by machining and/or by chemically etching the cutouts of the different lattice patterns of midsection layers 330 prior to merging layers 300 (FIG. 3) together. In examples involving the machining of cell lattice 240 or one or more of its elements, such machining can be carried out via one or more techniques, such as through computer numerical control (CNC) machining, waterjet cutting, and/or electrical discharge machining.

Although in the present example the cutouts of lattice pattern 341 are all similar to each other, there can be other examples where the cutouts can have different geometries, different dimensions, such as different radiuses, different perimeter lengths, different areas, and/or different volumes. The same or other examples may comprise other patterns, such as a pattern where a density in the number of cells 242 decreases towards target strike region 150 of face plate 100, and/or a pattern where a size or dimension of cells 242 decreases towards target strike region 150 of face plate 100.

Referring to FIG. 4, alignment elements 351-354 of midsection layer 331 is representative of corresponding alignment elements in other ones of layers 300 (FIG. 3). Alignment elements 351-354 are configured so that respective alignment elements 351-354 of different ones of layers 300 will align with each other only in a single orientation when layers 300 are stacked as shown in FIG. 3. Thus, when alignment elements 351-354 are aligned with each other throughout layers 300, walls 241 and the different lattice patterns of midsection layers 330, such as lattice pattern 341, will also be aligned to yield cell lattice 240 (FIGS. 2-3) once layers 300 are merged together. In the present example, by aligning alignment elements 351-354 throughout layers 300, the cutouts of the different layers 300 will also be aligned relative to each other. For instance, as can be seen in FIG. 3, cutouts 342 and 343 are located in different ones of midsection layers 330, but are both centered about cell axis 350 when alignment elements 351-154 are aligned throughout layers 300. Once layers 300 are merged together, the different cutouts of midsection layers 330 that are centered about cell axis 350 define a single cell of cells 242 of cell lattice 240. There can be other examples, however, where cutouts of different ones of midsection layers 330 may be offset from each other, rather than aligned or centered about a cell axis.

In the present example, each of layers 300 of face plate 100 comprises the same type of material. As an example, midsection 230, inner skin 210, and outer skin 120, and respective midsection layers 330, inner skin layers 310, and outer skin layers 320, comprise a metallic material such as a metallic alloy. In the present example, individual ones of layers 300, such as layer 331, can comprise a thickness of approximately 0.01 inch or approximately 0.25 mm. In the same or other embodiments, one or more of such layers 300 can comprise a thickness ranging from between approximately 0.25 mm to approximately 2.54 mm.

In the present embodiment, the metallic material for layers 300 of face plate 100 can comprise a titanium alloy comprising at least approximately 8% aluminum (by volume). In the same or other examples, the metallic alloy can comprise a titanium alloy such as Ti-9S which contains 8% Al, 1% V, and 0.2% Si, with the remaining alloy composition being titanium and possibly some trace elements. In some embodiments, Ti-9S contains 6.5%-8.5% Al, between 1%-2% V, a maximum of 0.08% C, a maximum of 0.2% Si, a maximum of 0.3% Fe, a maximum of 0.2% O, a maximum of 0.05% N, trace amounts of Mo, and trace amounts of Sn, with the remaining alloy composition being titanium. In the same or other examples, the metallic alloy can comprise a titanium 8-1-1 alloy having approximately 8% aluminum, 1% vanadium and 1% chromium. Other materials may be used depending on their strength, considering their brittleness/elasticity as a beta-type crystal structure. For example, a titanium 6-4 alloy having approximately 6% aluminum and 4% vanadium, may be used in some embodiments, but can be from 5% to 12% less elastic than titanium 8-1-1 and may thus require further reinforcement or thickness for face plate 100 to properly withstand golf impact stresses. In contrast, other materials such as commercially pure titanium, may not be suitable to properly withstand the stresses to which face plate 100 is subjected.

There can be examples where the metallic alloy of layers 300 may comprise an alpha-type crystal structure prior to being merged together, and a stronger beta-type crystal structure after being merged together, such as via the high-heat and high pressure process described above. As an example, the alpha-type crystal structure may comprise a hexagonal crystal phase, and/or the beta-type crystal structure may comprise a body-centered cubic crystal phase. The transformation to beta-type crystal structure can permit the crystal structure of adjacent layers of layers 300 to be intermeshed together at a molecular level once the merging process is completed to yield the single integral piece of material for face plate 100.

As can be seen in FIGS. 3-4, the sheets of metallic material containing layers 300 are larger than face plate 100 in the present example. In the same or other examples, face plate 100 can be separated from the other portions of the sheets of metallic material once layers 300 have been merged into the single integral piece of material, by water-jetting or by otherwise cutting along a cut perimeter defining face plate edge 101 of face plate 100, such as the cut perimeter depicted in dotted lines in FIG. 4.

In the present example, face plate 100 comprises cell lattice 240 in a central area of midsection 230, as can be seen from the exemplary midsection layer 331 shown in FIG. 4. Midsection 230 also comprises perimeter midsection area 232 bounding cell lattice 240 and devoid of cells 242. Cell lattice 240 is thus separated from face plate edge 101 by perimeter midsection area 232. In some examples, separating cell lattice 240 from face plate edge 101 can permit cell lattice 240 to be distanced away from an interface or weld zone with club head body 109 when face plate 100 is coupled to a front end of golf club head 10. In the same or other examples, such distancing of cell lattice 240 from face plate edge 101 and the interface with club head body 109 can be beneficial for permitting a better weld or bond between face plate 100 and club head body 109. There can be other examples, however, where cell lattice 240 may extend within midsection 230 to face plate edge 101 or adjacent thereto.

Cell lattice 240 comprises a hexagonal isogrid pattern with six subcells per hexagon in the present example, as can be seen in FIG. 4, providing the strength-to-weight performance and versatility of a reinforced honeycomb structure. In the present embodiment, each of the six subcells comprise the same triangular shape. In the same or other examples, the depth of the walls of a cell or subcell (between inner skin 210 and outer skin 120) can be approximately 0.07 inches (approximately 1.78 mm), the length of the walls of the cell or subcell can be approximately 0.06 inches (approximately 1.53 mm), and/or the thickness of the walls of the cell or subcell can be approximately 0.01 inches (approximately 0.25 mm). In the same or other examples, the depth of the walls of a cell or subcell can be approximately 1.27 mm to approximately 3.05 mm, the length of the walls of the cell or subcell can be approximately 1 mm to approximately 3.05 mm, and/or the thickness of the walls of the cell or subcell can be approximately 0.20 mm to approximately 0.76 mm. Other examples of cell lattices, however, may comprise different shapes and/or dimensions.

Figures 6, 7:
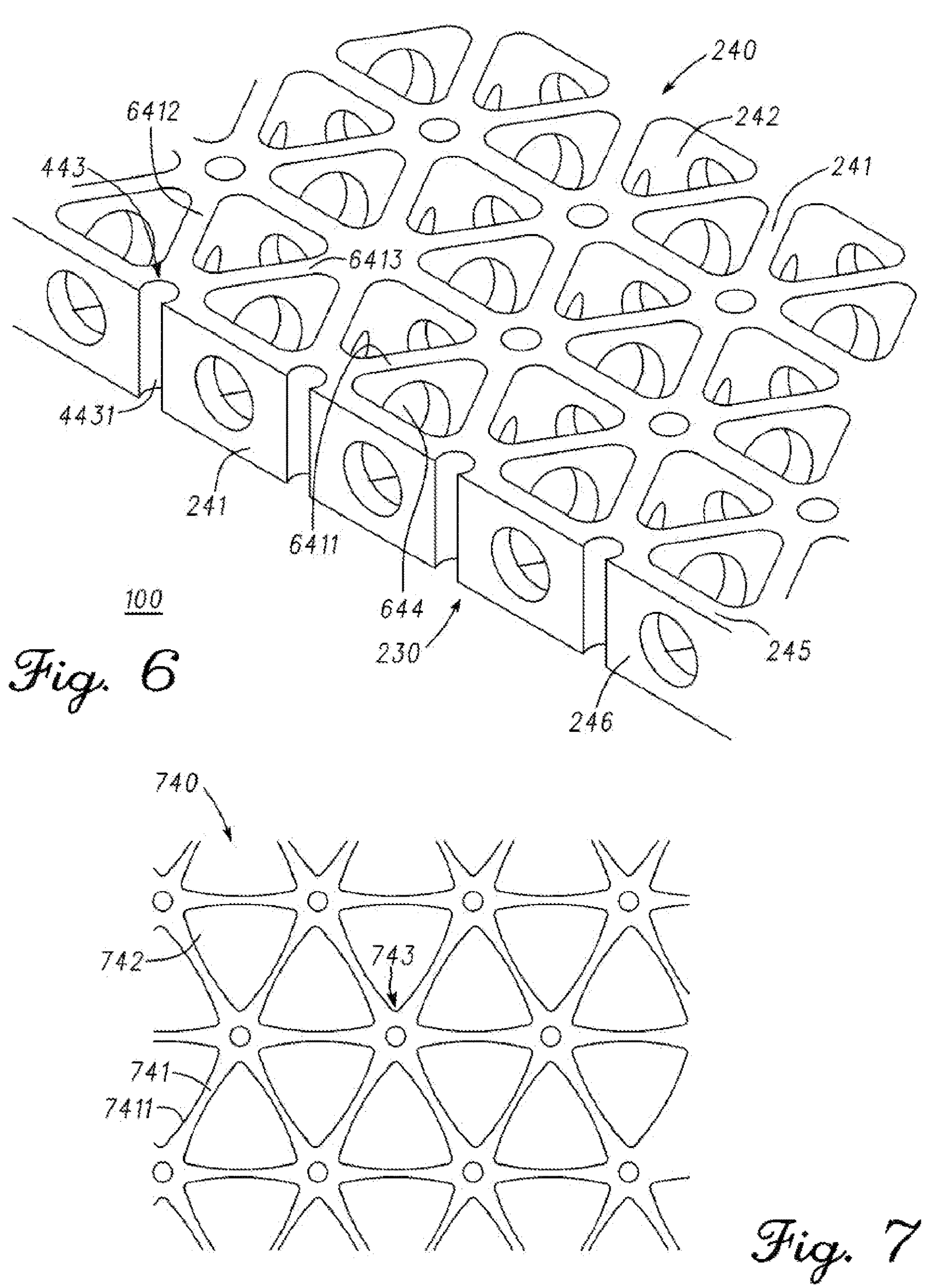
FIG. 6 illustrates a perspective view of a portion of the cell lattice of the face plate of FIG. 1.
FIG. 7 illustrates a front view of a portion of a cell lattice of a face plate.

Continuing with the figures, FIG. 6 illustrates a perspective view of a portion of cell lattice 240 of face plate 100, with inner skin 210, outer skin 120, and perimeter midsection area 232 removed for clarity. Cell lattice 240 comprises a plurality of cell junctions, such as cell junction 443, where two or more of walls 241 couple together. In the present example, the cell junctions provide an arcuate transition between the walls of a cell. For example, walls 6412 and 6413 meet at cell junction 443, and the interface between them at cell junction 443 is arcuate rather than pointed or sharp. In the present example, such arcuate interface comprises a radius of approximately 0.05 inch (approximately 0.13 mm), but there can be other examples where the arcuate interface can comprise a radius of approximately 0.025 mm to approximately 0.40 mm. Such arcuate features can be valuable, for example, to avoid sharp edges or corners that could concentrate stresses that could cause material fatigue and/or cracking within the cell lattice.

Also in the present example, one or more of the cell junctions can comprise respective junction channels, such as junction channel 4431 extending into cell junction 443 from inner midsection end 245 to outer midsection end 246. Junction channel 4431 comprises a largest dimension or diameter of approximately 0.015 inches (approximately 0.38 mm) in the present example, but there can be examples where similar junction channels can comprise a diameter and/or largest dimension of approximately 0.2 mm to approximately 0.66 mm.

In addition, cell lattice 240 also comprises one or more transverse passageways in the present example, such as transverse passageway 644 between at least two adjacent cells of cells 242. Transverse passageway 644 comprises a largest dimension or diameter of approximately 0.05 inches (approximately 1.27 mm) in the present example, but there can be examples where similar transverse passageways can comprise a diameter and/or largest dimension of approximately 0.5 mm to approximately 1.27 mm.

The addition of features such as junction channel 4431 and transverse passageway 644 can permit additional reduction in weight without compromising the strength or integrity of face plate 100. Also, the geometry and/or shape of junction channel 4431 and/or passageway 644 can be changed to be the same geometry and/or shape as cells 242 or another geometry and/or shape. Additionally, different ones of junction channel 4431 and/or passageway 644 can have different geometries and/or shapes.

FIG. 7 illustrates a portion of cell lattice 740. In some examples, cell lattice 740 can be similar to cell lattice 240 (FIGS. 1-4, 6), and may be located between skins such as inner skin 210 and outer skin 120, as described above with respect to face plate 100 in FIGS. 1-3. Cell lattice 740 comprises walls 741 and cells 742, respectively similar to walls 241 and walls 242 (FIGS. 1-4, 6), but where walls 741 comprise varying wall dimensions. As an example, the wall thickness dimension of wall 7411 varies along its length, the wall thickness being thinner towards the center of its length and thicker towards the ends of its length. In the present example, such variation in wall thickness dimension also affects the dimensions of cells 742, where the walls of the isogrid triangular cells comprise arcuate legs, and where the hexagonal shape defined by cells bounding a cell junction, such as cell junction 743, is now arcuate and/or circular. In other examples, the wall thickness dimensions could vary otherwise, such as by being thicker towards the center of their respective lengths, and by being thinner towards the respective length ends thereof.

Figure 8:
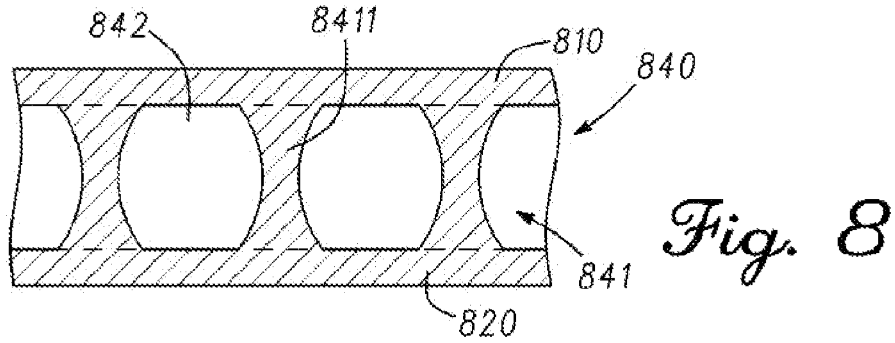
FIG. 8 illustrates a side view of a portion of a cell lattice of a face plate.

FIG. 8 illustrates a portion of cell lattice 840. In some examples, cell lattice 840 can be similar to cell lattice 240 (FIGS. 1-4, 6) and/or cell lattice 740 (FIG. 7). Cell lattice 840 is located between skins 810 and 820, which can be similar to inner skin 210 and/or outer skin 120, respectively, as described above with respect to face plate 100 (FIGS. 1-4, 6). Cell lattice 840 comprises walls 841 and cells 842, respectively similar to walls 241 and cells 242 (FIGS. 1-4, 6), and/or to walls 741 and cells 742 (FIG. 7). Walls 841 comprise varying wall dimensions in the present embodiment. As an example, the wall thickness dimension of wall 8411 varies along its height, the wall thickness being thinner towards the center of its height and thicker towards the ends of its height. In the present example, such variation in wall thickness dimension also affects the dimensions of cells 842, which can thus comprise a greater volume and arcuate dimensions. In other examples, the wall thickness dimensions could vary otherwise, such as by being thicker towards the center of their respective heights, and by being thinner towards the respective height ends thereof.

Skipping ahead in the figures, FIG. 27 illustrates a portion or cross section of cell lattice 1840 with varying wall dimensions. In some embodiments, cell lattice 1840 can be similar to cell lattice 240 (FIGS. 1-4, 6), cell lattice 740 (FIG. 7), and/or cell lattice 840 (FIG. 8). Cell lattice 1840 is located between skins 1810 and 1820, which can be similar to inner skin 210 and/or outer skin 120, respectively, as described above with respect to face plate 100 (FIGS. 1-4, 6). Cell lattice 1840 comprises walls 1841 and voids or cells 1842, respectively similar to walls 241 and cells 242 (FIGS. 1-4, 6), to walls 741 and cells 742 (FIG. 7), and/or to walls 841 and cells 842 (FIG. 8).

Referring to FIG. 27, in the illustrated embodiment, cell walls 1841 comprise a wall thickness 1851 that varies, similar to walls 841. In some embodiments, the wall thickness 1851 is greater near the inner skin 1810 and outer skin 1820 than near the central region of the lattice. For example, in the illustrated embodiment, the wall thickness dimension of wall 1841 varies along its height, the wall thickness being thinner towards the center of its height and thicker towards the ends of its height. Further, in the illustrated embodiment, the cell wall thickness 1851varies defining an hourglass shape. The variation in wall thickness 1851 also affects the dimensions of cells 1842, which can thus comprise a greater volume and arcuate dimensions. In other embodiments, the wall thickness 1851 can vary otherwise, such as by being thicker towards the center of their respective heights, and by being thinner towards the respective height ends thereof. Further, in other embodiments, the cell walls 1841 can have any shape, such as circular, elliptical, square, rectangular, triangular, or any other polygon or shape with at least one curved surface.

In many embodiments, the smallest or minimum wall thickness 1851 can range from approximately 0.005 inches to approximately 0.2 inches. In some embodiments, the smallest or minimum wall thickness 1851 can be less than or equal to approximately 0.20 inches, less than or equal to approximately 0.15 inches, less than or equal to approximately 0.10 inches, less than or equal to approximately 0.05 inches, or less than or equal to approximately 0.02 inches. For example, in the illustrated embodiment, the smallest or minimum wall thickness 1851 is approximately 0.020 inches. In other embodiments, the smallest or minimum wall thickness 1851 can be approximately 0.025 inches, approximately 0.05 inches, approximately 0.10 inches, approximately 0.15 inches, or approximately 0.2 inches.

Further referring to FIG. 27, cells 1842 comprise a cell width 1852. The cell width 1852 varies with distance from the inner skin 1810 and/or outer skin 1820. In the illustrated embodiment, cell width 1852 is greatest near the center of cell 1851 and decreases near the inner skin 1810 and outer skin 1820. In other embodiments, the cell width 1852 can vary in any capacity. For example, in other embodiments, the cell width 1852 can be greatest near the inner skin 1810 and outer skin 1820, and can decrease near the center of cell 1851.

In many embodiments, the largest or maximum cell width 1852 can range from approximately 0.005 inches to approximately 0.2 inches. In some embodiments, the largest or maximum cell width 1852 can be less than or equal to approximately 0.20 inches, less than or equal to approximately 0.15 inches, less than or equal to approximately 0.10 inches, less than or equal to approximately 0.05 inches, or less than or equal to approximately 0.025 inches. For example, in the illustrated embodiment, the largest or maximum cell width 1852 is approximately 0.045 inches. In other embodiments, the largest or maximum cell width 1852 can be approximately 0.025 inches, approximately 0.05 inches, approximately 0.10 inches, approximately 0.15 inches, or approximately 0.2 inches.

In the illustrated embodiment, cells 1842 are coupled to one another, or are continuous throughout the cell lattice 1840. In other embodiments, cells 1842 can be discrete.

Further referring to FIG. 27, in the present embodiment, cell walls 1841 are substantially hourglass shaped. Further, in the present embodiment, cell walls 1841 overlap or contact or intersect adjacent cell walls 1841 at a single, first point near inner skin 1810 and at a single, second point near outer skin 1820. Cell walls 1841 comprise cell wall axes 1844 extending centrally within cell walls 1841 between inner skin 1810 and outer skin 1820. Cell walls 1841 are spaced apart from adjacent cell walls 1841 by a center-to-center distance 1854 measured as the distance between adjacent cell wall axes 1844.

In many embodiments, the center-to-center distance 1854 between adjacent axes 1844 can range from approximately 0.005 inches to approximately 0.2 inches. In some embodiments, the center-to-center distance 1854 between adjacent axes 1844 can be less than or equal to approximately 0.20 inches, less than or equal to approximately 0.15 inches, less than or equal to approximately 0.10 inches, less than or equal to approximately 0.05 inches, or less than or equal to approximately 0.025 inches. For example, in the illustrated embodiment, the center-to-center distance 1854 between adjacent axes 1844 is approximately 0.050 inches. In other embodiments, the center-to-center distance 1854 between adjacent axes 1844 can be approximately 0.025 inches, approximately 0.05 inches, approximately 0.10 inches, approximately 0.15 inches, or approximately 0.2 inches.

Further referring to FIG. 27, cell walls 1841 extend at an angle 1850 from cell wall axes 1844. In many embodiments, cell walls 1841 extend at an angle less than or equal to approximately 45 degrees from cell wall axes 1844. In these or other embodiments, the face plate 100 having cell lattice 1840 can be printed as described in method 50000 below without the use of support structures within cells 1842. In other embodiments, cell walls 1841 can extend at any angle greater than 0 and less than 180 degrees from cell wall axes 1844.

Figure 25:
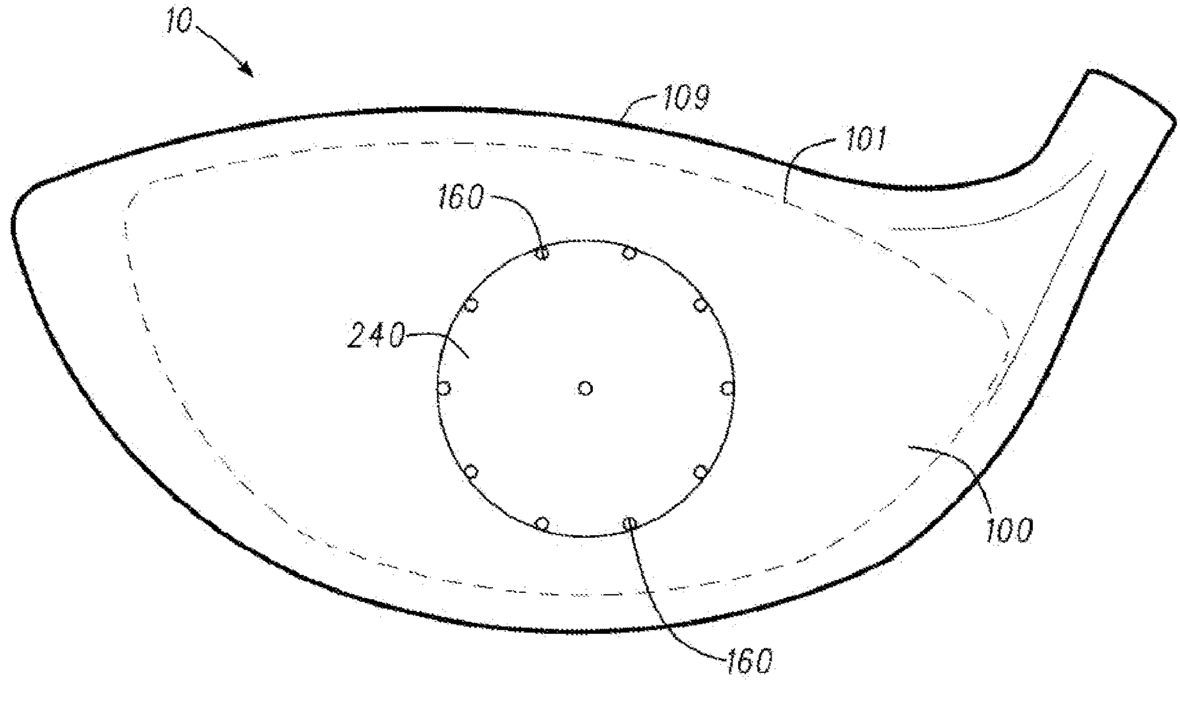
FIG. 25 illustrates a front view of a face plate of a golf club head having a cell lattice according to an embodiment.
Figure 26:
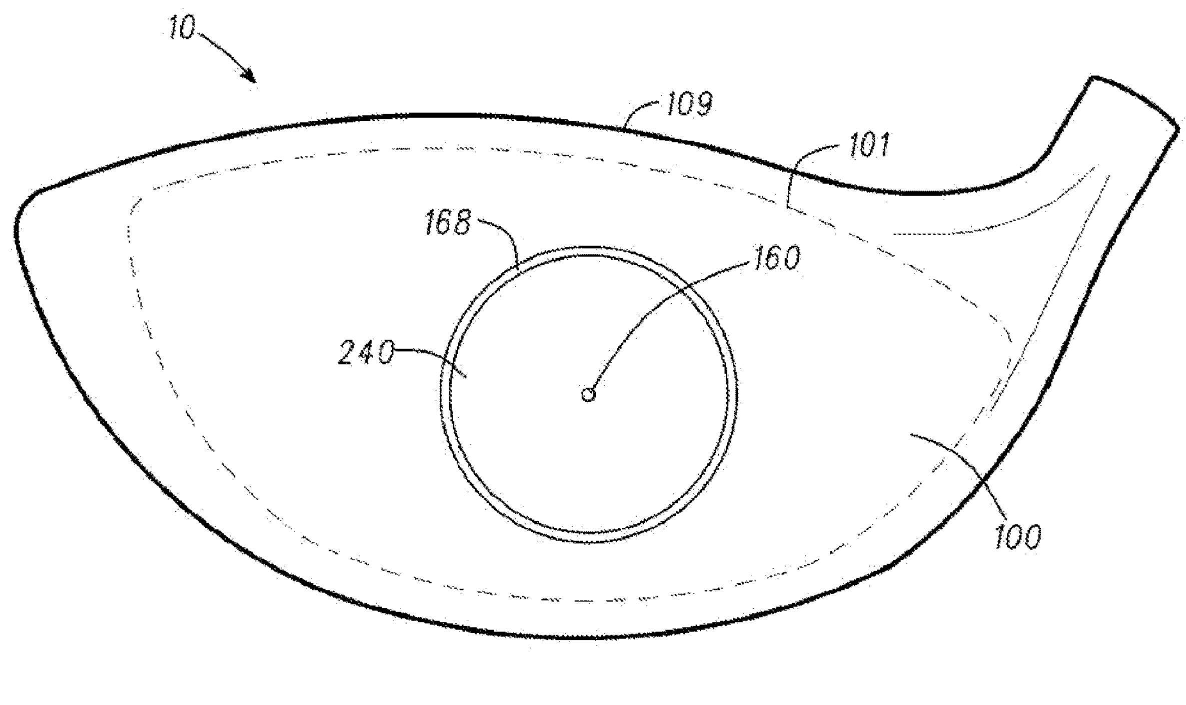
FIG. 26 illustrates a front view of a face plate of a golf club head having a cell lattice according to another embodiment.
Figure 29:
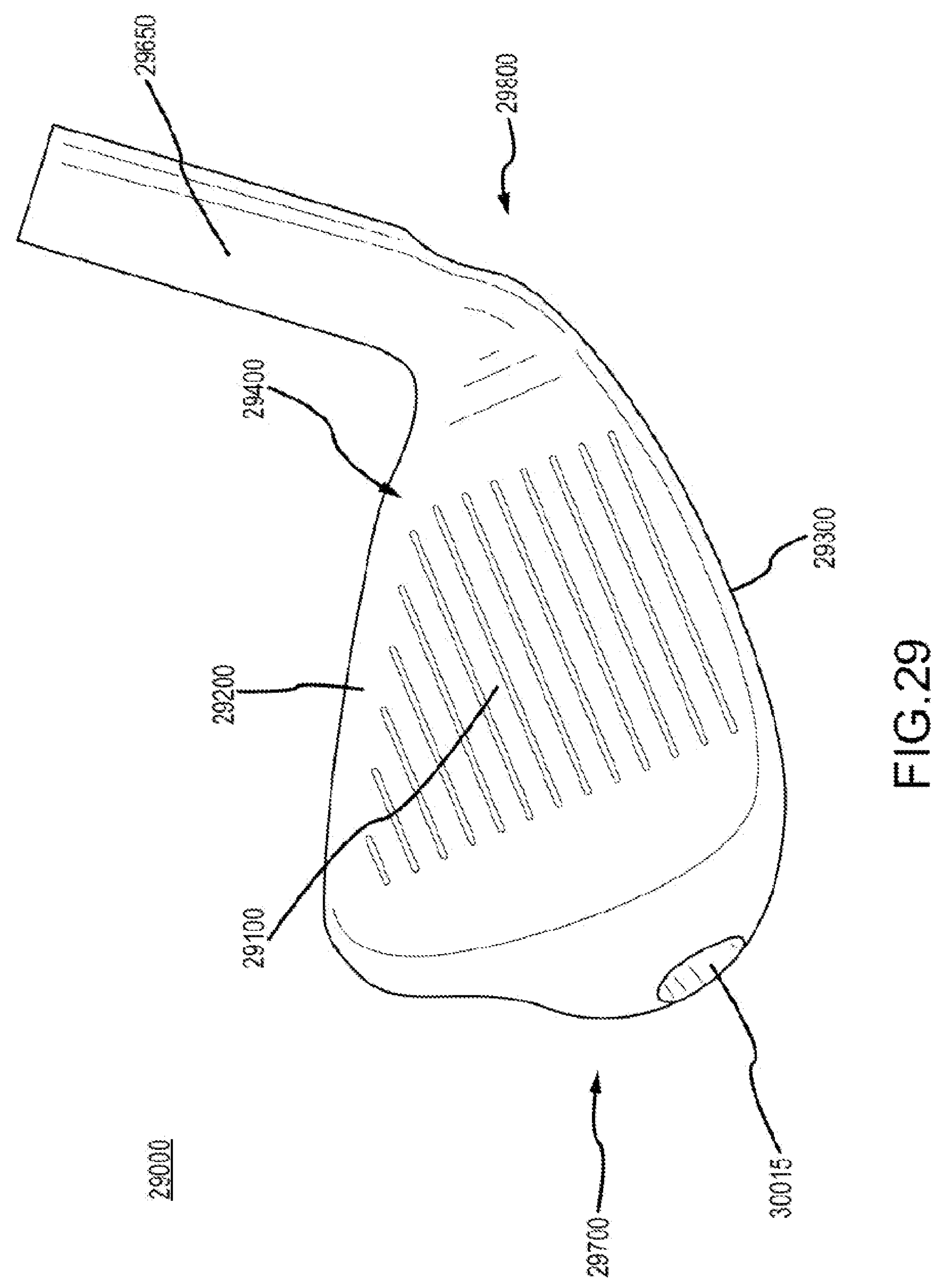
FIG. 29 illustrates a front perspective view of a golf club head according to one embodiment of the present invention.
Figure 30:
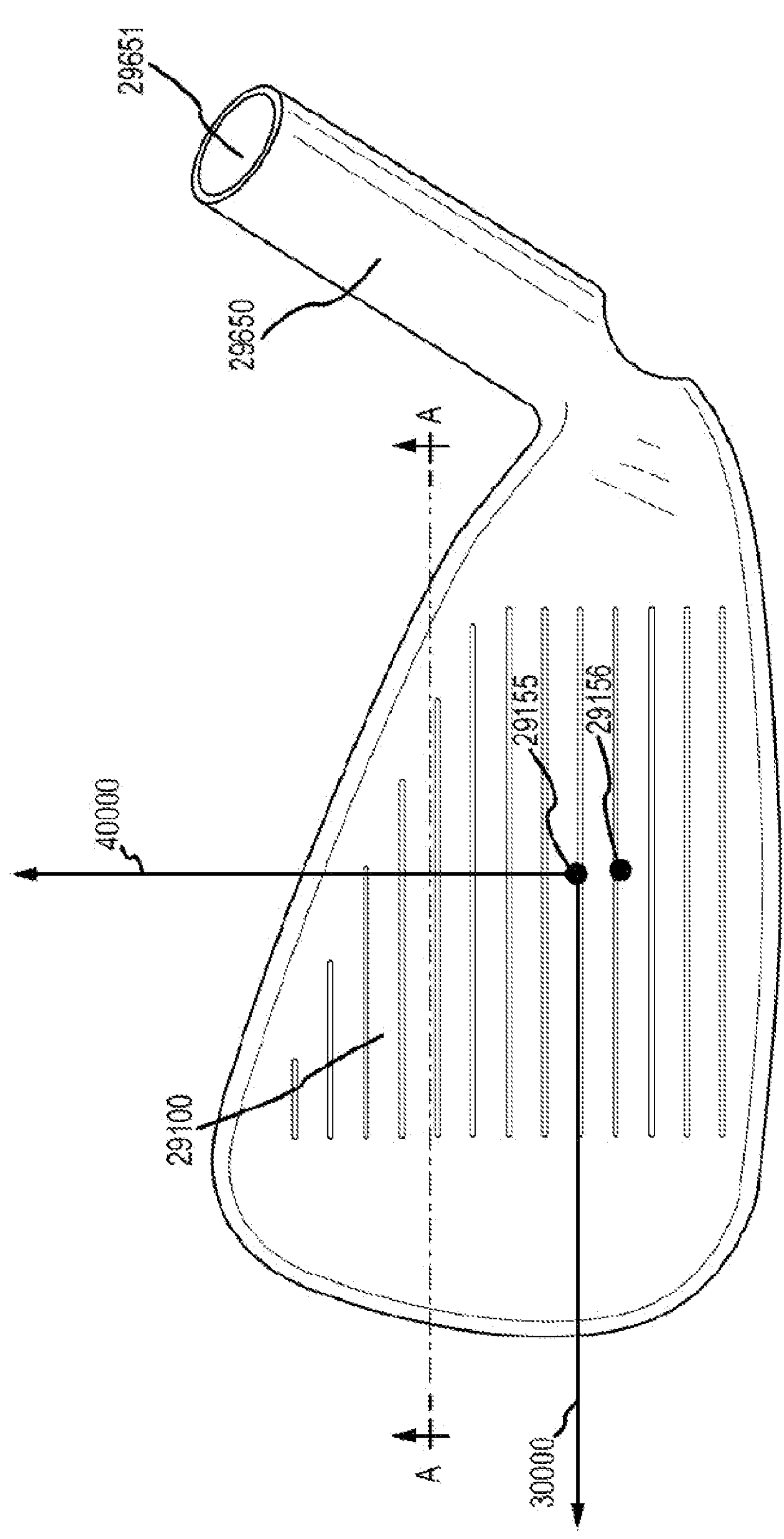
FIG. 30 illustrates a front view of the golf club head of FIG. 29.

Referring to FIGS. 25 and 26, in the illustrated embodiment, a portion of the face plate 100 is formed with the cell lattice 1840. In these or other embodiments, the portion of the face plate 100 formed with the call lattice 1840 can be subsequently coupled to the remainder of the face plate 100, as described in method 50000 below. In other embodiments, the entire face plate 100 can be formed as a single component with the cell lattice comprising at least a portion of the face plate 100. For example, in other embodiments, the entire face plate 100 can comprise the cell lattice 1840 and can be formed as a single component. For further example, in other embodiments, a portion (e.g. the center) of the face plate 100 can comprise the cell lattice 1840 and the face plate 100 can be formed as a single component.

In the illustrated embodiment, the portion of the face plate 100 having the cell lattice 1840 is substantially circular. In other embodiments, the portion of the face plate 100 having the cell lattice 1840 can comprise any other shape. For example, in other embodiments, the portion of the face plate 100 having the cell lattice 1840 can comprise an elliptical shape, as described in further detail in method 50000 below. For further example, in other embodiments, the portion of the face plate 100 having the cell lattice 1840 can comprise a square, a triangle, any other polygon, or any shape with at least one curved surface.

FIGS. 28A, 28B, and 28C illustrate a front, cross sectional view of a portion of a face plate 100 having cell lattice 1840 according to various embodiments. In the embodiment illustrated in FIG. 28A, cell wall axes 1844 are positioned radially from the center of the face plate 100. In other embodiments, cell wall axes 1844 can have other configurations. For example, cell wall axes 1844 can be configured in a diamond shaped pattern as illustrated in FIG. 28B, in a hexagonal shaped pattern as illustrated in FIG. 28C, or in any other configuration. Further, in the illustrated embodiments of FIGS. 28A-28C, cell wall axes 1844 comprise the same spacing. In other embodiments, cell wall axes 1844 can comprise different spacing.

In many embodiments, the cell lattice 1842 of face plate 100 reduces the weight of the face plate. In some embodiments, cell lattice 1842 of face plate 100 reduces the weight of the face plate without sacrificing durability. In some embodiments, cell lattice 1842 of face plate 100 reduces the weight of the face plate, and the thickness of the face plate is increased to maintain face plate durability. For example, in some embodiments, cell lattice 1842 can reduce the weight of the face plate up to approximately 3 grams. In many embodiments, reduced weight of face plate 100 due to cell lattice 1842 allows additional discretionary weight to be positioned elsewhere on the club head to achieve a desired head center of gravity or to increase club head moment of inertia to improve performance characteristics of the club head. For example, increased discretionary weight positioned on the perimeter of the club head can increase club head moment of inertia resulting in increased club head forgiveness. In many embodiments, weight shifted from the face plate to the perimeter of the club head can results in a greater increase in inertia than weight shifted from other portions of the club head (e.g. the crown). Further, in many embodiments, the cell lattice 1842 of face plate 100 increase face plate flexibility, resulting in increased bending of the face plate on impact with a golf ball, and therefore increased energy transfer to the golf ball and increased ball speed and travel distance.

Figure 11:
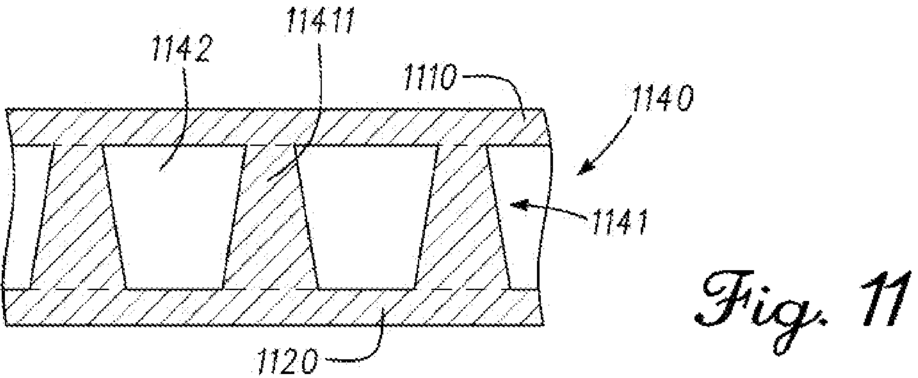
FIG. 11 illustrates a portion of a cell lattice of a face plate.

Backtracking through the figures, FIG. 11 illustrates a portion of cell lattice 1140 with varying wall dimensions. In some examples, cell lattice 1140 can be similar to cell lattice 240 (FIGS. 1-4, 6), cell lattice 740 (FIG. 7), and/or cell lattice 840 (FIG. 8). Cell lattice 1140 is located between skins 1110 and 1120, which can be similar to inner skin 210 and/or outer skin 120, respectively, as described above with respect to face plate 100 (FIGS. 1-4, 6). Cell lattice 1140 comprises walls 1141 and cells 1142, respectively similar to walls 241 and cells 242 (FIGS. 1-4, 6), to walls 741 and cells 742 (FIG. 7), and/or to walls 841 and cells 842 (FIG. 8). Walls 1141 also comprise varying wall dimensions in the present embodiment, tapering in thickness between skin 1110 and skin 1120. As an example, wall 11411 is thicker towards skin 1120, and decreases to a thinner thickness towards skin 1110. In the same or other examples, skin 1120 is configured to comprise the external surface of the faceplate, such that the thicker portion of walls 1141 face towards the impact surface of the faceplate. There may be other embodiments, however, where the thinner portion of walls 1141 can face towards the impact surface of the faceplate.

Figure 9:
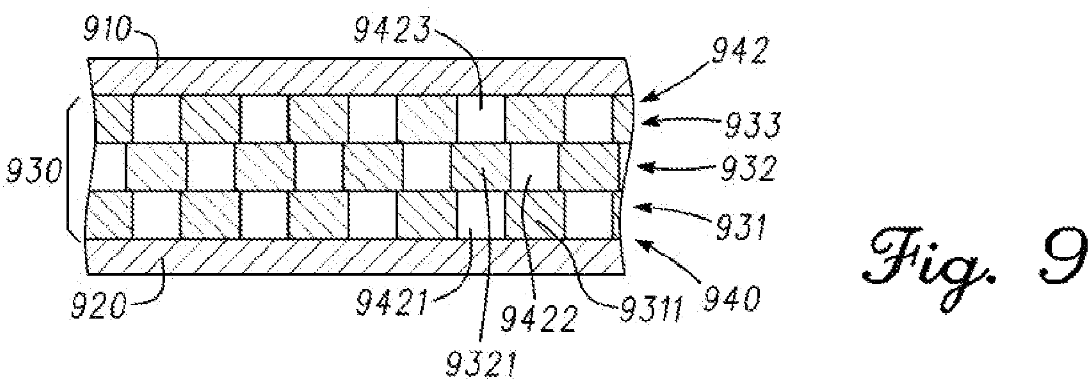
FIG. 9 illustrates a side view of a portion of a cell lattice of a face plate.

Backtracking through the figures, FIG. 9 illustrates a portion of cell lattice 940. In some examples, cell lattice 940 can be similar to cell lattice 240 (FIGS. 1-4, 6), cell lattice 740 (FIG. 7), cell lattice 840 (FIG. 8), and/or cell lattice 1140 (FIG. 11). Cell lattice 940 is located between skins 910 and 920, which can be similar to inner skin 210 and/or outer skin 120, as described above with respect to face plate 100 (FIGS. 1-4, 6). Cell lattice 940 comprises cells 942, which can be similar to cells 242 (FIGS. 1-4, 6), to cells 742 (FIG. 7), to cells 842 (FIG. 8), and/or to cells 1142 (FIG. 11). Cells 942 are offset from each other in the present example. For instance, cell 9421 is offset from cell 9422, which is offset from cell 9423. In addition, in the present example, midsection layers 931-933 define midsection 930 comprising cell lattice 940. Midsection layers 931-933 can be similar to, and may be merged together as described above, with respect to midsection layers 330 of face plate 100 (FIG. 3). Each of midsection layers 931-933 can comprise multiple layers before being merged together to form midsection 930.

In the present example, cell 9422 is at least partially capped or defined by solid portions of midsection layers 931, 932, and 933 and cell 9421 is at least partially capped or defined by solid portions of midsection layers 931 and 932 and skin 920.

Figure 12:
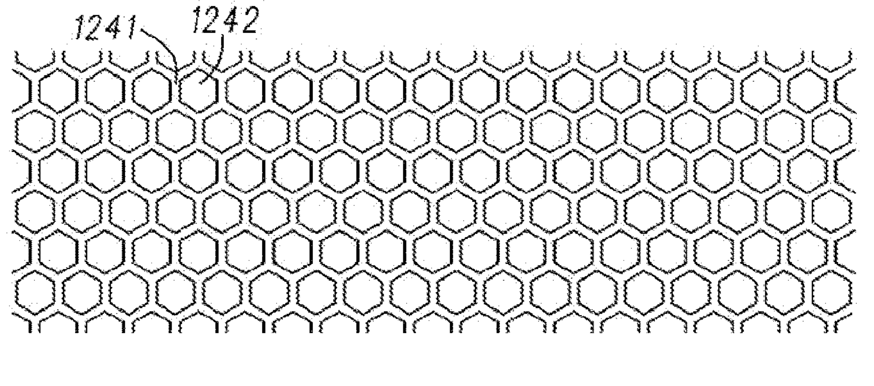
FIG. 12 illustrates a portion of a cell lattice of a face plate.
Figure 13:
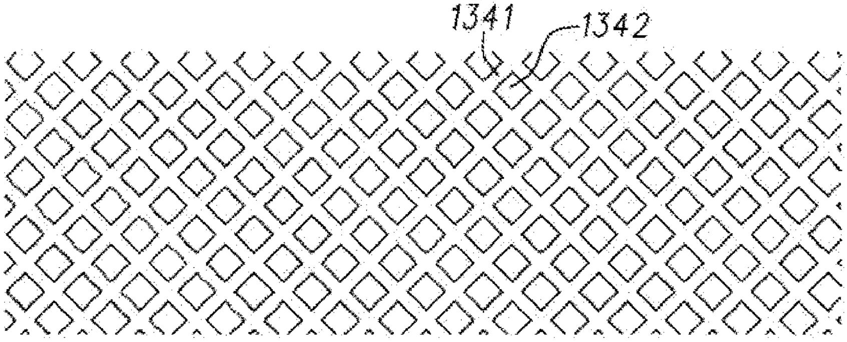
FIG. 13 illustrates a portion of a cell lattice of a face plate.
Figure 14:
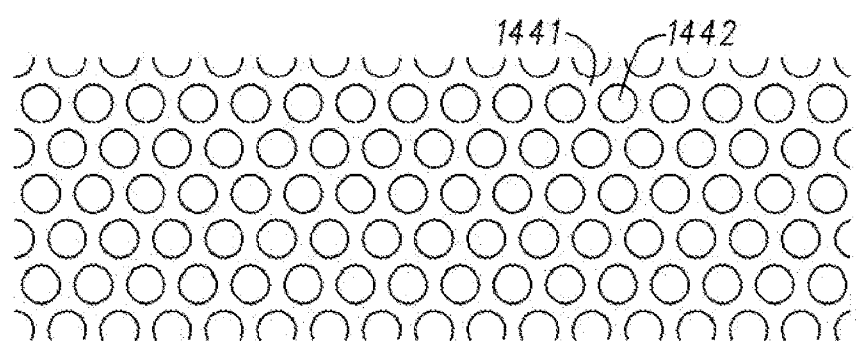
FIG. 14 illustrates a portion of a cell lattice of a face plate.
Figure 15:
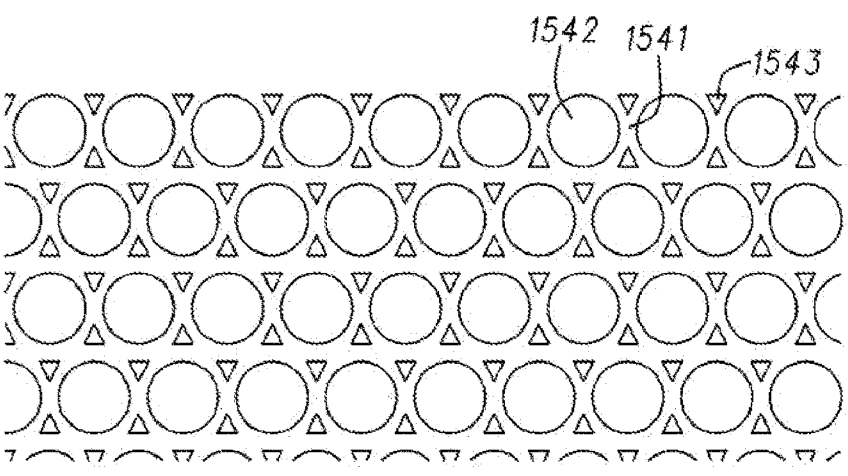
FIG. 15 illustrates a portion of a cell lattice of a face plate.

There can be other examples, however, that can comprise cell lattices with other types of geometrical shapes, dimensions, or combinations thereof. For instance skipping ahead to FIG. 12, cell lattice 1240 is presented with walls 1241 defining hexagonal cells 1242. FIG. 13 presents cell lattice 1340 with walls 1341 defining diamond or square cells 1342. FIG. 14 presents cell lattice 1440 with walls 1441 defining round or circular cells 1442. Other shapes can also be implemented in the same or other cell lattice examples, such as pentagonal cells, octagonal cells, triangular cells, and/or combinations thereof, among others. For instance, FIG. 15 presents cell lattice 1540 with walls 1541 defining circular cells 1542 interspersed with triangular cells 1543.

Figure 16:
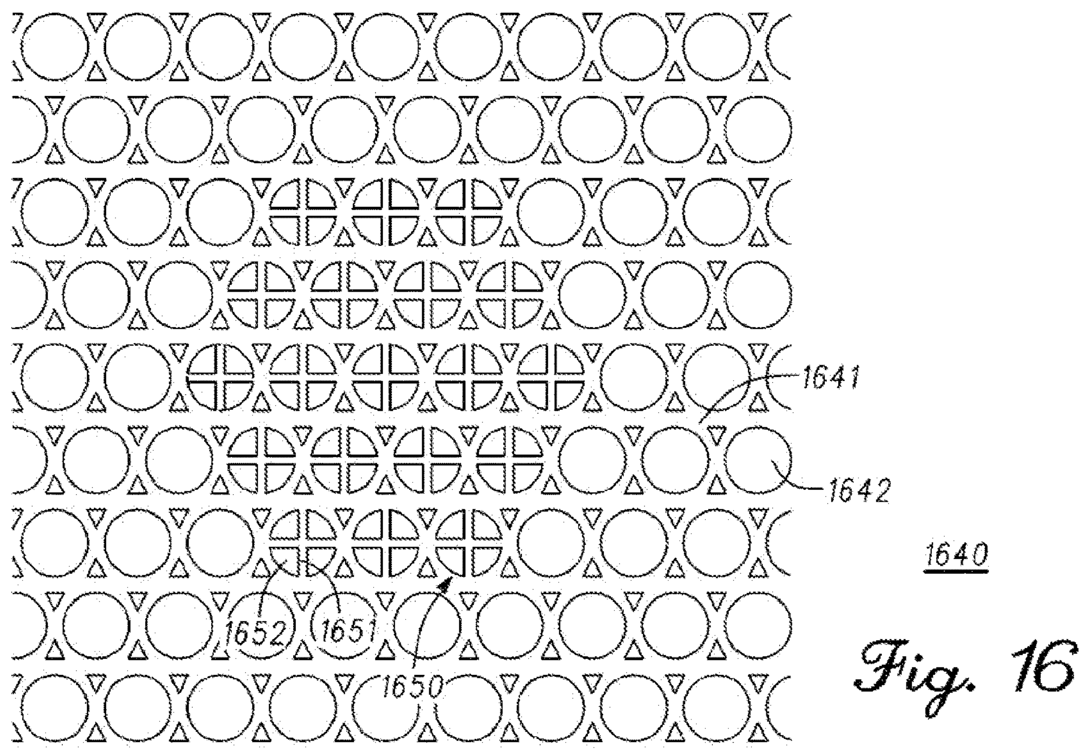
FIG. 16 illustrates a portion of a cell lattice of a face plate.

There also can be examples where individual cells of a cell lattice can comprise subcells therewithin. For example, cells 242 (FIGS. 1-4, 6) can be considered in some examples as defining subcells of larger hexagonal cells of cell lattice 240. As another example, FIG. 16 presents cell lattice 1640 with walls 1641 defining cells 1642, where cell subset 1650 of cells 1642 comprise subcells 1652 defined by subwalls 1651 within individual cells of cell subset 1650. Cell subsets such as cell subset 1650 may be located at specific locations to reinforce against stresses expected thereat. In some examples, such cell subsets may be located at or by a target strike region of a faceplate, such as target strike region 150 of face plate 100 (FIG. 1). Other combinations of cells, subcells, shapes, and/or dimensions for a cell lattice may be formed by combining different cells, subcells, shapes, and/or dimensions disclosed herein or similar thereto.

Although cell lattices 1240 (FIG. 12), 1340 (FIG. 13), 1440 (FIG. 14), 1540 (FIG. 15), 1640 (FIG. 16), can differ in some aspects, they can be otherwise similar to one or more of cell lattices 240 (FIGS. 1-4, 6), cell lattice 740 (FIG. 7), cell lattice 840 (FIG. 8), and/or cell lattice 1140 (FIG. 11).

Figure 17:
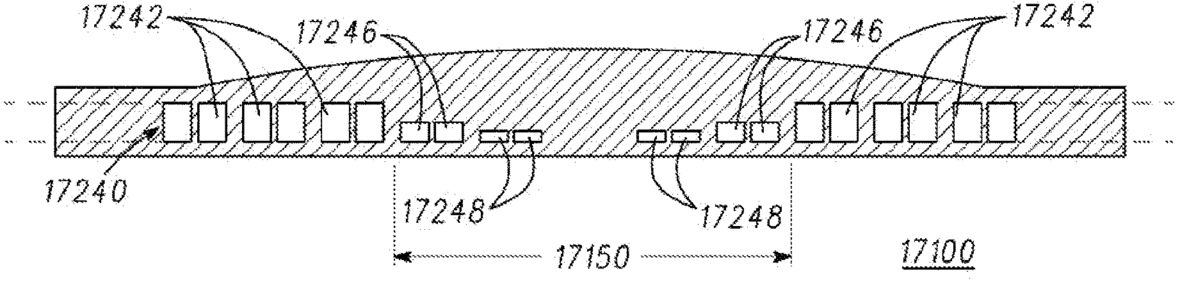
FIG. 17 illustrates a cross-sectional view of a face plate having a cell lattice with cells that vary in height amongst each other.

In some examples, the height of the cells of a cell lattice may vary from cell to cell. As an example, FIG. 17 presents a cross-sectional view of face plate 17100 with cell lattice 17240 similar to cell lattice 240 (FIGS. 1-4, 6). Cell lattice 17240, however, comprises cells that vary in height amongst each other. In the present example, the height of cells 17242 is greater than the height of cells 17246, and the height of cells 17246 is greater than the height of cells 17248. The cells of cell lattice 17240 are positioned in the present example such as to decrease in height towards a center of target strike region 17150, where greater stresses can be expected. In addition, the centermost portion of target strike region 17150 is devoid of any cell of cell lattice 17240 in the present example for further reinforcement. Other examples, however, may comprise cell lattices with cells whose heights vary in a different pattern.

Figure 18:
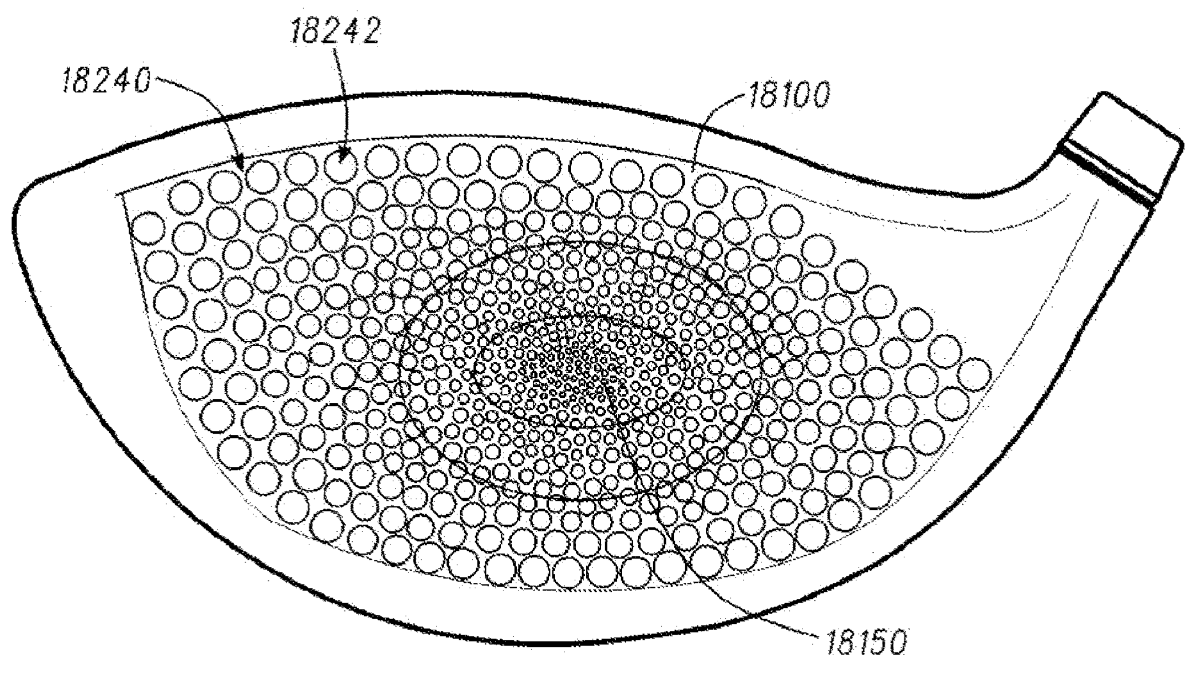
FIG. 18 presents a front "x-ray" perspective view of a faceplate comprising a cell lattice variable cell dimensions.

FIG. 18 presents a front "x-ray" perspective view of a faceplate 18100 of a golf club head. Faceplate 18100 comprises cell lattice 18240 with variable cell dimensions. In the present example, cell lattice 18240 comprises a grid of cells 18242 that decrease in size towards a center of target strike region 18150. In the same or other examples, the walls between cells 18242 of cell lattice 18240 can increase in thickness towards the center of target strike region 18150. In other examples, the size of cells 18242, and/or the thickness of the walls therebetween, can increase or decrease in size towards another region of faceplate 18100, such as towards the crown region, the sole region, the heel region, and/or the toe region.

In the same or other examples, the size of cells 18242 can decrease or increase as a function of distance from the center of target strike region 18150. In other examples, however, the size and/or concentration of cells 18242 can change relative to another feature of the faceplate, such as by increasing or decreasing from top edge to bottom edge or the face plate, and/or such as by increasing or decreasing from heel end to toe end of the face plate. In some embodiments, cells 18242 can decrease in size or dimension between approximately 1% to approximately 10% from cell to cell as the distance to the center of target strike region 18150 shortens. In the same or other embodiments, a distance between cells 18242 can increase between approximately 1% to approximately 10% from cell to cell as the distance to the center of target strike region 18150 shortens. There can also be example where the change in size or concentration of cells 18242, relative to the center of target strike region 18150, can change in a non-linear and/or a step function fashion.

Although cells 18242 of cell lattice 18240 are illustrated in FIG. 18 as circular cells, cells 18242 can be representative of other shapes, sizes, or dimensions that can be used to implement the varying cell size features described above. For instance, the cells of cell lattice 18240 could instead comprise other geometrical shapes such as triangles, hexagons, diamonds, octagons, pentagons, isogrids, and/or some combination thereof in some implementations while still varying in size or concentration across at least a portion of face plate 18100.

Figure 19:
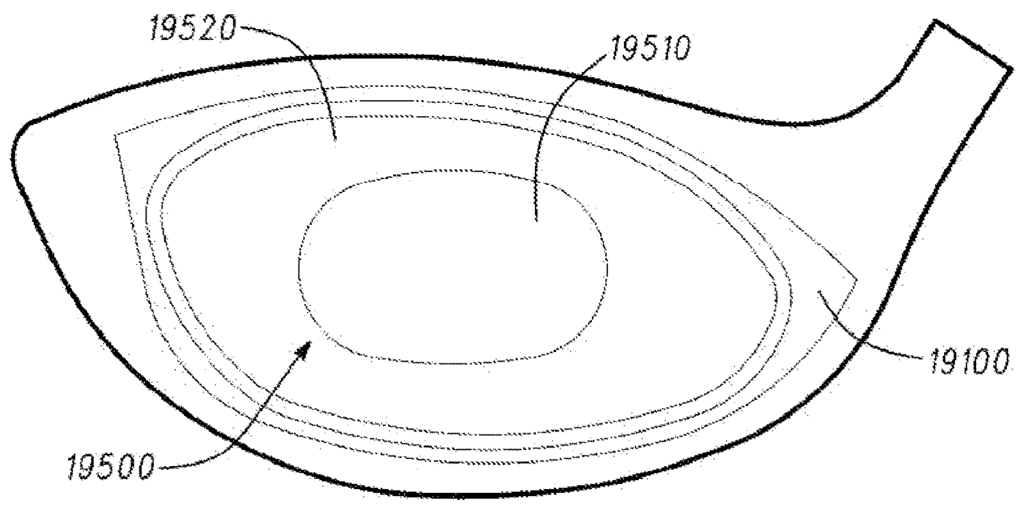
FIG. 19 illustrates a front view of a faceplate subdivided into different cell lattice regions with one or more cell lattices therewithin.

FIG. 19 illustrates a front view of faceplate 19100 of a golf club head, where faceplate 19100 is subdivided into different cell lattice regions 19500 with one or more cell lattices therewithin. In the present example, cell lattice regions 19500 comprise center lattice region 19510 and periphery lattice region 19520, where center lattice region 19510 is located at a center region of face plate 19100, bounded by periphery lattice region 19520 around its perimeter. Center lattice region 19510 can be stiffer than periphery lattice region 19520, which is more elastic in the present example, where the elasticity of cell lattice regions 19500 can be fine tuned by implementing appropriate cell patterns, features, and/or dimensions to achieve a desired elastic modulus range. In some examples, having center lattice region 19510 stiffer relative to periphery lattice region 19520 can allow more forgiveness for golf shots not hit at the target strike region of the face plate. In the same or other examples, a characteristic time (CT) of a golf club can also be adjusted or controlled by adjusting the flexibility or elasticity of different portions of the face plate such as cell lattice regions 19500. There can be other examples, however, where the center lattice region 19510 need not be stiffer than periphery lattice region 19520, and/or where center lattice region 19510 and periphery lattice region 19520 can comprise a substantially similar stiffness or modulus of elasticity.

In some examples, center lattice region 19510 may be similar to or correspond to target strike region 150 of face plate 100 (FIG. 1), or to other target strike regions of other face plates described herein. In the present example, cell lattice regions 19500 can comprise or be similar to one or more of the cell lattices described herein, but can differ from each other with respect to at least one feature. As an example, center lattice region 19510 can comprise a cell lattice similar to isogrid cell lattice 240 (FIGS. 1-4, 6), while periphery lattice region 19520 can comprise a cell lattice similar to hexagonal cell lattice 1240 (FIG. 12). As another example, center lattice region 19510 can comprise a cell lattice similar to circular cell lattice 1440 (FIG. 14), while periphery lattice region 19520 can comprise a cell lattice similar to multi-shaped cell lattice 1540 (FIG. 15). As yet another example, some cells of cell lattice regions 19500 can comprise subcells and/or subwalls. For instance, cells of center lattice region 19510 can comprise subcells and subwalls similar to cell subset 1650 (FIG. 16), while cells of periphery lattice region 19520 need not comprise subcells or subwalls. In the same or other examples, cell lattice regions 19500 can comprise cells of different heights. For instance, center lattice region 19510 can comprise cells of a reduced height, such as the cells of target strike region 17150 in FIG. 17, while periphery lattice region 19520 can comprise cells of greater height than those of periphery lattice region 19520. In the same or other examples, center lattice region 19510 may be partially or totally devoid of cells, while surrounded by the cells of periphery lattice region 19520.

Figures 20, 21, 22:
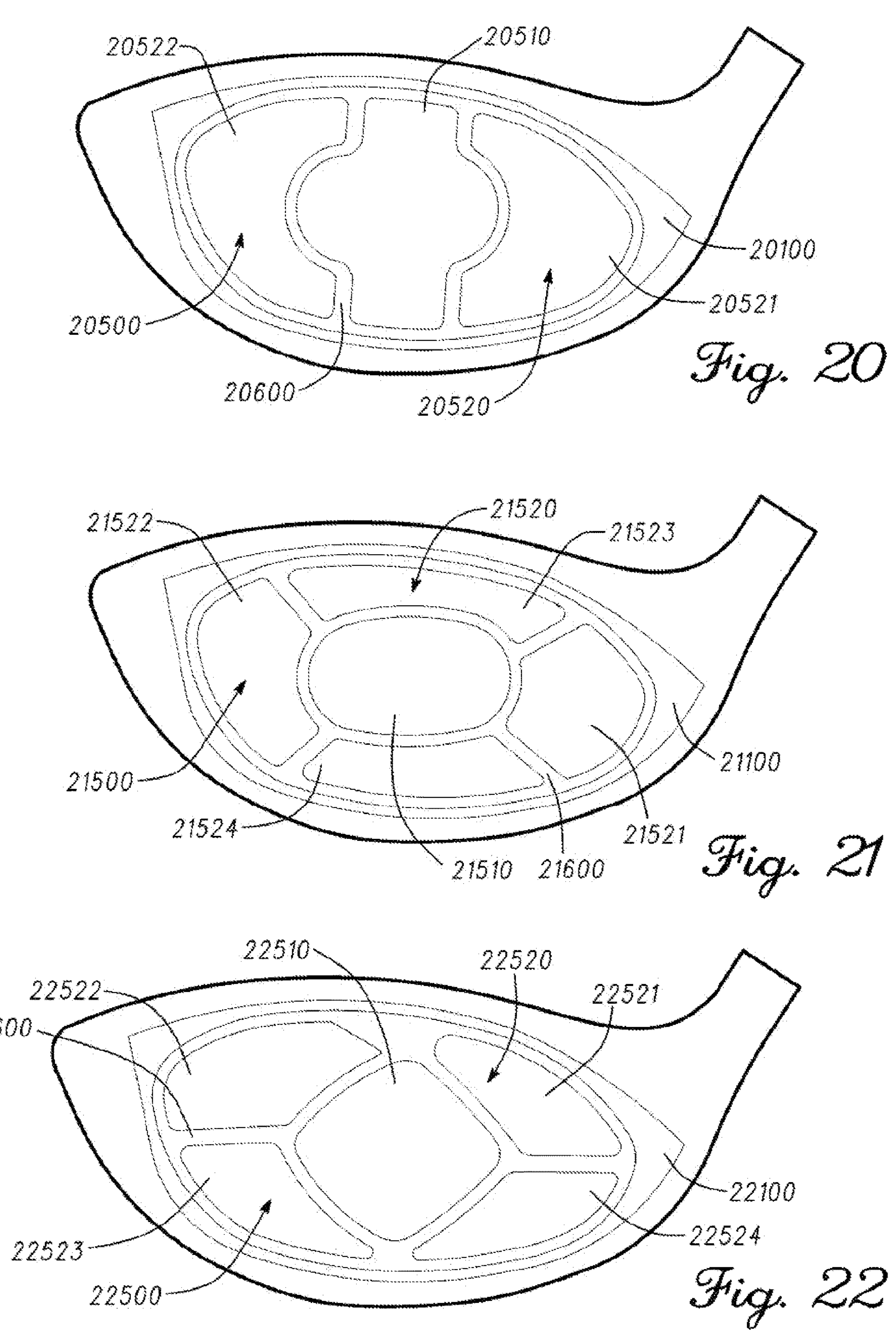
FIG. 20 illustrates a front view of a faceplate subdivided into different cell lattice regions with one or more cell lattices therewithin.
FIG. 21 illustrates a front view of a faceplate subdivided into different cell lattice regions with one or more cell lattices therewithin.
FIG. 22 illustrates a front view of a faceplate subdivided into different cell lattice regions with one or more cell lattices therewithin.

FIG. 20 illustrates a front view of faceplate 20100 of a golf club head, where faceplate 20100 is subdivided into different cell lattice regions 20500 with one or more cell lattices therewithin. In the present example, cell lattice regions 20500 comprise center lattice region 20510 and periphery lattice regions 20520, where periphery lattice regions 20520 comprise heel lattice region 20521 and toe lattice region 20522. Center lattice region 20510 is located at a center region of face plate 20100, bounded at least partially by periphery lattice regions 20520. Cell lattice regions 20500 can comprise or be similar to one or more of the cell lattices described herein, but can differ from each other with respect to at least one feature, such as in terms of stiffness, elasticity, and/or type of cell lattice comprised. As an example, center lattice region 20510 extends towards the top and bottom ends of faceplate 20100, and can be otherwise similar to center lattice region 19510 (FIG. 19), while periphery lattice regions 20520 can be similar to periphery lattice region 19520 (FIG. 19). In the present examples, the cell lattices of periphery lattice regions 20520 can be similar to each other, but there can be other examples where such cell lattices may differ from each other.

In the present example, center lattice region 20510 can be stiffer than heel lattice region 20521 and toe lattice region 20522, while the stiffnesses of heel lattice region 20521 and of toe lattice region 20522 can be similar to each other. There can also be examples, however, where the stiffnesses of heel lattice region 20521 can be greater than the stiffness of toe lattice region 20522, or vice-versa. The ability to establish such different stiffness options for the different regions of faceplate 20100 can permit, for example, an optimization of ball speed due to differences in club head speed across the faceplate as induced by club head rotation about the golf shaft axis during swinging, the offsetting of a bias in average impact location, and/or the fine-tuning of the shape or position of the club head's target strike region. In addition, cell lattice regions 20500 are separated from each other by one or more boundary channels 20600 in the present example. Boundary channels 20600 are devoid of a cell lattice therewithin, but there also can be examples where boundary channels 20600 can comprise a cell lattice similar to one or more of the cell lattices described herein. In other examples, however, faceplate 20100 can be devoid of boundary channels 20600, such that cell lattice regions 20500 contact or merge into each other.

FIG. 21 illustrates a front view of faceplate 21100 of a golf club head, where faceplate 21100 is subdivided into different cell lattice regions 21500 with one or more cell lattices therewithin. In the present example, cell lattice regions 21500 comprise center lattice region 21510 and periphery lattice regions 21520, where periphery lattice regions 21520 comprise heel lattice region 21521, toe lattice region 21522, top lattice region 21523, and bottom lattice region 21524. Center lattice region 21510 is located at a center region of face plate 21100, bounded at least partially by periphery lattice regions 21520. Cell lattice regions 21500 can comprise or be similar to one or more of the cell lattices described herein, but can differ from each other with respect to at least one feature, such as in terms of stiffness, elasticity, and/or type of cell lattice comprised. As an example, center lattice region 20510 can be similar to center lattice region 19510 (FIG. 19) and/or to center lattice region 20510 (FIG. 20). Periphery lattice regions 21520 can be similar to periphery lattice region 19520 (FIG. 19) and/or to periphery lattice regions 20520 (FIG. 20). In the present example, the cell lattices comprised by periphery lattice regions 21520 differ from each other. For example, the cell lattices of top lattice region 21523 and bottom lattice region 21524 differ from the cell lattices of heel lattice region 21521 and toe lattice region 21522. In the same or other examples, the cell lattice of top lattice region 21523 can be similar to the cell lattice of bottom lattice region 21524, while the cell lattice of toe lattice region 21522 can be similar to the cell lattice of heel lattice region 21521. In other examples, however, the cell lattices of each of top lattice region 21523, bottom lattice region 21524, toe lattice region 21522, and heel lattice region 21521 can all be similar to each other.

In the present example, center lattice region 21510 can be stiffer than periphery lattice regions 21520. The stiffnesses of periphery lattice regions 21520 can be similar to each other or differ from each other, depending on the embodiment. For example, the stiffness of top lattice region 21523 and of bottom lattice region 21524 may be stiffer than the stiffnesses of heel lattice region 21521 and of toe lattice region 21522, or vice-versa. There can also be examples where each of periphery lattice regions 21520 can comprise a different stiffness. The ability to establish such different stiffness options for the different regions of faceplate 21100 can permit further alternatives regarding benefits similar to those described above with respect to faceplate 20100. In the present example, cell lattice regions 21500 are separated from each other by one or more boundary channels 21600, which can be similar to boundary channels 20600 (FIG. 20).

FIG. 22 illustrates a front view of faceplate 22100 of a golf club head, where faceplate 22100 is subdivided into different cell lattice regions 22500 with one or more cell lattices therewithin. In the present example, cell lattice regions 22500 comprise center lattice region 22510 and periphery lattice regions 22520, where periphery lattice regions 22520 comprise top-heel lattice region 22521, top-toe lattice region 22522, bottom-toe lattice region 22523, and bottom-heel lattice region 22524. Center lattice region 22510 is located at a center region of face plate 21100, bounded at least partially by periphery lattice regions 22520. Cell lattice regions 22500 can comprise or be similar to one or more of the cell lattices described herein, but can differ from each other with respect to at least one feature, such as in terms of stiffness, elasticity, and/or type of cell lattice comprised. In some examples, center lattice region 22510 can be similar to center lattice region 21510 (FIG. 21), while periphery lattice regions 22520 can be similar to periphery lattice regions 21520, but shifted in terms of location across faceplate 22100. In one example, the stiffnesses and/or cell lattices of top-heel lattice region 22521 and of top-toe lattice region 22522 may differ from the stiffnesses and/or cell lattices of bottom-heel lattice region 22524 and of bottom-toe lattice region 22523. In another example, the stiffnesses and/or cell lattices of top-toe lattice region 22522 and of bottom-toe lattice region 22523 may differ from the stiffnesses and/or cell lattices of top-heel lattice region 22521 and of bottom-heel lattice region 22524. There can also be embodiments where the stiffnesses and/or cell lattices of each of periphery lattice regions 22520 differ from each other. The ability to establish such different stiffness options for the different regions of faceplate 22100 can permit further alternatives regarding benefits similar to those described above with respect to faceplate 20100 and/or 21100. In the present example, cell lattice regions 22500 are separated from each other by one or more boundary channels 22600, which can be similar to boundary channels 20600 (FIG. 20).

Various embodiments of the cell lattice structures described herein can be applied to a golf club head 10 to reduce the mass of various portions of the golf club head. The cell lattice of the golf club head 10 can be similar to cell lattice 240 of midsection 230 (FIGS. 2-6), to one or more of cell lattices 740 (FIG. 7), 840 (FIG. 8), 940 (FIG. 9), 1140 (FIG. 11), 1240 (FIG. 12), 1340 (FIG. 13), 1440 (FIG. 14), 1540 (FIG. 15), 1640 (FIG. 16), 17240 (FIG. 17), and/or 18240 (FIG. 18), to one or more of the cell lattices comprised by the cell lattice regions of faceplate 19100 (FIG. 19), 20100 (FIG. 20), 21100 (FIG. 21), and/or 22100 (FIG. 22), and/or to other cell lattice variations similar to those described herein. The cell lattice structures may be applied to various portions of the golf club head 10 such as a faceplate, a rear portion, a top rail, a heel portion, or a toe portion. The cell lattice structures can reduce the mass of various portions of the golf club head 10 to improve the mass characteristics of the golf club head 10.

Referring to FIGS. 29-39, the golf club head can be an iron-type golf club head 29000. The golf club head 29000 comprises a top rail 29200, a sole 29300, a front side 29400, a rear side 29600, a toe end 29700, a heel end 29800, and a hosel 29650. The front side 29400 further comprises a faceplate 29100 defining a striking surface configured to impact a golf ball (not shown) and further defining a back surface opposite the striking surface. The rear side 29600 defines a rear portion 29900 that is spaced rearwardly from the faceplate 29100 by the sole 29300 to define a cavity 29750 within the golf club head 29000. The cavity 29750 is located between the faceplate 29100 and the rear portion 29900. In some embodiments, the cavity 29750 can be open to the exterior of the golf club head 29000, providing the golf club head 29000 as a “cavity-back” golf club head. In other embodiments, a badge 29751 or other covering element can be located within the cavity 29750 to give the appearance of a “hollow body” golf club head and/or to control the mass characteristics, sound characteristics, or aesthetics of the golf club head 29000.

Figure 31:
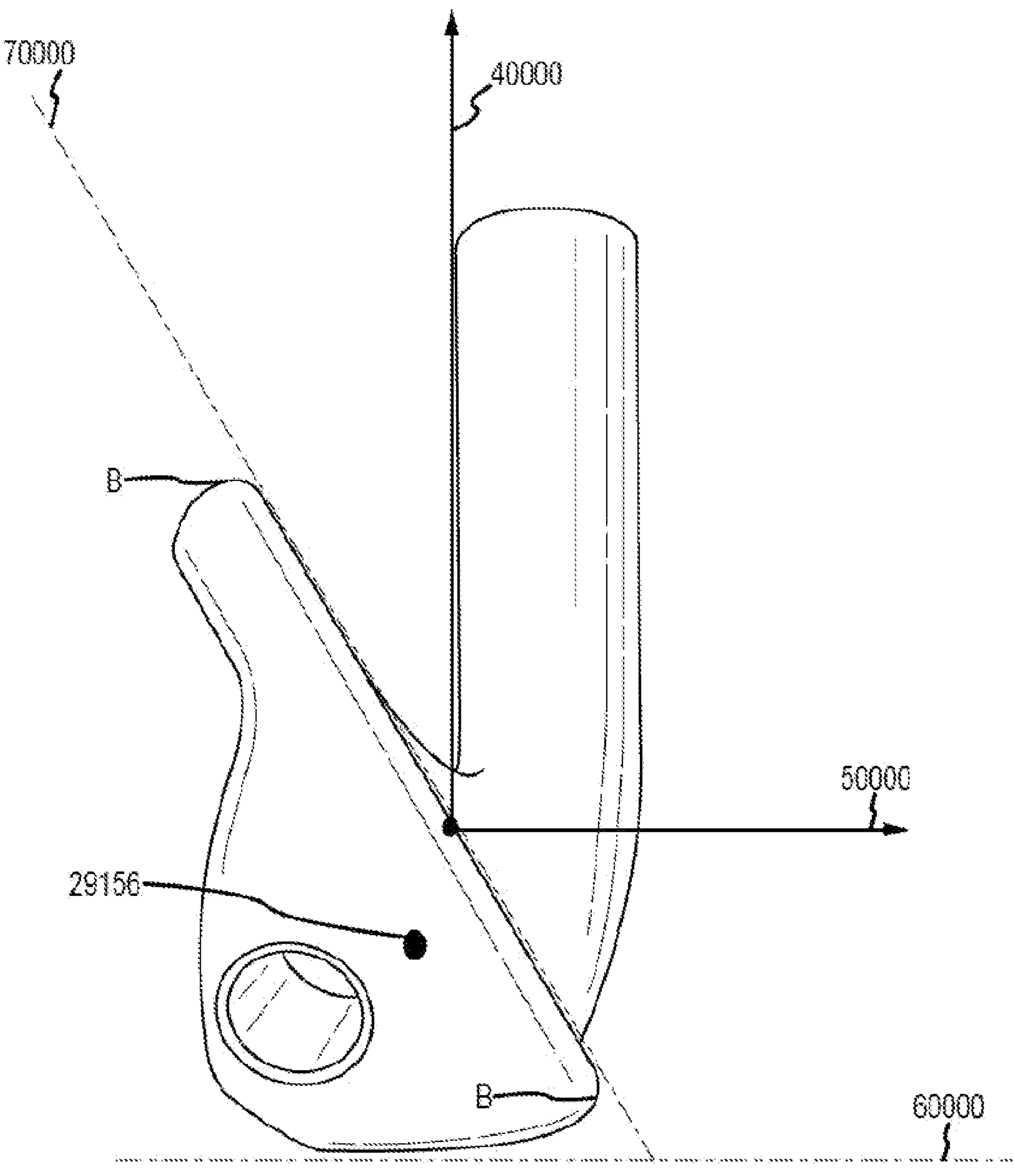
FIG. 31 illustrates a toe side view of the golf club head of FIG. 29.

The golf club head 29000 further comprises a coordinate system having an origin located at a geometric center 29155 of the striking surface, the coordinate system comprising an X-axis 30000, a Y-axis 40000, and a Z-axis 50000. The X-axis 30000 extends through the geometric center 29155 of the striking surface in a direction from the heel side 29800 to the toe side 29700 of the club head 29000 (with the toe-ward direction of the X-axis 30000 being positive). The Y-axis 40000 extends through the geometric center 29155 of the striking surface in a direction from the crown to the sole 29300 of the club head 29000 and perpendicular to the X-axis 30000 (with the crown-ward direction of the Y-axis 40000 being positive). The Z-axis 50000 extends through the geometric center 29155 of the striking surface in a direction from the front end to the back end of the club head 29000 and perpendicular to the X-axis 30000 and the Y-axis 40000 (with the frontward direction of the Z-axis 50000 being positive). A center of gravity (CG) of the club head 29000 can be measured with respect to this coordinate system (X-axis 30000, Y-axis 40000, Z-axis 50000). The golf club head 29000 further defines a loft plane 70000 tangent to the geometric center 29155 of the striking surface. FIG. 31 depicts a ground plane 60000 for reference of the golf club head 29000. The ground plane 60000 is tangent to the sole 29300 of the golf club head 29000 when the golf club head 29000 is at an address position.

At least one portion of the golf club head 29000 comprises one or more cell lattice regions 29500 comprising a cell lattice 29040. The cell lattice 29040 of the golf club head 29000 can be similar to cell lattice 240 of midsection 230 (FIGS. 2-6), to one or more of cell lattices 740 (FIG. 7), 840 (FIG. 8), 940 (FIG. 9), 1140 (FIG. 11), 1240 (FIG. 12), 1340 (FIG. 13), 1440 (FIG. 14), 1540 (FIG. 15), 1640 (FIG. 16), 17240 (FIG. 17), and/or 18240 (FIG. 18), to one or more of the cell lattices comprised by the cell lattice regions of faceplate 19100 (FIG. 19), 20100 (FIG. 20), 21100 (FIG. 21), and/or 22100 (FIG. 22), and/or to other cell lattice variations similar to those described herein. The cell lattice 29040 can be configured to reduce the mass of the one or more portions of the golf club head 29000, therefore creating discretionary mass that can be redistributed throughout other parts of the golf club head 29000. In some embodiments, the one or more cell lattice regions 29500 can reduce the mass of the golf club head 29000 and create between 10 and 25 grams of discretionary mass. In some embodiments, the one or more cell regions 29500 can create between 10 and 11 grams, between 11 and 12 grams, between 12 and 13 grams, between 13 and 14 grams, between 14 and 15 grams, between 15 and 16 grams, between 16 and 17 grams, between 17 and 18 grams, between 18 and 19 grams, between 19 and 20 grams, between 20 and 21 grams, between 21 and 22 grams, between 22 and 23 grams, between 23 and 24 grams, or between 24 and 25 grams of discretionary mass.

In some embodiments, one or more cell lattice 29040 structures can be applied to a faceplate 29100 of the golf club head 29000, similar to one or more of faceplates 100 (FIG. 1-2), 17100 (FIG. 17), 18100 (FIG. 18), 19100 (FIG. 19), 20100 (FIG. 20), 21100 (FIG. 21), and/or 22100 (FIG. 22). The cell lattice 29040 can serve to reduce the mass of the faceplate 29100 of the golf club head 29000, therefore creating discretionary mass that can be redistributed throughout other parts of the golf club head 29000. In some embodiments, the cell lattice 29040 can reduce the mass of the faceplate 29100 by between 8 and 12 grams. In some embodiments, the cell lattice 29040 can reduce the mass of the rear portion 29900 by between 8 and 8.5 grams, between 8.5 and 9 grams, between 9 and 9.5 grams, between 9.5 and 10 grams, between 10 and 10.5 grams, between 10.5 and 11 grams, between 11 and 11.5 grams, or between 11.5 and 12 grams.

In some embodiments, one or more cell lattice 29040 structures can be applied to the rear portion 29900 of the golf club head 29000. In some embodiments, the cell lattice 29040 structure formed within the rear portion 29900 may be similar to any of the cell lattices described above. The cell lattice 29040 can serve to reduce the mass of the rear portion 29900, therefore creating discretionary mass that can be redistributed throughout other parts of the golf club head 29000. In some embodiments, the cell lattice 29040 can reduce the mass of the rear portion 29900 by between 10 and 14 grams. In some embodiments, the cell lattice 29040 can reduce the mass of the rear portion 29900 by between 10 and 10.5 grams, between 10.5 and 11 grams, between 11 and 11.5 grams, between 11.5 and 12 grams, between 12 and 12.5 grams, between 12.5 and 13 grams, between 13 and 13.5 grams, or between 13.5 and 14 grams.

In some embodiments, one or more cell lattice structures can be applied to the top rail 29200 of the golf club head 29000. In some embodiments, the cell lattice structures formed within the top rail 29200 may be similar to any of the cell lattices described above. The cell lattice 29040 can serve to reduce the mass of the top rail 29200, therefore creating discretionary mass that can be redistributed throughout other parts of the golf club head 29000. In some embodiments, the cell lattice 29040 can reduce the mass of the top rail 29200 by between 0.5 and 2 grams. In some embodiments, the cell lattice 29040 can reduce the mass of the top rail 29200 by between 0.5 and 0.75 grams, between 0.75 grams and 1 gram, between 1 and 1.25 grams, between 1.25 and 1.5 grams, between 1.5 and 1.75 grams, or between 1.75 and 2 grams.

The mass savings produced by the cell lattice(s) 29040 allows for discretionary mass to be redistributed to control the mass characteristics of the golf club head 29000 without changing the overall mass of the golf club head 29000. In some embodiments, this discretionary mass can be redistributed by altering the size, shape, or density of the integrally formed portions of the golf club head 29000, such as the faceplate 29100, the top rail 29200, the sole 29300, the rear portion 29900, the toe 29700, or the heel 29800. In some embodiments, the discretionary mass can be redistributed by including various weight features in certain portions of the golf club head 29000 without altering the overall size, shape, or material of the golf club head 29000.

Figure 37:
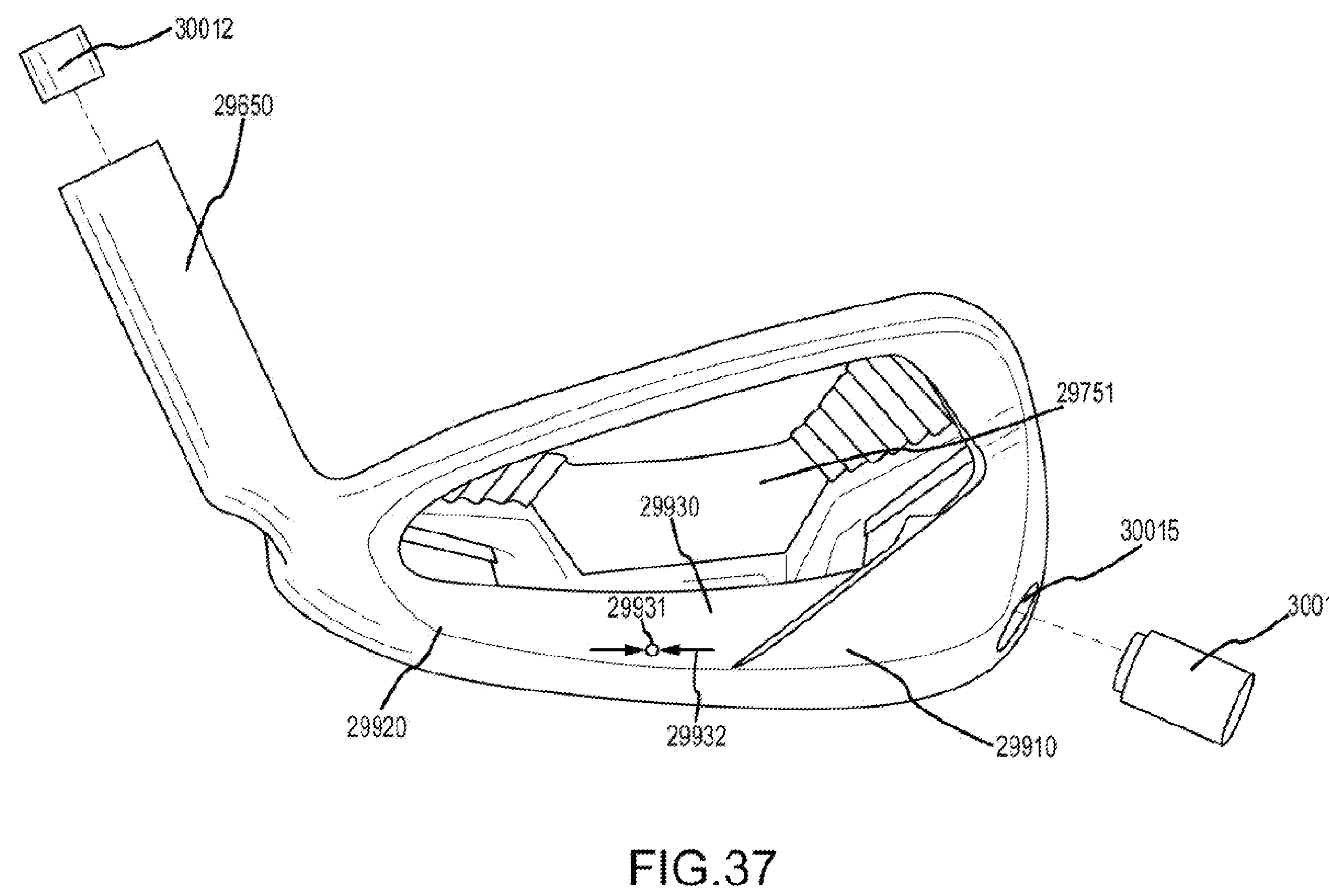
FIG. 37 illustrates a rear view of an alternative embodiment of a golf club head according to the present invention.

In some embodiments, referring to FIG. 37, the discretionary mass can be reintroduced to the golf club head 29000 through a toe screw weight 30014 and a tip weight 30012. The toe screw weight 30014 can be formed of a high-density material and can be inserted into a toe screw weight port 30015 formed in the toe 29700 of the golf club head 29000. The tip weight 30012 can be formed of a high-density material and can be located within an internal bore 29651 of the hosel 29650. Introducing the discretionary mass in the form of the tip weight 30012 and the toe screw weight 30014 distributes the discretionary mass toward the extreme heel 29800 and toe ends 29700 of the golf club head 29000, creating a golf club head with improved perimeter weighting.

Figure 38:
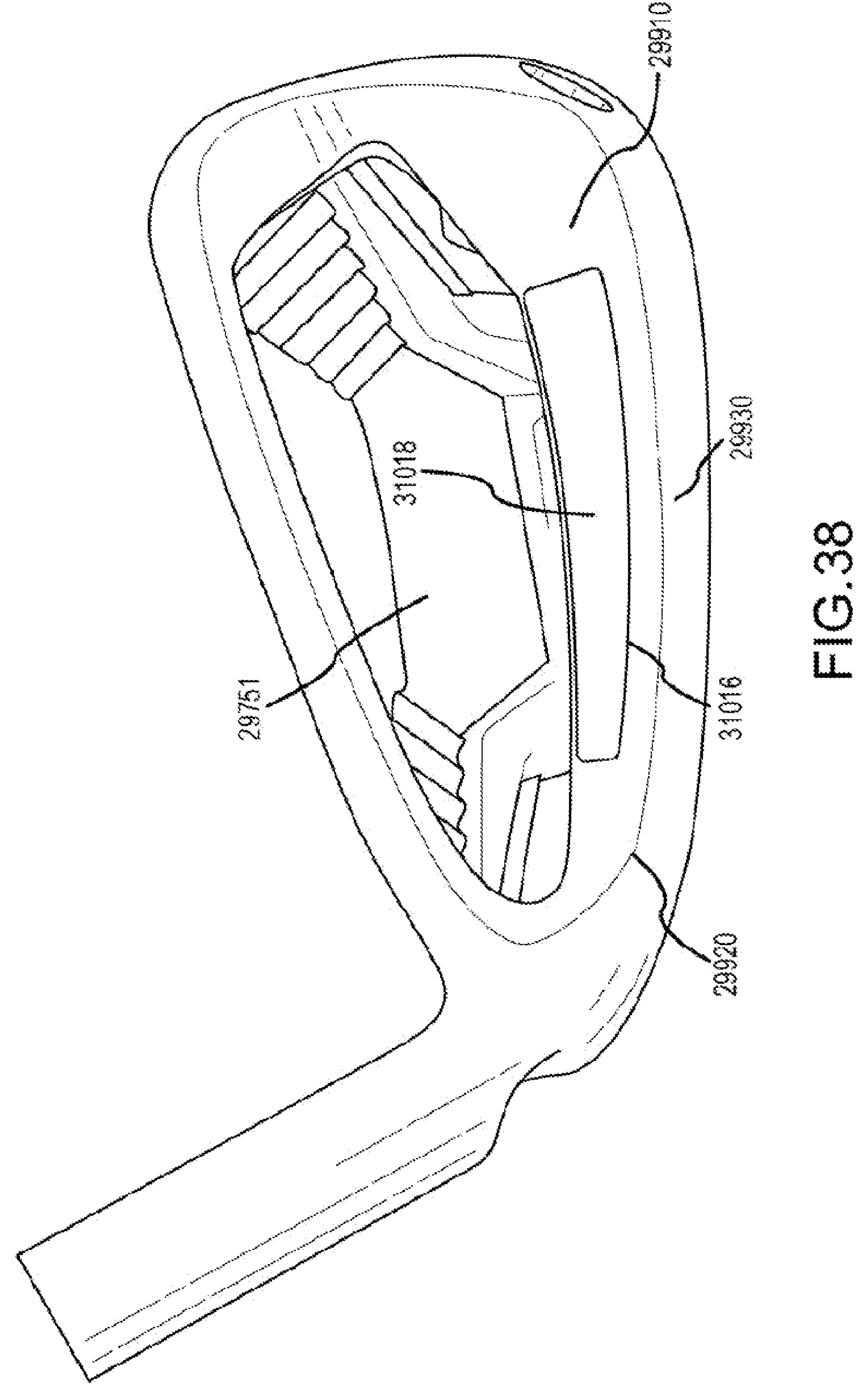
FIG. 38 illustrates a rear view of another alternative embodiment of a golf club head according to the present invention.
Figure 39:
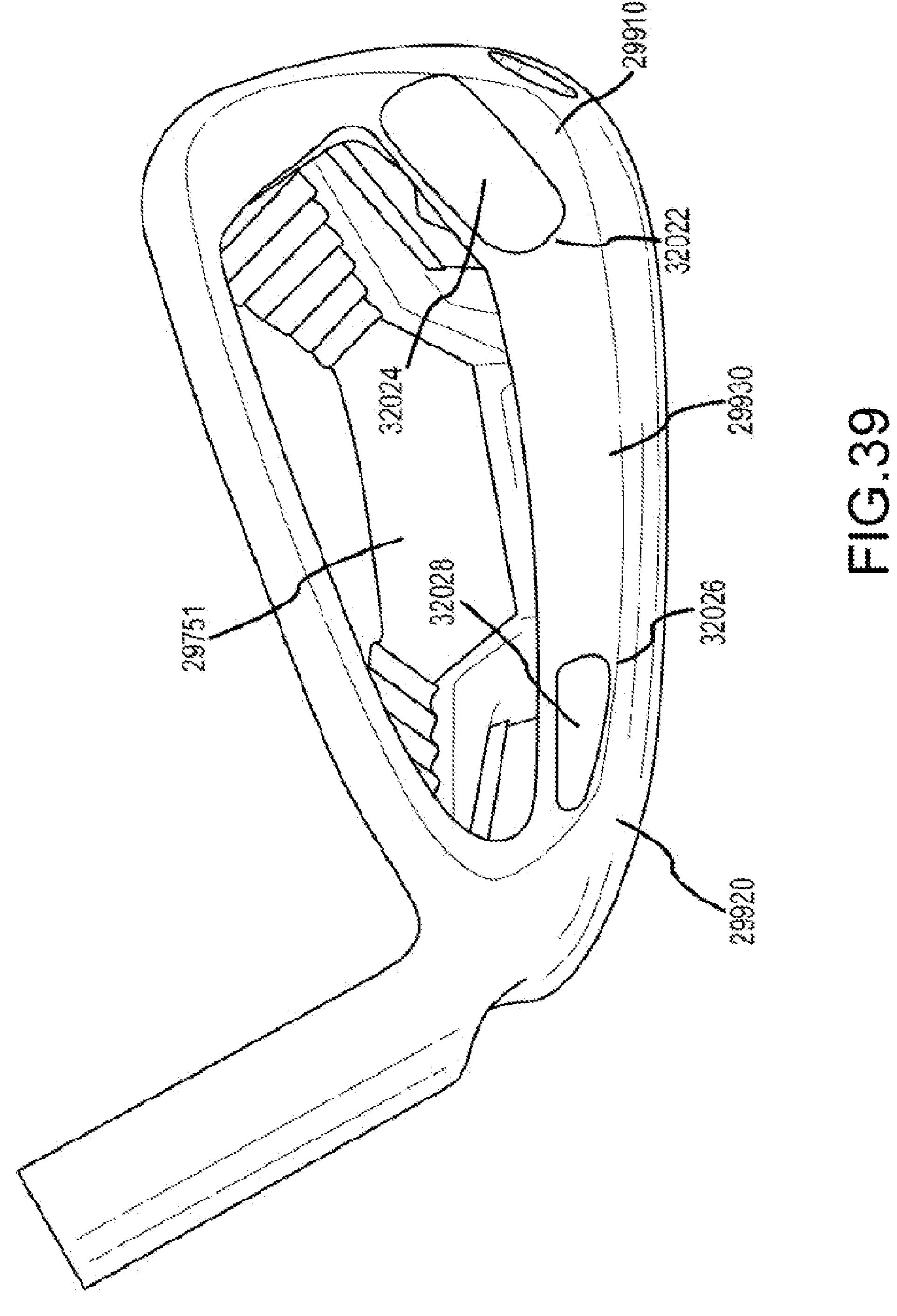
FIG. 39 illustrates a rear view of another alternative embodiment of a golf club head according to the present invention.
Figures 40A, 40B:
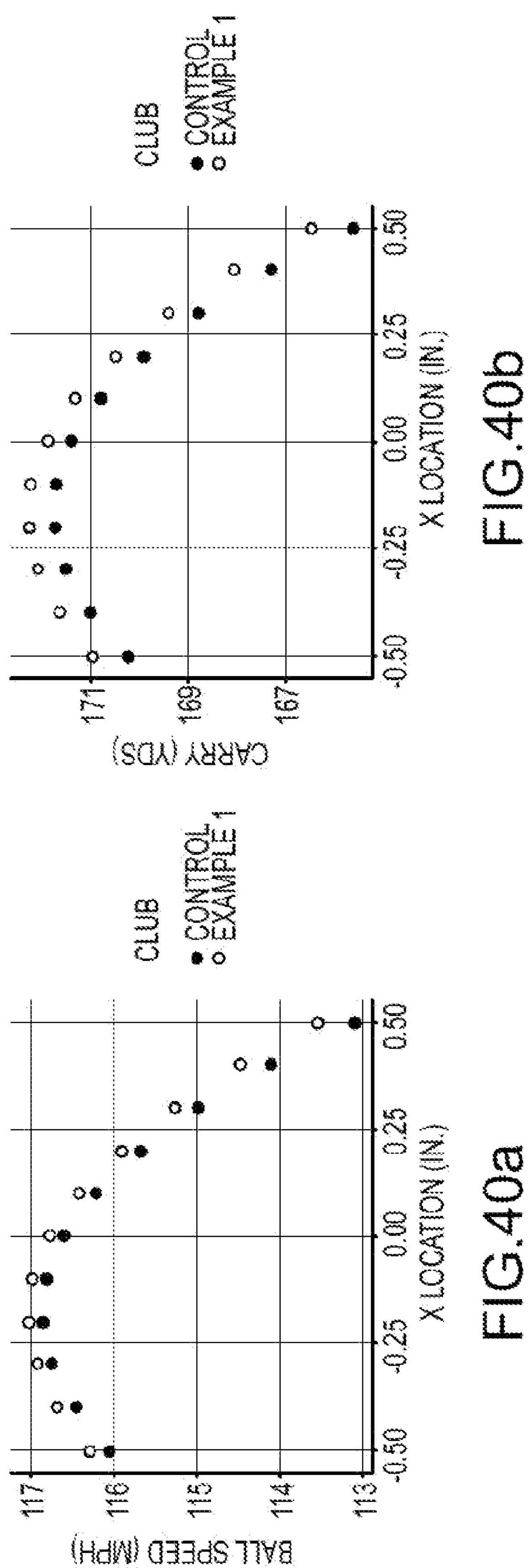
FIG. 40A illustrates a graphic showing a comparison in ball speed between an exemplary golf club head according to the present invention and a control golf club head.
FIG. 40B illustrates a graphic showing a comparison in golf ball carry between an exemplary golf club head according to the present invention and a control golf club head.
Figures 40C, 40D:
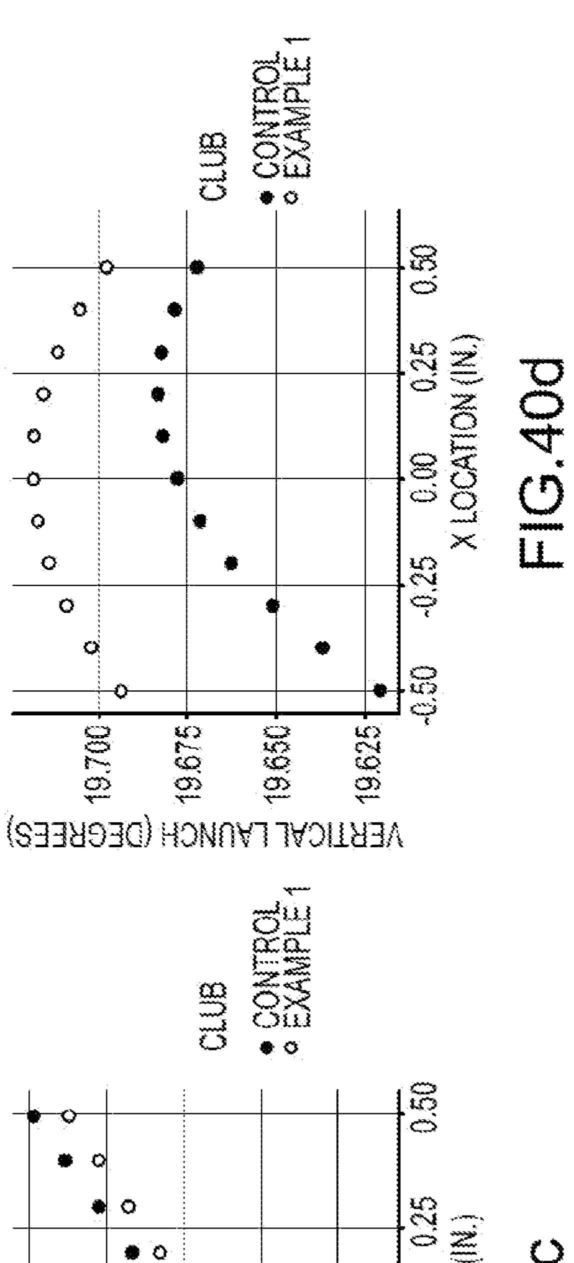
FIG. 40C illustrates a graphic showing a comparison in sidespin between an exemplary golf club head according to the present invention and a control golf club head.
FIG. 40D illustrates a graphic showing a comparison in vertical launch between an exemplary golf club head according to the present invention and a control golf club head.

In some embodiments, referring to FIGS. 38-39, the discretionary mass can be reintroduced to the golf club head 29000 through one or more rear weights 31018. The one or more rear weights 31018 can be formed of a high-density material and can be inserted into a corresponding weight port 31016 formed in the rear portion 29900 of the golf club head 29000. In some embodiments, the rear portion 29900 may comprise a single rear weight 31018 located within a central section of the rear portion 29900. In some embodiments, the rear portion 29900 may comprise multiple rear weights. The rear portion 29900 may comprise a toe-side rear weight 32024 located within a toe section 29910 of the rear portion 29900 and a heel-side rear weight 32028 located within a heel section 29920 of the rear portion 29900. Introducing the discretionary mass in the form of one of more rear weight 31018 distributes a greater amount of mass toward the rear side 29600 and/or the heel 29800 and toe sides 29700 of the golf club head 29000.

Figure 32:
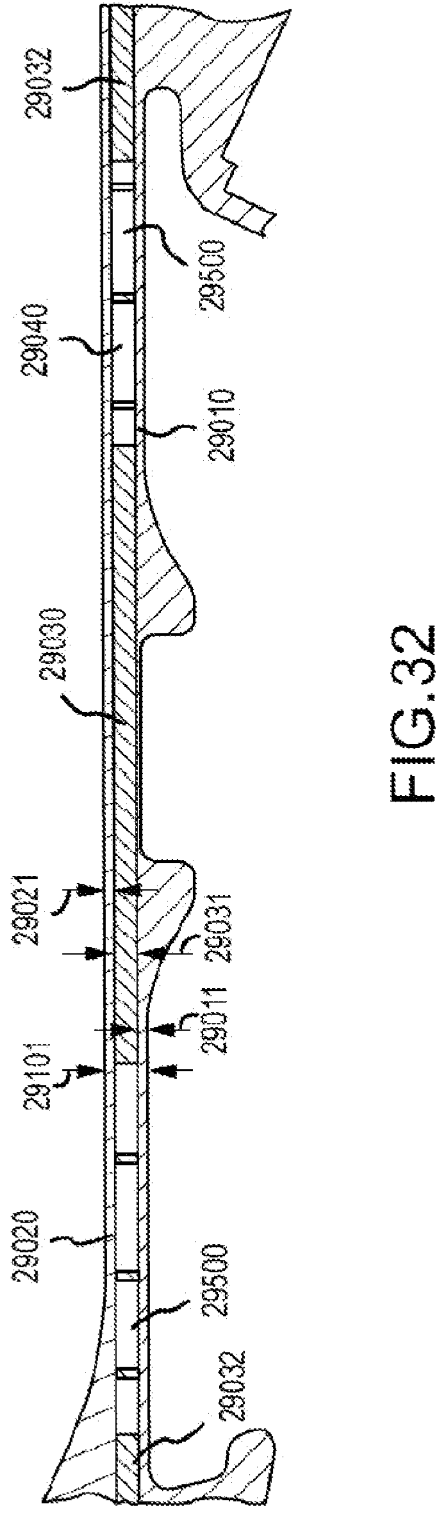
FIG. 32 illustrates a cross-sectional view of the faceplate of the golf club head of FIG. 29 taken along line A-A.
Figure 33:
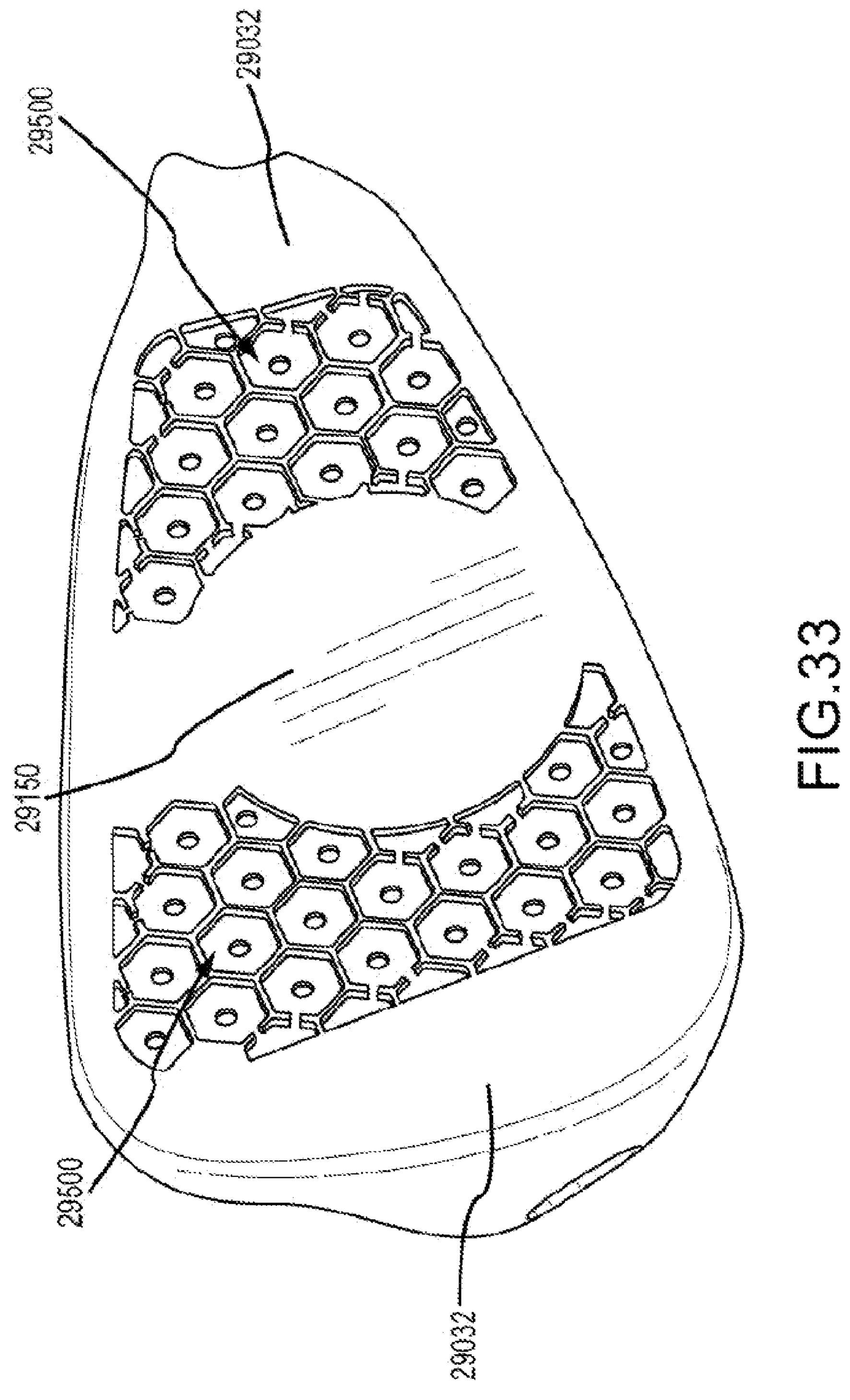
FIG. 33 illustrates a cross-sectional view of the faceplate of the golf club head of FIG. 31 taken along line B-B.
Figure 34:
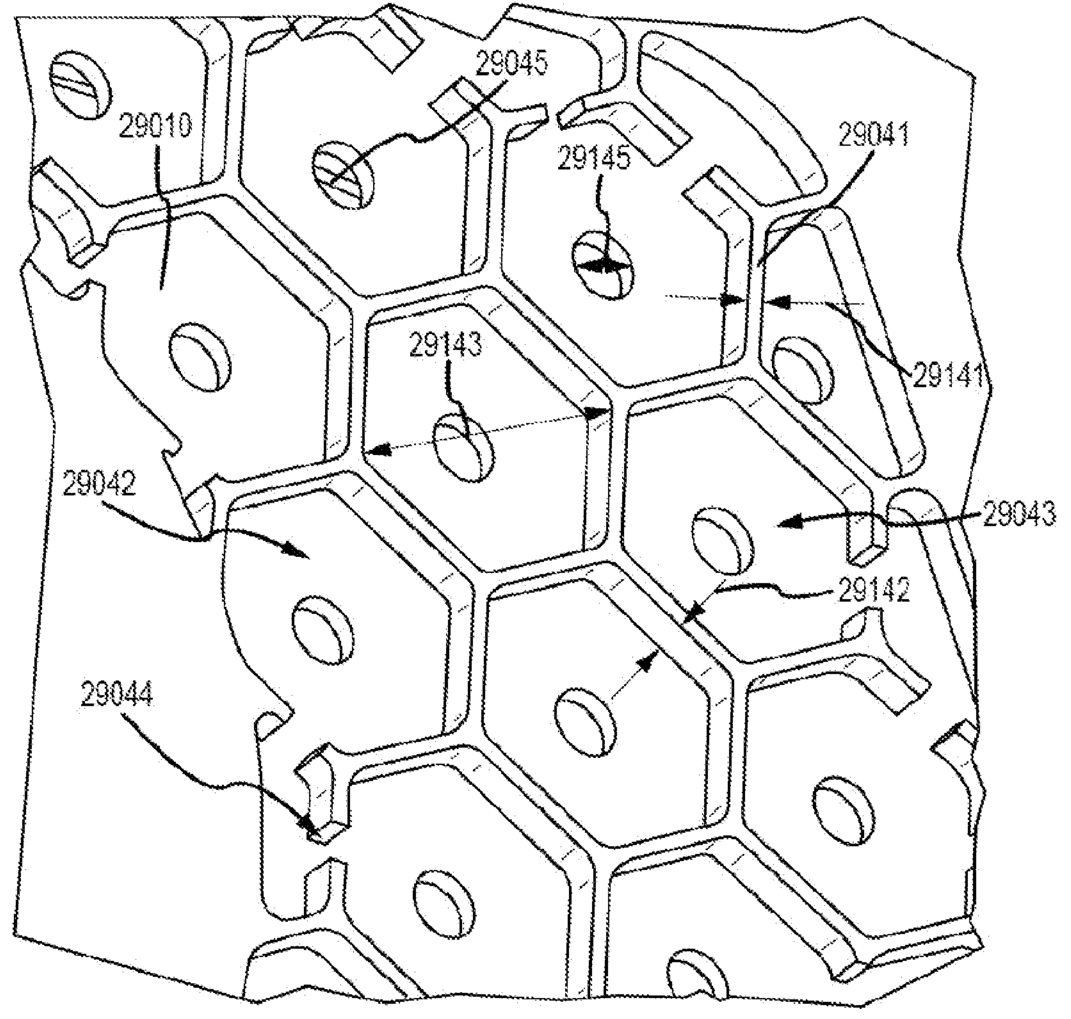
FIG. 34 illustrates an enhanced view of the cell lattice of FIG. 33.

In one example, referring to FIG. 32-34, the faceplate 29100 of golf club head 29000 comprises an internal cell lattice 29040 structure. The faceplate 29100 comprises an outer skin 29020 and an inner skin 29010. The outer skin 29020 of faceplate 29100 can be similar to outer skin 120 and/or outer skin 1820. An outer surface of the outer skin 29020 provides a striking surface for the golf club head 29000. The outer skin 29020 comprises a thickness 29021. The thickness 29021 of the outer skin 29020 can be between 0.010 inches and 0.030 inches. In some embodiments, the thickness 29021 of the outer skin 29020 can be between 0.010 inches and 0.012 inches, 0.012 inches and 0.014 inches, 0.014 inches and 0.016 inches, 0.016 inches and 0.018 inches, 0.018 inches and 0.020 inches, 0.020 inches and 0.022 inches, 0.022 inches and 0.024 inches, 0.024 inches and 0.026 inches, 0.026 inches and 0.028 inches, or 0.028 inches and 0.030 inches. The inner skin 29010 can be similar to inner skin 210 and/or inner skin 1810. The inner skin 29010 comprises a thickness 29011. The thickness 29011 of the inner skin 29010 can be between 0.010 inches and 0.030 inches. In some embodiments, the thickness 29011 of the inner skin 29010 can be between 0.010 inches and 0.012 inches, 0.012 inches and 0.014 inches, 0.014 inches and 0.016 inches, 0.016 inches and 0.018 inches, 0.018 inches and 0.020 inches, 0.020 inches and 0.022 inches, 0.022 inches and 0.024 inches, 0.024 inches and 0.026 inches, 0.026 inches and 0.028 inches, or 0.028 inches and 0.030 inches.

The faceplate 29100 further comprises a midsection 29030. The midsection 29030 can be similar to midsection 230 and/or midsection 930. In the embodiment of FIGS. 32-34, the midsection 29030 comprises only a single layer. The midsection 29030 comprises a thickness 29031. In some embodiments, the thickness 29031 of the midsection 29030 is between 0.030 inches and 0.050 inches. In some embodiments, the thickness 29031 of the midsection 29030 is between 0.030 inches and 0.032 inches, 0.032 inches and 0.034 inches, 0.034 inches and 0.036 inches, 0.036 inches and 0.038 inches, 0.038 inches and 0.040 inches, 0.040 inches and 0.042 inches, 0.042 inches and 0.044 inches, 0.044 inches and 0.046 inches, 0.046 inches and 0.048 inches, or 0.048 inches and 0.050 inches.

The midsection 29030 comprises a cell lattice 29040 within a lattice region 29500 configured to reduce the mass of the faceplate 29100. The lattice region 29500 may be located in one or more areas of the midsection 29030 that generally experiences low stress during impact, such as a mid-heel or mid-toe area. The lattice section may remove mass from these low stress areas, making the faceplate 29100 lighter without sacrificing the structural resilience of the faceplate 29100. In some embodiments, a portion of the midsection 29030 may be devoid of the cell lattice 29040. The portion of the midsection 29030 devoid of the cell lattice 29040 may be located in areas of the faceplate 29100 that generally experience high stress during impact, such as a target strike region 29150 near the center 29155 of the faceplate 29100. Providing a portion of the midsection 29030 devoid of the cell lattice 29040 may provide support for the faceplate 29100 during impact and prevent damage to the golf club head 29000. The midsection 29030 may further comprise a perimeter midsection area 29032. The perimeter midsection area 29032 may be similar to perimeter midsection area 232 and may be devoid of the cell lattice 29040.

The cell lattice 29040 comprises a plurality of cell walls 29041 extending through the lattice region 29500 from the outer skin 29020 to the inner skin 29010 in a direction perpendicular to the striking surface. The cell walls 29041 define a plurality of cells 29042 within the midsection 29030. In some embodiments, the cells 29042 can be similar to one or more of cells 242 (FIG. 2-6), 742 (FIG. 7), 842 (FIG. 8), 942 (FIG. 9), 1142 (FIG. 11), 1242 (FIG. 12), 1342 (FIG. 13), 1442 (FIG. 14), 1542 (FIG. 15), 1642 (FIG.), 1842 (FIG. 16), 17242 (FIG. 17), and/or 18242 (FIG. 18). The cell walls 29041 comprise a thickness 29141 and an orientation that define the shape of the cells 29042 within the cell lattice 29040. In some embodiments, the thickness 29141 of the cell walls 29041 can be between 0.005 inch and 0.015 inches. In some embodiments, the cell wall thickness 29141 can be between 0.005 and 0.006 inches, between 0.006 and 0.007 inches, between 0.007 and 0.008 inches, between 0.008 and 0.009 inches, between 0.009 and 0.010 inches, between 0.010 and 0.011 inches, between 0.011 and 0.012 inches, between 0.012 and 0.013 inches, between 0.013 and 0.014 inches, or between 0.014 and 0.015 inches. In some embodiments, the cell walls 29041 can comprise a constant thickness 29141. In other embodiments, the cell walls 29041 can comprise a thickness 29141 that varies along the cell wall 29041.

The cell walls 29041 can be arranged so that the cells 29042 form a repeating pattern, such as the honeycomb pattern depicted in FIG. 34. In the honeycomb pattern of FIG. 34, each cell 29042 comprises a hexagonal shape defined by six cell walls 29041. The interior of the hexagonal shape is hollow, such that each cell 29042 forms a void 29043 within its cell walls 29041. Each cell 29042 within the cell lattice 29040 shares each of its six walls 29041 with one adjacent cell 29042 to form the repeating honeycomb pattern with the cells 29042 being continuous. In other embodiments, the cells 29042 defined by the cell walls 29041 can have any shape, such as circular, elliptical, square, rectangular, triangular, or any other polygon. Each cell 29042 comprises a cell width 29143 measured from cell wall 29041 to cell wall along the widest portion of the cell 29042. In some embodiments, the cell width 29143 can be approximately 0.25 inches. In some embodiments, the cell width 29143 can range between 0.05 and 0.50 inches. In some embodiments, the cell width 29143 can range between 0.05 and 0.10 inches, between 0.1 and 0.15 inches, between 0.15 and 0.20 inches, between 0.20 and 0.25 inches, between 0.25 and 0.30 inches, between 0.30 and 0.35 inches, between 0.35 and 0.40 inches, between 0.40 and 0.45 inches, or between 0.45 and 0.50 inches.

In some embodiments, one or more cells 29042 located along an edge of the lattice region 29500 may not be formed as complete hexagonal shapes. Instead, the cells 29042 located along an edge of the lattice region 29500 may be formed as partial cells 29042 in order to fit within the desired lattice region 29500. These partial cells 29042 may comprise less than six walls 29041. In some embodiments, the partial cells 29042 comprise two, three, four, five, or six cell walls 29041.

In some embodiments, the inner skin 29010 may comprise a plurality of apertures 29045 for removing excess powder material during manufacture. The apertures 29045 may extend through the entire thickness 29011 of the inner skin 29010 and into the cell lattice 29040 of the midsection 29030. The plurality of apertures 29045 may each comprise an aperture diameter 29145. In some embodiments, the aperture diameter 29145 can range from between 0.005 inches and 0.2 inches. In some embodiments, the aperture diameter 29145 can range between 0.005 and 0.010 inches, between 0.010 and 0.020 inches, between 0.020 and 0.030 inches, between 0.030 and 0.040 inches, between 0.040 and 0.050 inches, between 0.050 and 0.060 inches, between 0.060 and 0.070 inches, between 0.070 and 0.080 inches, between 0.080 and 0.090 inches, between 0.090 and 0.1 inches, between 0.1 and 0.11 inches, between 0.11 and 0.12 inches, between 0.12 and 0.13 inches, between 0.13 and 0.14 inches, between 0.14 and 0.15 inches, between 0.15 and 0.16 inches, between 0.16 and 0.17 inches, between 0.17 and 0.18 inches, between 0.18 and 0.19 inches, or between 0.19 and 0.2 inches.

Each aperture 29045 can be centered within one of the cells 29042 of cell lattice 29040 and be configured to remove excess powder material that may accumulate within the cells 29042 during manufacture. In some embodiments, there may be an aperture 29045 corresponding to every cell 29042 within the lattice. In some embodiments, the cells 29042 formed near the edge of the lattice region 29500 that are formed as partial cells 29042 may not comprise a corresponding aperture 29045. In some embodiments, the walls 29041 between cells 29042 with a corresponding aperture 29045 and cells 29042 without a corresponding aperture 29045 may comprise a gap 29044 providing a pathway between such adjacent cells 29042. The gap 29044 facilitates removal of excess powder from the cell 29042 without a corresponding aperture 29045 by allowing the powder to pass through the gap 29044 and be removed through the aperture 29045 corresponding to the adjacent cell 29042.

Figure 35:
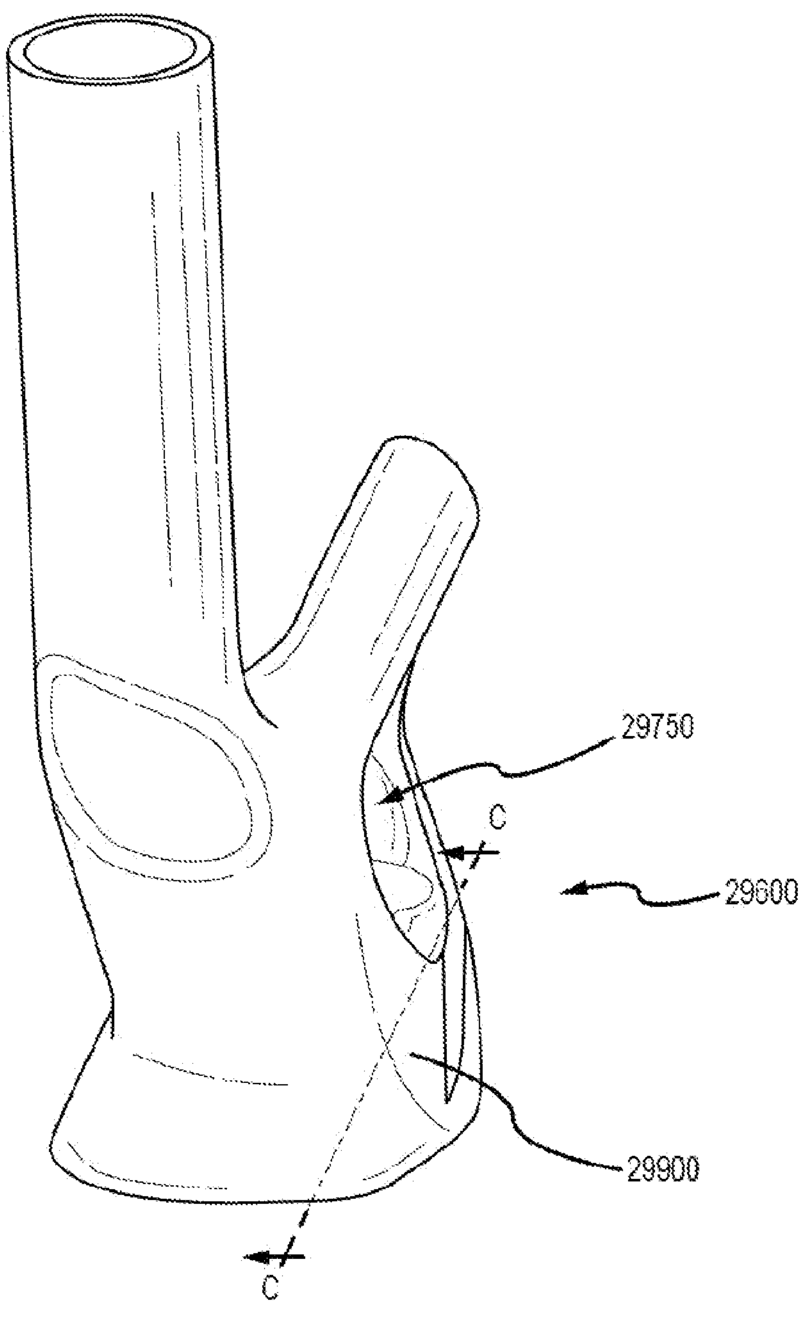
FIG. 35 illustrates a heel side view of the golf club head of FIG. 29.
Figure 36:
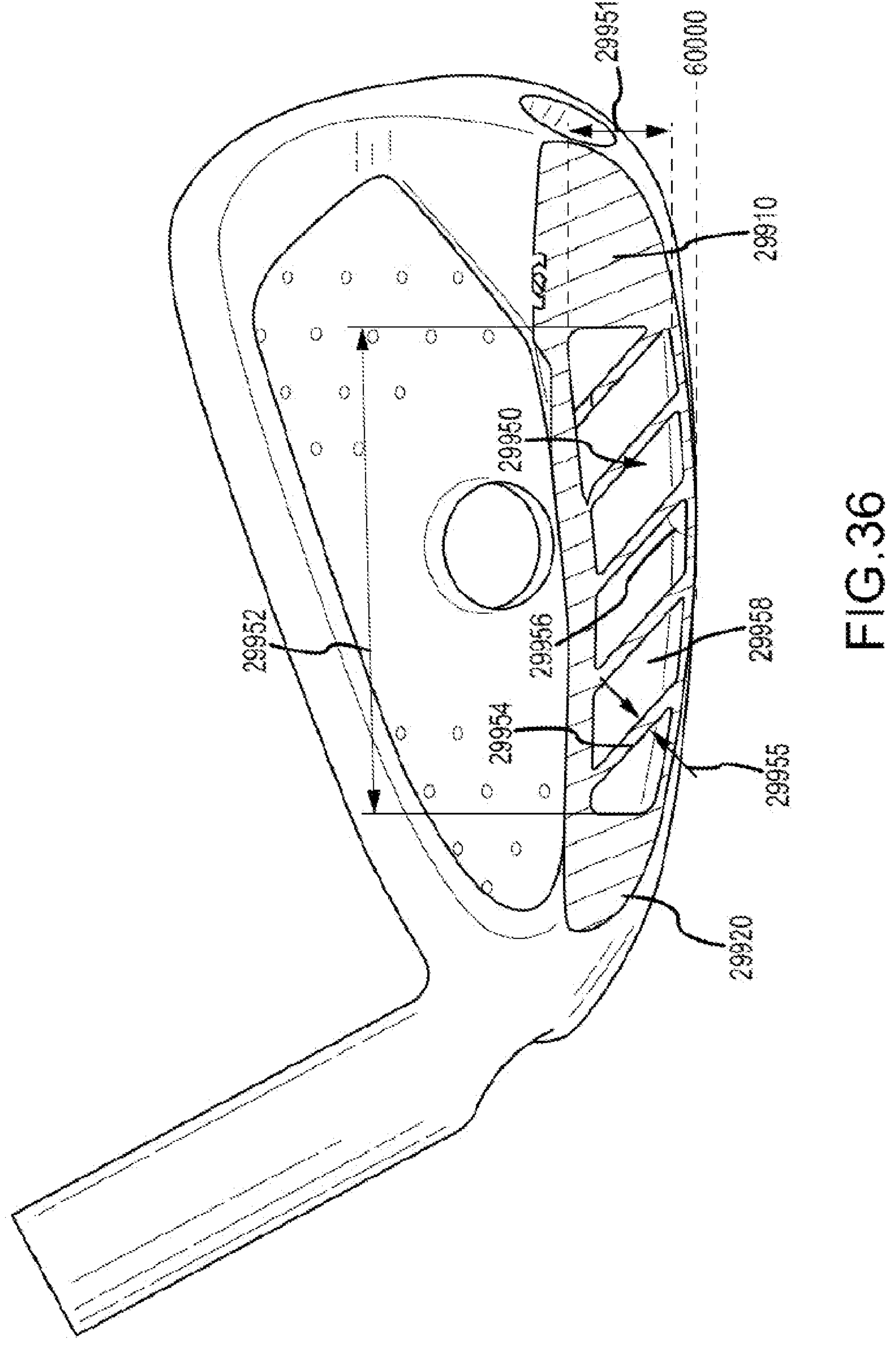
FIG. 36 illustrates a cross-sectional view of the rear portion of the golf club head of FIG. 35 taken along line C-C.

In one example, referring to FIGS. 35-36, the rear portion 29900 of golf club head 29000 comprises an internal cell lattice structure. The rear portion 29900 comprises a toe section 29910 proximate the toe side 29700 of the golf club head 29000, a heel section 29920 proximate the heel side 29800 of the golf club head 29000, and a central section between the toe section 29910 and the heel section 29920. The rear portion 29900 can define a rear portion void 29950 wherein mass is removed from the rear section. In some embodiments, the rear portion void 29950 can be substantially formed within the center section 29930 of the rear portion 29900. In some embodiments, the rear portion void 29950 can be formed within a forward section of the rear portion 29900. This placement of the rear portion void 29950 allows mass to be redistributed from the middle of the golf club head 29000 to the perimeter of the golf club to increase MOI, and further allows the CG to shift further rearward. The rear portion void 29950 can extend through the rear portion 29900 in a substantially heel-to-toe direction. The rear portion void 29950 comprises a length 29952 measured in a heel-to-toe direction and a height 29951 measured in a sole-to-top rail direction. In some embodiments, the length 29952 of the rear portion void 29950 can range between 1 inch and 3 inches. In some embodiments, the length 29952 of the rear portion void 29950 can be approximately between 1 and 1.25 inches, between 1.25 and 1.5 inches, between 1.5 and 1.75 inches, between 1.75 and 2 inches, between 2 and 2.25 inches, between 2.25 and 2.5 inches, between 2.5 and 2.75 inches, or between 2.75 and 3 inches. In some embodiments, the height 29951 of the rear portion void 29950 can range between approximately 0.05 and 0.50 inches. In some embodiments, the height 29951 of the rear portion void 29950 can be between 0.05 and 0.10 inches, between 0.10 and 0.15 inches, between 0.15 and 0.20 inches, between 0.20 and 0.25 inches, between 0.25 and 0.30 inches, between 0.30 and 0.35 inches, between 0.35 and 0.40 inches, between 0.40 and 0.45 inches, or between 0.45 and 0.50 inches.

In some embodiments, the rear portion void 29950 may be filled with a cell lattice structure similar to any of the cell lattice structures described above including cell lattices 240 (FIGS. 2-6), 740 (FIG. 7), 840 (FIG. 8), 940 (FIG. 9), 1140 (FIG. 11), 1240 (FIG. 12), 1340 (FIG. 13), 1440 (FIG. 14), 1540 (FIG. 15), 1640 (FIG. 16), 17240 (FIG. 17), 18240 (FIG. 18), and/or 29040. In one example, referring to FIG. 36, The rear portion void 29950 comprises a plurality of cross ribs 29954. The cross ribs 29954 can act within the rear portion void 29950 similar to a cell lattice. The cross ribs 29954 can provide support, transfer stresses, and reduce bending of the rear portion void 29950 during impact. The cross ribs 29954 can define a thickness 29955. In some embodiments, the cross rib thickness 29955 can range approximately between 0.01 inches and 0.10 inches. In some embodiments, the cross rib thickness 29955 can be between 0.01 and 0.015 inches, between 0.015 and 0.02 inches, between 0.02 and 0.025 inches, between 0.025 and 0.03 inches, between 0.03 and 0.035 inches, between 0.035 and 0.04 inches, between 0.04 and 0.045 inches, between 0.045 and 0.05 inches, between 0.05 and 0.055 inches, between 0.055 and 0.06 inches, between 0.06 and 0.065 inches, between 0.065 and 0.07 inches, between 0.07 and 0.075 inches, between 0.075 and 0.08 inches, between 0.08 and 0.085 inches, between 0.085 and 0.09 inches, between 0.09 and 0.095 inches, between 0.095 and 0.10 inches. The cross ribs 29954 extend between walls of the rear portion void 29950. In some embodiments, the cross ribs 29954 extend diagonally through the rear portion void 29950 in a direction from high heel to low toe. In some embodiments, the cross ribs 29954 may also extend within the rear void portion from front to rear as they extend from high heel to low toe. The directionality of the cross ribs 29954 can further be defined by an angle 29956 between an individual cross rib 29954 and the ground plane 60000. In some embodiments, the angle 29956 between the cross rib 29954 and the ground plane 60000 can be between approximately 45 degrees. In some embodiments, the angle 29956 between the cross rib 29954 and the ground plane 60000 can be between 10 and 15 degrees, between 15 and 20 degrees, between 20 and 25 degrees, between 25 and 30 degrees, between 30 and 35 degrees, between 35 and 40 degrees, between 40 and 45 degrees, between 45 and 50 degrees, between 50 and 55 degrees, or between 55 and 60 degrees.

The plurality of cross ribs 29954 can act as dividing walls between sections of the rear portion void 29950, forming sub-voids 29958. In some embodiments, the cross ribs 29954 can completely separate the sub-voids 29958 from one another. In other embodiments, the cross ribs 29954 may not extend completely between walls of the rear portion void 29950, leaving a gap between adjacent sub-voids 29958.

The rear portion 29900 can further comprise a rear aperture 29931. The rear aperture 29931 can be located in the center section 29930 of the rear portion 29900 and can provide a pathway from the rear portion void 29950 to the exterior of the golf club head 29000. The rear aperture 29931 can be circular, comprising a rear aperture diameter 29932. In some embodiments, the rear aperture diameter 29932 can range between 0.005 inches and 0.2 inches. In some embodiments, the rear aperture diameter 29932 can range between 0.005 and 0.010 inches, between 0.010 and 0.020 inches, between 0.020 and 0.030 inches, between 0.030 and 0.040 inches, between 0.040 and 0.050 inches, between 0.050 and 0.060 inches, between 0.060 and 0.070 inches, between 0.070 and 0.080 inches, between 0.080 and 0.090 inches, between 0.090 and 0.1 inches, between 0.1 and 0.11 inches, between 0.11 and 0.12 inches, between 0.12 and 0.13 inches, between 0.13 and 0.14 inches, between 0.14 and 0.15 inches, between 0.15 and 0.16 inches, between 0.16 and 0.17 inches, between 0.17 and 0.18 inches, between 0.18 and 0.19 inches, or between 0.19 and 0.2 inches. The rear aperture 29931 can be used to remove excess powder from the rear portion void 29950 during manufacture, and the rear aperture 29931 can further be welded over after excess powder is removed to prevent dirt or undesirable objects from entering the rear portion void 29950 during use of the golf club head 29000. In embodiments where the sub-voids 29958 are not completely separated from one another by the cross ribs 29954, the gaps between adjacent sub-voids 29958 can facilitate the removal of excess powder during manufacture. Because only a single aperture provides a pathway to the exterior of the golf club head 29000 from a single sub-void 29958 of the rear portion void 29950, the gaps allow the powder to move between sub-voids 29958 and exit the rear portion void 29950 via the aperture.

Although the rear portion void 29950 comprising a cell lattice and/or a plurality of cross ribs 29954 is shown in the present example as being located in the rear portion 29900 of the golf club head 29000, the golf club head 29000 may comprise one or more similar voids in any other portion of the golf club head 29000 including the heel 29800, the toe 29700, and/or the top rail 29200. The golf club head 29000 may comprise such voids either in addition to or in substitution of the rear portion void 29950.

As described above, the mass savings produced by the faceplate cell lattice 29040 and/or rear portion void 29950 creates discretionary mass that can be redistributed throughout the golf club head 29000 to improve club head weight characteristics. In some embodiments, the discretionary mass can be reintroduced around the perimeter of the golf club head 29000. By adding discretionary mass around the perimeter of the golf club head 29000, the golf club head 29000 can have an increased moment of inertia (MOI) about one or more axes of the golf club head 29000. Increased MOI provides a golf club head 29000 with greater forgiveness for shots hit away from the center 29155 of the striking surface. In some embodiments, the discretionary mass can be placed near the heel 29800 and toe ends 29700 of the golf club head 29000, such as through toe screw 30014 and tip weights 30012 or through heel side and toe side rear weights. Placing discretionary mass near the heel 29800 and toe ends 29700 increases the moment of inertia of the golf club head 29000 about the Y-axis 40000 (Iyy). Likewise, through the rear void being located in a center section 29930 of the rear portion 29900 and the lattice region 29500 being located proximate the middle of the faceplate 29100, removing mass from the middle of the golf club head 29000 further increases Iyy. An increase in Iyy provides a golf club head 29000 with greater forgiveness on shots that are mishit towards the heel 29800 or toe 29700 of the golf club head 29000. Increasing Iyy can further affect the sidespin of the golf ball upon impact. Twisting of the clubface about the Y-axis 40000 produces a "gear effect" in which the contact point between the golf ball and the striking surface moves during the time the striking surface and the golf ball are in contact, producing undesirable sidespin that causes the golf ball to depart from its target line. The higher the Iyy, the more resistant the club head 29000 will be to twisting when the golf ball is struck near the heel 29800 or toe 29700. This high resistance to twisting reduces the gear effect and lowers the sidespin imparted on the golf ball, producing straighter shots.

The mass distribution of the golf club head 29000 can also be manipulated to control the center of gravity (CG) of the golf club head 29000. Reducing the mass of the faceplate 29100 via the cell lattice 29040 and redistributing the mass further rearward in the golf club head 29000 can serve to move the CG of the golf club head 29000 rearward. Likewise, reducing the mass of portions near the top of the golf club head 29000 and redistributing the mass further towards the sole 29300 of the golf club head 29000 can serve to move the CG of the golf club head 29000 down towards the sole 29300. Lowering the CG in this way produces a golf club head 29000 with higher launch upon impact, which translates to golf shots that fly an increased distance.

Figure 10:
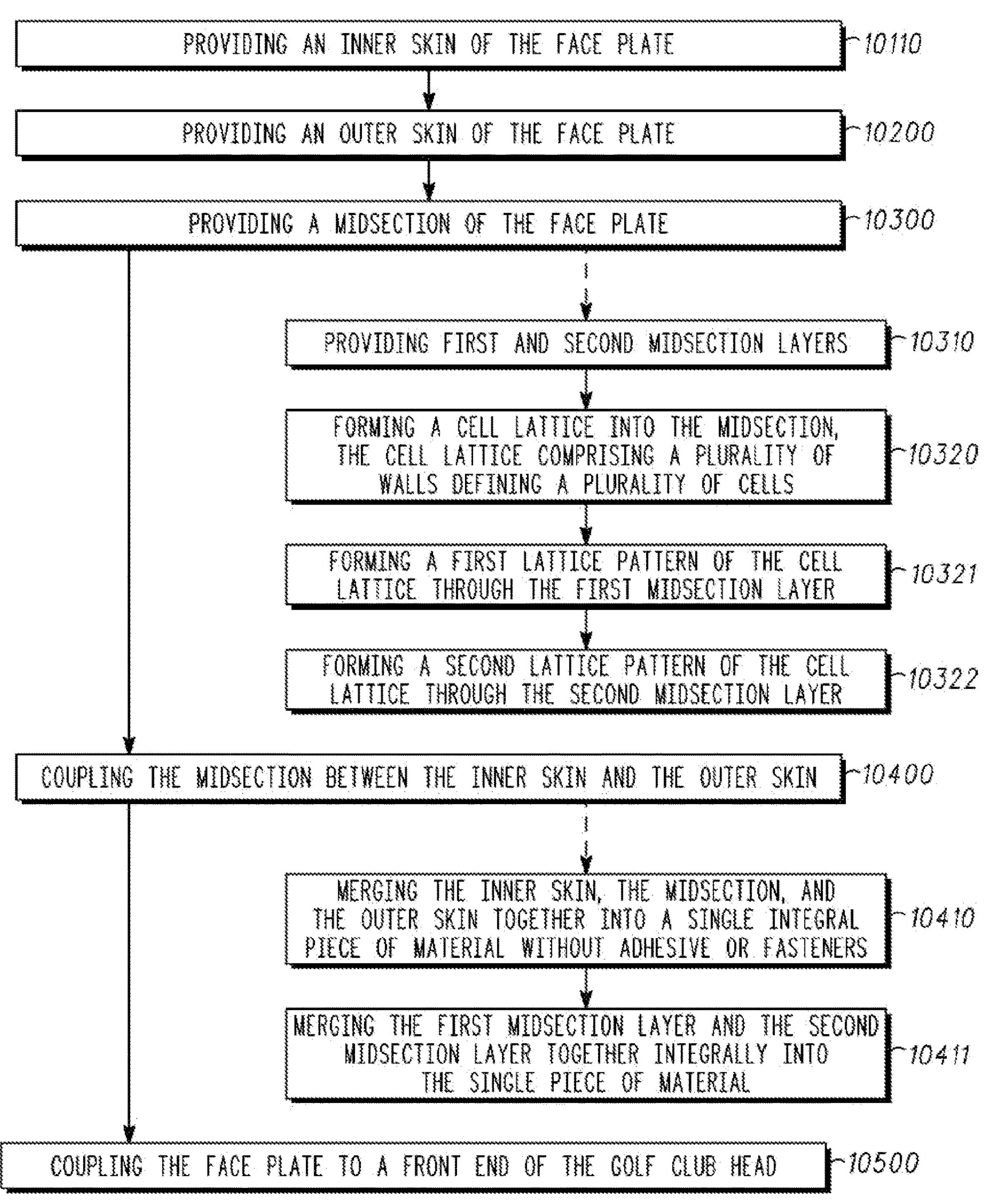
FIG. 10 illustrates a flowchart for a method for providing a face plate for a golf club head.

Backtracking through the figures, FIG. 10 illustrates a flowchart for a method 10000 for providing a face plate for a golf club head. In some embodiments, the face plate can be similar to face plate 100 (FIGS. 1-4, 6), and or to a face plate comprising one or more cell lattices such as those described with respect to FIGS. 7-9, 11, and/or 12-11).

Block 10100 of method 10000 comprises providing an inner skin of the face plate. Block 10200 of method 10000 comprises providing an outer skin of the face plate. In some examples, the inner skin of block 10100 can be similar to inner skin 210, while the outer skin of block 10200 can be similar to outer skin 120 (FIGS. 2-3). In the same or other examples, block 10100 may comprise providing first and second inner skin layers of the inner skin, where such first and second inner skin layers may be similar to inner skin layers 310 (FIG. 3). In the same or other examples, block 10200 may comprise providing first and second outer skin layers of the outer skin, where such first and second outer skin layers may be similar to outer skin layers 320 (FIG. 3).

Block 10300 of method 10000 comprises providing a midsection of the face plate. In some examples, the midsection can be similar to midsection 230 (FIGS. 1-4, 6) and/or midsection 930 (FIG. 9). In the same or other examples, block 10300 can comprise sub-block 10310 for providing first and second midsection layers of the midsection of block 10300. There can be examples where the first and second midsection layers can be similar to midsection layers 330 (FIG. 3). In the present example, the inner skin of block 10100, the outer skin of block 10200, and the midsection of block 10300 are provided as separate distinct portions, although there can be other embodiments where two of them may be provided already combined together.

In some examples, block 10300 can also comprise sub-block 10320 for forming a cell lattice in the midsection, the cell lattice comprising a plurality of walls defining a plurality of cells. In some examples, the cell lattice can be similar to cell lattice 240 of midsection 230 (FIGS. 2-6), to one or more of cell lattices 740 (FIG. 7), 840 (FIG. 8), 940 (FIG. 9), 1140 (FIG. 11), 1240 (FIG. 12), 1340 (FIG. 13), 1440 (FIG. 14), 1540 (FIG. 15), 1640 (FIG. 16), 17240 (FIG. 17), and/or 18240 (FIG. 18), to one or more of the cell lattices comprised by the cell lattice regions of faceplate 19100 (FIG. 19), 20100 (FIG. 20), 21100 (FIG. 21), and/or 22100 (FIG. 22), and/or to other cell lattice variations similar to those described herein.

Sub-block 10320 may comprise sub-block 10321 for forming a first lattice pattern of the cell lattice through the first midsection layer, and/or sub-block 10322 for forming a second lattice pattern of the cell lattice through the second midsection layer. In some examples, the first lattice pattern of sub-block 10321 can be similar to cell lattice pattern 341 through midsection layer 331 (FIGS. 3-4). In the same or other examples, the second lattice pattern of sub-block 10322 can be similar to another lattice pattern of another midsection layer, such as lattice pattern 242 of midsection layer 332 (FIG. 3). There can also be examples where the first and second lattice patterns of sub-blocks 10321-10322 can correspond to lattice patterns for the cell lattices of FIG. 7-9 or 11-22, and/or to other cell lattice variations similar to those described herein.

Sub-block 10321 may comprise forming a first cutout through the first midsection layer, where the first cutout is configured to define a first volume portion of a first cell of the cell lattice. Similarly, sub-block 10322 may comprise forming a second cutout through the second midsection layer, where the second cutout is configured to define a second volume portion of the first cell of the cell lattice. As an example, the first cutout may be similar to cutout 342 through midsection layer 331 (FIG. 3), and the second cutout can be similar to cutout 343 through midsection layer 332 (FIG. 3) so that, when midsection layers 330 are coupled together, such as through sub-block 10411 (below), the volumes defined by cutouts 342 and 343 will combine to define at least part of the volume of a cell of cell lattice 240. There can be examples where sub-block 10322 can comprise forming the second cutout to comprise a different dimension than the first cutout, such as a different radius, a different perimeter length, a different area, or a different volume. Accordingly, the first and second cutouts need not be equal to each other, thereby adding flexibility to further define desired features for the volume and/or shape of the cells of the cell lattice.

In some examples, forming the cell lattice in block 10320 can comprise aligning the second midsection layer over the first midsection layer such that the first and second cutouts are centered about a first cell axis of a cell of cell lattice 240. As an example, as described above with respect to FIGS. 3-4, midsection layers 300 comprise respective alignment elements 351-354, and can be aligned with each other by aligning respective alignment members 351-354 throughout the stack of midsection layers 300. Accordingly, cutout 342 of layer 331 and cutout 343 of layer 332 end up aligned relative to each other by being centered about cell axis 350, where cell axis 350 traverses through stacked cutouts of layers 330 to define a cell of cell lattice 240 in midsection 230. In some examples, the alignment elements can comprise features such as holes and/or indentions that can match each other for alignment by corresponding shape and/or by location. With respect to the example of FIGS. 3-4, alignment elements 351-354 are offset relative to each other to permit alignment of adjacent ones of layers 300 only in a single orientation.

There can also be examples where not all cutouts of stacked layers of the midsection need be aligned with each other centered about a cell axis. In some embodiments, the cutouts and/or cells of the cell lattice may be offset from each other. For instance, forming the first lattice pattern in block 10321 can comprise forming the first cutout through the first midsection layer to define a first volume portion of the first cell, and forming the second lattice pattern block 10322 can comprise forming the second cutout through the second midsection layer to define a second volume portion of a second cell of the cell lattice. In the same or other examples, the second cell can be at least partially capped or defined by solid portions of the first midsection layer and/or the outer skin, and/or the first cell can be at least partially capped or defined by solid portions of the second midsection layer and/or the inner skin. For instance, as shown in FIG. 9, midsection layers 931-933 can be aligned and stacked relative to each other such that cells 9421, 9422, and 9423 are offset from each other, such that cell 9421 is at least partially capped or defined by solid portion 9321 of layer 932, and cell 9422 is at least partially capped or defined by solid portion 9311 of layer 931. Although midsection 930 is shown in FIG. 9 as layers 931-933 for simplicity, layers 931-933 may each represent a plurality of midsection layers stacked together in the same or other embodiments.

Block 10400 of method 10000 comprises coupling the midsection of block 10300 between the inner skin of block 10100 and the outer skin of block 10200. In some examples, the midsection may comprise an inner midsection end coupled to the inner skin of block 10100, and an outer midsection end coupled to the outer skin of block 10200, such that the midsection is "sandwiched" therebetween. In the same or other examples, block 10400 can comprise sub-block 10410 for merging the inner skin, the midsection, and the outer skin together into a single integral piece of material without adhesives or fasteners. For instance, the inner skin, the midsection, and the outer skin may be merged together via a high-heat and high-pressure process as described above with respect to FIGS. 2-3, such as via a diffusion bonding process. There can be embodiments where sub-block 10410 can be carried out such that the single integral piece of material is seamless between the inner skin and the midsection, and between the midsection and the outer skin. In the same or other examples, sub-block 10410 can comprise sub-block 10411 for merging the first midsection layer and the second midsection layer together integrally into the single piece of material. As an example, sub-block 10411 can comprise merging midsection layers 330 together (FIG. 3) as described above. In the same or other examples, sub-block 10410 can also comprise merging inner skin layers 310 (FIG. 3) together, and/or merging outer skin layers 320 (FIG. 3) together into the single piece of material for the faceplate.

Such seamless and single-piece merging between the inner skin, the mid section and the outer skin, and/or between their respective layers, can occur when the merging occurs at the molecular level. For example, the inner skin, the midsection, and the outer skin can all be provided to comprise the same metallic material, where such material can be selected to be suitable for merging the different portions of the faceplate at the molecular level when exposed to a high heat and high-pressure process, such as through a diffusion bonding process. In some examples, the metallic material can comprise a metallic alloy, as described above, and the merging at the molecular level can take advantage of the crystal structure of the metallic material to achieve integral bonding to generate the single piece of material for the faceplate. As an example, the inner skin may be provided in block 10100 to comprise a first crystal structure of an alpha-type structure; the outer skin may be provided in block 10200 to comprise a second crystal structure of the alpha-type structure; and the midsection may be provided in block 10300 to comprise a midsection crystal structure of the alpha-type structure. Then, at block 10400, the first crystal structure of the inner skin, the second crystal structure of the outer skin, and the midsection crystal structure of the midsection can be transformed into a beta-type structure such that the midsection crystal structure is intermeshed with the first crystal structure, and the midsection crystal structure is intermeshed with the second crystal structure. In some examples, the alpha-type structure can comprise a hexagonal crystal phase, and the beta-type structure can comprise a body-centered cubic crystal phase.

Block 10500 of method 10000 can be optional, comprising coupling the face plate to a front end of the golf club head. In some examples, the golf club head can be similar to golf club head 10 as illustrated in FIG. 1. The faceplate can be coupled by mating a faceplate edge, such as faceplate edge 101 (FIGS. 1-2) to an opening at the front of the golf club head. In some examples, such mating can be achieved via a welding process and/or a brazing process.

In some examples, the cell lattice of the midsection, as formed in sub-block 10320, can be located in a central midsection area of the midsection, such that a perimeter midsection area of the midsection bounding the central midsection area can be devoid of the cell lattice and/or of its cells. As an example, the perimeter midsection area can be similar to perimeter midsection area 232 of midsection 230 bounding the central area of midsection 230 comprising cell lattice 240 (FIGS. 1-4). In some embodiments, perimeter midsection area 230 can separate the cell lattice 240 in the central midsection area away from faceplate edge 101 by at least approximately 0.1 inches (2.54 mm).

In the same or other examples, coupling the face plate in block 10500 can comprise coupling the front end of the golf club head to an inner skin perimeter area of the inner skin of block 10100, such as to inner skin perimeter area 212 (FIG. 2), or to an outer skin perimeter area of the outer skin of block 10200, such as to outer skin perimeter area 222 (FIG. 2), or to both. For instance, the inner skin perimeter area and/or the outer skin perimeter area can be aligned with the perimeter midsection area described above such as not to contact the cell lattice of the midsection central area. There can be other examples, however, where the cell lattice can extend throughout the midsection area of the faceplate, such that the inner and outer skin perimeter areas would thus contact the cell lattice.

The cell lattice formed in block 10320 can comprise one or more of several characteristics. For example, the plurality of cells of the cell lattice can be formed in a hexagonal pattern, such as seen in FIGS. 4 and 6-7 with respect to cell lattice 240. In the same or other examples, the cell lattice can be formed in an isogrid pattern, as also seen with respect to cell lattices 240 and 740. The cell lattice can comprise in the same or other examples a plurality of cell junctions where two or more of the plurality of walls couple together. For instance, the cell junctions can be similar to cell junction 443 (FIGS. 4, 6) and/or to cell junction 743 (FIG. 7). One or more of the cell junctions may comprise a junction channel extending from the inner midsection end to the outer midsection end of the midsection, such as junction channel 4431 extended from inner midsection end 245 to outer midsection end 246 through cell junction 443, as shown in FIG. 6.

Continuing with examples of the one or more several characteristics for the cell lattice in block 10320, there can also be embodiments where forming the cell lattice can comprise forming one or more walls of the cell lattice to comprise a varying dimension. As an example, the cell lattice can comprise a wall, such as one of walls 741 having varying length thickness dimensions (FIG. 7), and/or such as one of walls 841 and/or 1141 having varying depth thickness dimensions (FIGS. 8 and 11). In the same or other examples, forming the cell lattice can comprise forming the plurality of cells in a diminishing density pattern and/or in a diminishing size pattern. For instance, in the diminishing size pattern, the plurality of cells can decrease in size or dimension towards a target strike region of the face plate, such as shown and described with respect to FIGS. 17-18. In the diminishing density pattern, the plurality of cells can decrease in density towards the target strike region of the face plate.

In the same or other examples, the cell lattice can comprise one or more transverse passageways between adjacent cells of the cell lattice. As an example, the cell lattice can comprise transverse passageways as shown in FIG. 6, where transverse passageway 644 traverses through wall 6411 between adjacent cells of cells 242. In the same or other examples, the formation of the transverse passageways can be facilitated, for example, by the layered formation of midsection 230 (FIGS. 1-4, 6), where the features of transverse passageways such as transverse passageway 644 can be formed in block 10300 for each of midsection layers 330 prior to carrying out block 10400.

There can also be examples where a single faceplate can comprise a plurality of cell lattice regions, such as described with respect to FIGS. 19-22. In some examples, the cell lattice regions of the plurality of cell lattice regions can be similar to each other. In other examples, two or more of the cell lattice regions of the plurality of cell lattice regions can differ from each other with respect to at least one feature, such as in terms of stiffness, elasticity, and/or type of cell lattice comprised.

In some examples, one or more of the different blocks of method 10000 can be combined into a single block or performed simultaneously, and/or the sequence of such blocks can be changed. For example, the inner skin of block 10100 may be provided simultaneously with the midsection of block 10300, and/or the outer skin of block 10200 may be provided simultaneously with the midsection of block 10300. As another example, the sequence of sub-blocks 10321 and 10322 can be changed.

In the same or other examples, some of the blocks of method 10000 can be subdivided into several sub-blocks. For example, block 10500 may comprise a sub-block for fastening the face plate to the front end of the golf club head, and another sub-block for polishing the faceplate and/or the junction with the front end of the golf club head. There can also be examples where method 10000 can comprise further or different blocks. In addition, there may be examples where method 10000 can comprise only part of the steps described above. For instance, block 10500 can be optional in some examples. Other variations can be implemented for method 10000 without departing from the scope of the present disclosure.

Figure 23:
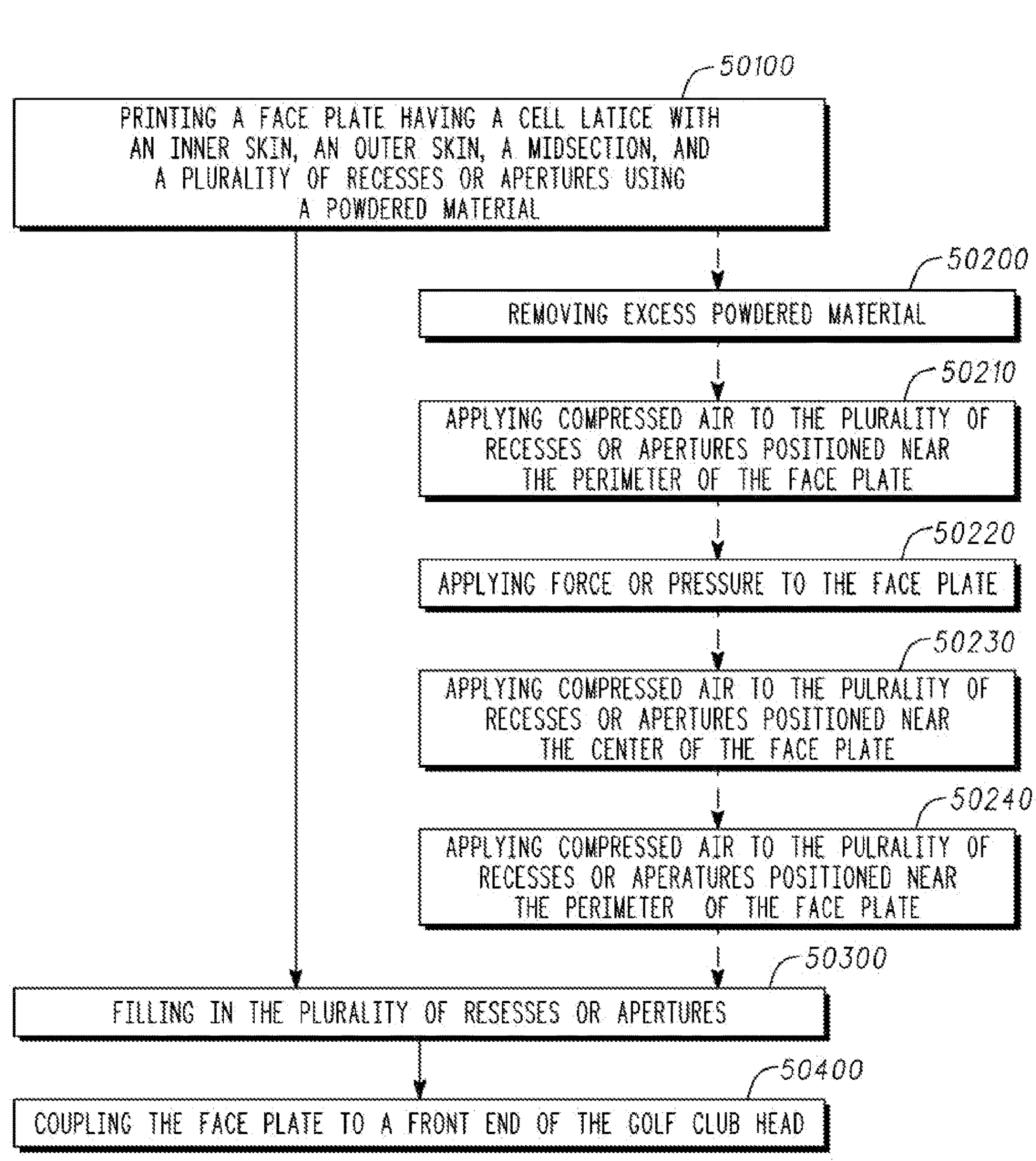
FIG. 23 illustrates a flow chart for a method of manufacturing a face plate for a golf club head.

FIG. 23 illustrates a flowchart for a method 50000 of manufacturing a face plate for a golf club head. In some embodiments, the face plate can be similar to face plate 100 (FIGS. 1-4, 6), and/or to a face plate comprising one or more cell lattices such as, for example, those described with respect to FIGS. 7-9, 11, 12-22, and/or 24-27).

Figure 24:
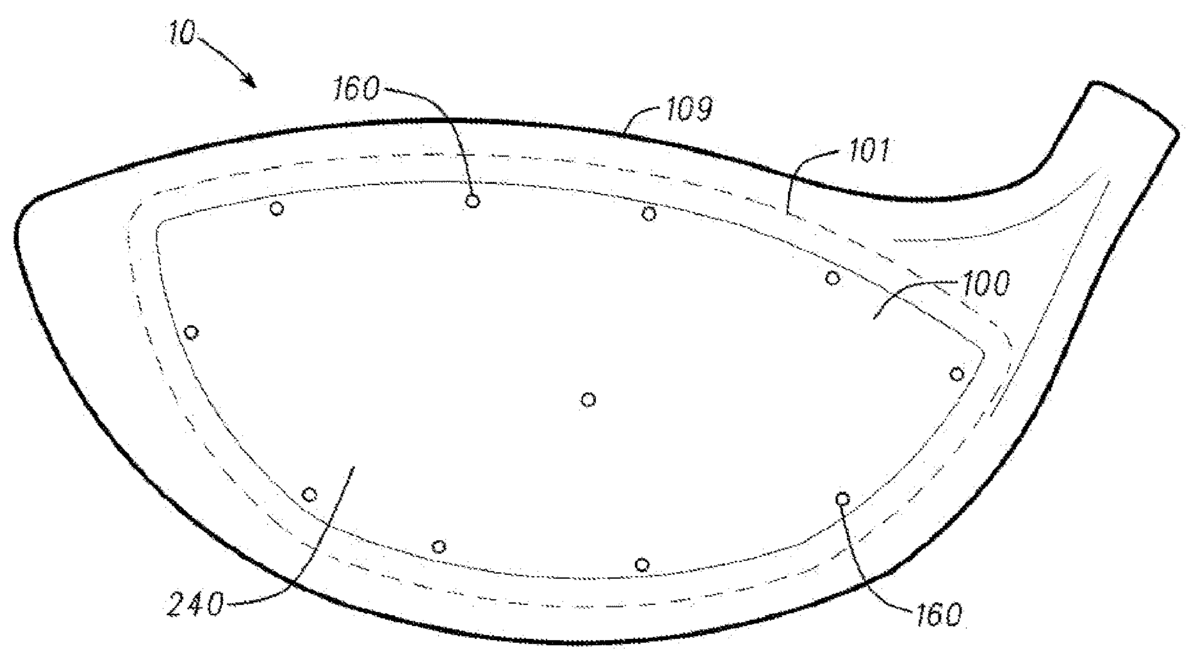
FIG. 24 illustrates a front perspective view of a golf club head comprising a face plate coupled to a club head body.

Block 50100 of method 50000 comprises printing a face plate or a portion of a face plate for a golf club head, the face plate or portion thereof having a cell lattice with an inner skin 210, an outer skin 120, a midsection 230, and a plurality of apertures 160 (shown in FIG. 24). Each of the plurality of apertures 160 can extend from a cell within the midsection of the cell lattice through the inner skin, from a cell within the midsection of the cell lattice through the outer skin, or from a cell within the midsection of the cell lattice through the outer skin of the face plate.

Referring to FIG. 24, the plurality of apertures can be positioned on the cell lattice to allow removal of excess powdered material of block 50100. In some examples, at least one of the plurality of apertures 160 is positioned near the center of the face plate or cell lattice region and additional apertures 160 are positioned toward or near the perimeter of the face plate or cell lattice region. For example, in the embodiment illustrated in FIG. 25, the plurality of apertures 160 includes an aperture positioned near the center of the face plate and additional apertures positioned around the perimeter of the cell lattice. In other embodiments, the plurality of apertures 160 can include more than one aperture positioned near the center of the face plate and additional apertures positioned around the perimeter of the face plate or cell lattice region. Further, in other embodiments, the plurality of apertures 160 can include one or more apertures positioned near the center of the face plate and additional apertures positioned around the perimeter of the cell lattice forming a perimeter channel 168, as illustrated in FIG. 26. Referring to FIG. 26, in the illustrated embodiment, the perimeter channel has a width ranging from approximately 0.03 to 0.05 inches. For example, the perimeter channel can have a width of approximately 0.03 inches, approximately 0.035 inches, approximately 0.04 inches, approximately 0.045 inches, or approximately 0.05 inches. In some embodiments, the perimeter channel can be positioned through the inner skin of the cell lattice. In other embodiments, the perimeter channel can be positioned through the outer skin of the cell lattice.

In some examples, the plurality of apertures 160 can be positioned through or on a side of the face plate having the inner skin. In some examples, the plurality of apertures 160 can be positioned through or on a side of the face plate having the outer skin. In some examples, some of the plurality of apertures 160 may be positioned through or on the side of the face plate having the inner skin and the remaining apertures 160 can be positioned through or on the side of the face plate having the outer skin.

In many embodiments, the diameter of the plurality of apertures 160 can range from approximately 0.005 inches to approximately 0.2 inches. In some embodiments, the diameter of the plurality of apertures 160 can range from approximately 0.025 inches to approximately 0.075 inches, from approximately 0.02 inches to approximately 0.10 inches, or from approximately 0.01 inches to approximately 0.15 inches. For example, in the illustrated embodiment, the diameter of the plurality of apertures 160 is approximately 0.05 inches. Further, in the illustrated embodiment, each of the plurality of apertures 160 has the same diameter. In other embodiments, each of the plurality of apertures can have different diameters.

In many embodiments, each of the plurality of apertures 160 are spaced apart from the remaining apertures by a distance greater than or equal to two times the diameter of the plurality of apertures. In other embodiments, each of the plurality of apertures can be spaced apart from the remaining apertures by a distance greater than or equal to three, four, five, or six times the diameter of the plurality of apertures.

In some examples, the face plate of block 50100 can be printed layer by layer using direct metal laser sintering. In other examples, the face plate can be printed using other processes such as, for example, selective laser sintering, 3D printing, stereolithography, laminated object manufacturing, fused deposition modeling, or electron beam melting. In some embodiments, the face plate having cell lattice (e.g. cell lattice 1840) cannot be formed using methods other than printing. For example, in many embodiments, the cells 1842 of cell lattice 1840 comprise dimensions that are too small to be cast. For further example, in many embodiments, the continuous cells 1842 of cell lattice 1840 prevent the usage of merging inner skin, midsection, and outer skin layers together, as this process requires continuity in midsection layers.

In some examples, the face plate can be printed using a powdered material. In some examples, the powdered material can be a powdered metallic material. In some examples, the powdered metallic material of block 50100 can be a titanium alloy comprising at least approximately 8% aluminum (by volume). In the same or other examples, the metallic alloy can comprise a titanium 8-1-1 alloy having approximately 8% aluminum, 1% vanadium and 1% chromium. In the same or other examples, the powdered metallic material of block 50100 can be a titanium alloy such as Ti-9S which contains 8% Al, 1% V, and 0.2% Si, with the remaining alloy composition being titanium and possibly some trace elements. In some embodiments, Ti-9S contains 6.5%-8.5% Al, between 1%-2% V, a maximum of 0.08% C, a maximum of 0.2% Si, a maximum of 0.3% Fe, a maximum of 0.2% O, a maximum of 0.05% N, trace amounts of Mo, and trace amounts of Sn, with the remaining alloy composition being titanium. Other materials may be used depending on their strength, considering their brittleness/elasticity as a beta-type crystal structure. For example, a titanium 6-4 alloy having approximately 6% aluminum and 4% vanadium, may be used in some embodiments, but can be from 5% to 12% less elastic than titanium 8-1-1 and may thus require further reinforcement or thickness for face plate 100 to properly withstand golf impact stresses.

Block 50200 of method 50000 comprises removing the excess powdered metallic material from the face plate printed in block 50100. In some examples, removing the excess powdered material can be accomplished using compressed air directed toward the plurality of apertures 160, as described below.

Block 50200 of method 50000 can comprise sub-block 50210 for applying compressed air to remove excess powdered material from the plurality of apertures 160. The compressed air can be directed toward the plurality of apertures 160 positioned on the perimeter of the face plate to create a void of excess powdered material around the perimeter of the face plate. In some examples, the compressed air may range in pressure from approximately 30-60 PSI (pounds per square inch).

Block 50200 of method 50000 can also comprise sub-block 50220 for applying force, pressure, or vibrations to the face plate to loosen excess powdered material within the cell lattice. In some examples, force or pressure can be applied to the face plate using a rubber mallet. In other examples, force or pressure can be applied to the face plate using any other method capable of loosening the excess powdered material within the cell lattice. In some examples, vibrations can be applied to the face plate in the form of ultrasonic vibrations. In other examples, any type of vibration capable of loosening excess powdered material within the cell lattice can be applied to the face plate. In some examples, vibrations can be applied to the face plate using a tumbler or shaker. In other examples, any method capable of apply vibrations to the face plate to loosen excess powdered material can be used.

Block 50200 of method 50000 can also comprise sub-block 50230 for applying compressed air to the at least one aperture 160 near the center of the face plate. The compressed air directed toward the at least one aperture 160 near the center of the face plate pushes the excess loosened powdered material from the cell lattice toward the perimeter of the face plate. In some examples, the compressed air may range in pressure from approximately 30-60 PSI.

Block 50200 of method 50000 can also comprise sub-block 50230 for applying compressed air to the perimeter of the face plate to remove the excess loosened powered material shifted from the center of the face plate in the cell lattice to the perimeter of the face plate in sub-block 50230. In some examples, the steps in sub-blocks 50220 and 50230 can be repeated as necessary to remove any remaining excess powdered material from the cell lattice of the face plate.

The plurality of apertures 160 of the face plate in method 50000 function as a ventilation system to remove excess powdered material from the cell lattice of the face plate. The at least one aperture 160 near the center of the face plate aids in shifting the excess powdered material from the center of the face plate in the cell lattice toward the perimeter of the face plate in the cell lattice for simplified removal compared to a face plate devoid of at least one aperture 160 positioned near the center of the face plate.

Block 50300 of method 50000 can comprise filling in the plurality of apertures 160 with a material similar or identical to the material of the face plate. In some examples, the plurality of apertures 160 can be filled in by welding. In other examples, the plurality of apertures 160 can be filled in using other methods capable of filling the plurality of apertures 160 resulting in a face plate having flush inner and outer surfaces.

Block 50400 of method 50000 can be optional, comprising coupling the face plate or portion thereof to a front end of the golf club head. In some examples, the golf club head can be similar to golf club head 10 as illustrated in FIG. 1. In some examples (e.g. in examples where the entire face plate having the cell lattice is formed as a single component), the face plate can be coupled by mating a face plate edge, such as face plate edge 101 (FIGS. 1-2) to an opening at the front of the golf club head. In some examples, such mating can be achieved via a welding process and/or a brazing process. In examples where a portion of the face plate having the cell lattice is formed, the portion of the face plate can be coupled to a remainder of the face plate and/or the front of the golf club head via a welding and/or brazing process.

In the same or other examples, some of the blocks of method 50000 can be divided into several sub-blocks. There can also be examples where method 50000 can comprise further or different blocks. For example, a step including chemical dissolution can be performed after the step of block 50200 to remove any additional excess powdered material within the cell lattice. In some embodiments, chemical dissolution can be performed using an acidic liquid at an elevated temperature (such as approximately 37 degrees Celsius), the acid having a pH less than or equal to approximately 4.0, such as, for example, acetic acid, benzoic acid, carbonic acid, citric acid, hydrochloric acid, nitric acid, sulfuric acid, or any other acid having a pH less than or equal to approximately 4.0, or any other material capable of removing additional excess powdered material within the cell lattice. In some embodiments, chemical dissolution can be performed using isopropyl alcohol or any other liquid capable of excess powdered material within the cell lattice.

For further example, method 50000 can further include an additional step comprising bending the face plate to incorporate bulge. In some examples, bending the face plate can be performed after forming the face plate with the cell lattice, but before coupling the face plate to the front end of the club head. In other embodiments, the face plate can be formed with bulge such that a secondary bending operation is not required. In these or other embodiments, the geometry of the cell lattice can be adjusted accordingly to allow the cell walls to extend at an angle less than or equal to approximately 45 degrees from a vertical axis when the face plate or portion thereof is formed by printing, wherein the vertical axis is positioned perpendicular to a plane defined by a layer of printed material.

In the same or other examples, method 50000 can comprise only part of the steps described above. For instance, block 50400 can be optional in some examples. Further, there may be examples where steps of method 50000 can be performed in different sequences. For instance, in some examples, block 50400 can be performed before block 50300. Other variations can be implemented for method 50000 without departing from the scope of the present disclosure.

The golf club head 29000 can be formed by a method of manufacture similar to method 5000. The golf club head 29000 can be 3D printed layer by layer. The golf club head 29000 can be printed using a powdered metallic material. The powdered metallic material can be any of the materials listed in examples related to block 50100. Excess powdered material can be removed from the faceplate 29100 by a process similar to the examples related to block 50200. Excess powdered material can be removed from the faceplate 29100 through the apertures 29045 of the inner skin 29010. After the excess powdered material has been removed, the apertures 29045 can be filled in. The apertures 29045 can be filled in by a material similar or identical to the material of the faceplate 29100. The apertures 29045 can be filled in by any methods similar to those described in relation to block 50300. In some embodiments, the golf club head 29000 comprises a badge 29751. In such embodiments, the badge 29751 can serve to cover the apertures 29045 of the inner skin 29010, making the step of filling in the apertures 29045 unnecessary.

Excess powder within the rear portion void 29950 or another other void the golf club head 29000 may comprise can be removed by similar methods. The excess powder can be removed from the rear portion void 29950 through the rear aperture 29931. After removal of the excess powder, the rear aperture 29931 can be filled in with a material similar or identical to the material of the rear portion 29900. The rear aperture 29931 can be filled in by any methods similar to those described in relation to block 50300.

Example 1

An exemplary iron-type golf club head 29000 comprising internal cell lattices, a toe screw weight 30014, and a tip weight 30012 was compared to a similar control iron-type golf club head having a toe screw weight and a tip weight, but devoid of any internal call lattices. The exemplary iron-type golf club head 29000 comprises a faceplate 29100 with an internal cell lattice 29040 similar to cell lattice 29040 and a rear portion void 29950 comprising cross ribs 29954 similar to rear portion void 29950. The faceplate and rear portion of the control iron-type golf club head both comprise a solid construction.

TABLE 1

| | Control Club Head | Example 1 | Change | Percent Change |
|---|---|---|---|---|
| Head Mass (g) | 242.39 | 218.78 | −23.614 | −9.74% |
| Tip Weight Mass (g) | 8.00 | 17.00 | 9.000 | |
| Toe Screw Mass (g) | 7.00 | 21.00 | 14.000 | |
| Total Assembled Mass (g) | 263 | 263 | 0 | 0% |
| Ixx (g/in$^3$) | 113.25 | 110.47 | −2.781 | −2.46% |
| Iyy (g/in$^3$) | 540.92 | 598.20 | 57.281 | 10.59% |
| Izz (g/in$^3$) | 592.42 | 644.44 | 52.021 | 8.78% |
| X CG (in.) (+Heel/−Toe) | 0.0572 | 0.0723 | 0.015 | 26.43% |
| Y CG (in.) (+Crown/−Sole) | 0.5923 | 0.6227 | 0.030 | 5.14% |
| Z CG (in.) (+Face/−Back) | −0.5369 | −0.5245 | 0.012 | 2.30% |

The mass properties were compared between the exemplary iron-type golf club head 29000 and the control iron-type golf club head. Approximately 24 grams of mass were freed from the exemplary iron-type golf club head 29000 to be used as discretionary mass. This discretionary mass was introduced by increasing the mass of the tip weight 30012 by approximately 9 grams and increasing the mass of the toe screw weight 30014 by approximately 14 grams compared to the tip weight and toe screw weight, respectively, of the control iron-type golf club head without increasing the mass of the overall assembly.

The redistribution of mass within the exemplary golf club head 29000 produced an increase in moment of inertia about the Y-axis 40000 (Iyy) of approximately 11%. Further, the redistribution of mass within the exemplary golf club head 29000 produced an increase in moment of inertia about the Z-axis 50000 (Izz) of approximately 9%. The increased MOI in the exemplary iron-type golf club head 29000 produces a golf club head with greater forgiveness on mishit shots as compared to the control iron-type golf club head. The redistribution of mass within the exemplary iron-type golf club head 29000 shifted the CG slightly upward along the Y-axis 40000 and slightly forward along the Z-axis 50000. Although moving the CG in this direction generally decreases launch, the change of CG in the exemplary iron-type golf club head 29000 is minimal and the effects are insignificant.

As shown in FIGS. 40*a* through 40*d*, various performance characteristics of the exemplary iron-type golf club head 29000 were measured and compared to the control iron-type golf club head using impulse momentum analysis. Golf ball impacts were simulated at various points along the striking surface or each golf club head. Ball speed, sidespin, carry, and vertical launch, were each measured at 11 points along the X-axis 30000 between −0.5 inches to 0.5 inches from the center 29155 of the striking surface. On average, the exemplary iron-type golf club head 29000 produced approximately 0.25 mph more ball speed than the control iron-type golf club head. On average, the exemplary iron-type golf club head 29000 produced approximately 0.6 more yards of carry than the control iron-type golf club head. On average, the exemplary iron-type golf club head 29000 produced approximately 9 rpm less sidespin (approximately 23% less sidespin) than the control iron-type golf club head. On average, the exemplary iron-type golf club head 29000 produced approximately 0.2% higher vertical launch than the control iron-type golf club head. These improved performance characteristics lead to a golf club head 29000 producing golf shots that fly further and straighter than golf shots produced by the control iron-type golf club head.

Example 2

An exemplary iron-type golf club head 29000 comprising an internal cell lattice 29040 in the faceplate 29100, a toe screw weight 30014, and a tip weight 30012 was compared to a similar control iron-type golf club head having a toe screw weight and a tip weight, but devoid of any internal call lattices. The faceplate 29100 of the exemplary iron-type golf club head 29000 comprised an internal cell lattice similar to cell lattice 29040. The faceplate of the control iron-type golf club head comprises a solid construction.

TABLE 2

| | Control Club Head | Example 2 | Change | Percent Change |
|---|---|---|---|---|
| Head Mass (g) | 242.39 | 231.70 | −10.695 | −4.41% |
| Tip Weight Mass (g) | 8.00 | 10.00 | 2.000 | |
| Toe Screw Mass (g) | 7.00 | 16.00 | 9.000 | |
| Total Assembled Mass (g) | 263 | 263 | 0 | 0% |
| Ixx (g/in$^3$) | 113.25 | 112.19 | −1.058 | −0.93% |
| Iyy (g/in$^3$) | 540.92 | 557.27 | 16.350 | 3.02% |
| Izz (g/in$^3$) | 592.42 | 696.91 | 104.495 | 17.64% |
| X CG (in.) (+Heel/−Toe) | 0.0572 | 0.0325 | −0.025 | −43.22% |
| Y CG (in.) (+Crown/−Sole) | 0.5923 | 0.5839 | −0.008 | −1.40% |
| Z CG (in.) (+Face/−Back) | −0.5369 | −0.5452 | −0.008 | −1.55% |

The mass properties were compared between the exemplary iron-type golf club head 29000 and the control iron-type golf club head. Approximately 11 grams of mass were freed from the exemplary iron-type golf club head 29000 to be used as discretionary mass. This discretionary mass was introduced by increasing the mass of the tip weight 30012 by approximately 2 grams and increasing the mass of the toe screw weight 30014 by approximately 9 grams compared to the tip weight and toe screw weight, respectively, of the control iron-type golf club head without increasing the mass of the overall assembly. The redistribution of mass within the exemplary golf club head 29000 produced an increase in moment of inertia about the Y-axis 40000 (Iyy) of approximately 3%. Further, the redistribution of mass within the exemplary golf club head 29000 produced an increase in moment of inertia about the Z-axis 50000 (Izz) of approximately 18%. The increased MOI in the exemplary iron-type golf club head 29000 produces a golf club head 29000 with greater forgiveness on mishit shots as compared to the control iron-type golf club head. The redistribution of mass within the exemplary iron-type golf club head 29000 shifted the CG slightly downwards along the Y-axis 40000 and slightly rearward along the Z-axis 50000. Shifting the CG in this direction can produce improved launch characteristics for the exemplary iron-type golf club head 29000.

Example 3

An exemplary iron-type golf club head 29000 comprising a rear portion void 29950, a toe screw weight 30014, and a tip weight 30012 was compared to a similar control iron-type golf club head having a toe screw weight and a tip weight, but devoid of any rear portion voids. The rear portion 29900 of the exemplary iron-type golf club head 29000 comprises a rear portion void 29950 with cross ribs 29954 similar to rear portion void 29950. The rear portion of the control iron-type golf club head comprises a solid construction.

TABLE 3

| | Control Club Head | Example 3 | Change | Percent Change |
|---|---|---|---|---|
| Head Mass (g) | 242.39 | 230.50 | −11.891 | −4.91% |
| Tip Weight Mass (g) | 8.00 | 11.00 | 3.000 | |
| Toe Screw Mass (g) | 7.00 | 16.00 | 9.000 | |
| Total Assembled Mass (g) | 263 | 263 | 0 | 0% |
| Ixx (g/in$^3$) | 113.25 | 109.85 | −3.399 | −3.00% |
| Iyy (g/in$^3$) | 540.92 | 567.83 | 26.909 | 4.97% |
| Izz (g/in$^3$) | 592.42 | 615.56 | 23.138 | 3.91% |
| X CG (in.) (+Heel/−Toe) | 0.0572 | 0.0428 | −0.014 | −25.25% |
| Y CG (in.) (+Crown/−Sole) | 0.5923 | 0.6216 | 0.029 | 4.96% |
| Z CG (in.) (+Face/−Back) | −0.5369 | −0.5268 | 0.010 | 1.89% |

The mass properties were compared between the exemplary iron-type golf club head 29000 and the control iron-type golf club head. Approximately 12 grams of mass were freed from the exemplary iron-type golf club head 29000 to be used as discretionary mass. This discretionary mass was introduced by increasing the mass of the tip weight 30012 by approximately 3 grams and increasing the mass of the toe screw weight 30014 by approximately 9 grams compared to the tip weight and toe screw weight, respectively, of the control iron-type golf club head without increasing the mass of the overall assembly. The redistribution of mass within the exemplary golf club head 29000 produced an increase in moment of inertia about the Y-axis 40000 (Iyy) of approximately 5%. Further, the redistribution of mass within the exemplary golf club head 29000 produced an increase in moment of inertia about the Z-axis 50000 (Izz) of approximately 4%. The increased MOI in the exemplary iron-type golf club head 29000 produces a golf club head 29000 with greater forgiveness on mishit shots as compared to the control iron-type golf club head. The redistribution of mass within the exemplary iron-type golf club head 29000 shifted the CG slightly upward along the Y-axis 40000 and slightly forward along the Z-axis 50000. Although moving the CG in this direction generally decreases launch, the change of CG in the exemplary iron-type golf club head 29000 is minimal and the effects are insignificant.

Although the golf club face plates with internal cell lattices and related methods herein have been described with reference to specific embodiments, various changes may be made without departing from the spirit or scope of the present disclosure. For example, although golf club head 10 is illustrated in FIG. 1 as a driver club head, the disclosure herein is also applicable to other types of golf club heads, such as fairway woods, hybrids, and even club heads without internal cavities such as putters and irons. Additional examples of such changes have been given in the foregoing description. Other permutations of the different embodiments having one or more of the features of the various figures are likewise contemplated. Accordingly, the specification, claims, and drawings herein are intended to be illustrative of the scope of the disclosure and is not intended to be limiting. It is intended that the scope of this application shall be limited only to the extent required by the appended claims.

The golf club face plates with internal cell lattices and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

Clause 1: A golf club head comprising a face plate having an inner skin, an outer skin, a cell lattice with a plurality of walls having a plurality of axes extending centrally through the walls between the inner skin and the outer skin, wherein the walls extend from the axes at an angle less than or equal to approximately 45 degrees, and the walls intersect adjacent walls at a single, first point near inner skin and at a single, second point near outer skin, a wall thickness that varies relative to position from the inner skin and the outer skin, and a plurality of cells defined by the plurality of walls, the plurality of cells positioned between the inner skin and the outer skin and having a cell width that varies relative to position from the inner skin and the outer skin.

Clause 2: The golf club head of clause 1, wherein the wall thickness is greater near the inner skin and the outer skin than near a central region of the cell lattice.

Clause 3: The golf club head of clause 1, wherein the minimum wall thickness ranges from 0.005 inches to 0.2 inches.

Clause 4: The golf club head of clause 1, wherein the maximum cell width ranges from 0.005 inches to 0.2 inches.

Clause 5: The golf club head of clause 1, wherein the thickness of the walls varies defining a plurality of hourglass shapes.

Clause 6: The golf club head of clause 1, wherein a center-to-center distance between adjacent axes ranges from 0.005 inches to 0.2 inches.

Clause 7: The golf club head of clause 1, wherein the axes are positioned radially from a center of the faceplate.

Clause 8: A cell lattice comprising an inner skin, an outer skin, a plurality of walls having a plurality of axes extending centrally through the walls between the inner skin and the outer skin, wherein the walls extend from the axes at an angle less than or equal to approximately 45 degrees, and a wall thickness that varies relative to position from the inner skin and the outer skin, a plurality of cells defined by the plurality of walls, the plurality of cells positioned between the inner skin and the outer skin, and a plurality of apertures for removal of excess material in the cell lattice, the plurality of apertures including at least a first aperture positioned near a center of the cell lattice and a the remaining apertures positioned around the perimeter of the cell lattice.

Clause 9: The cell lattice of clause 8, wherein the wall thickness is greater near the inner skin and the outer skin than near a central region of the cell lattice.

Clause 10: The cell lattice of clause 8, wherein the minimum wall thickness ranges from 0.005 inches to 0.2 inches.

Clause 11: The cell lattice of clause 8, wherein the maximum cell width ranges from 0.005 inches to 0.2 inches.

Clause 12: The cell lattice of clause 8, wherein the thickness of the walls varies defining a plurality of hourglass shapes.

Clause 13: The cell lattice of clause 8, wherein a center-to-center distance between adjacent axes ranges from 0.005 inches to 0.2 inches.

Clause 14: The cell lattice of clause 8, wherein the axes are positioned radially from a center of the cell lattice.

Clause 15: The cell lattice of clause 8, wherein the plurality of apertures is positioned through the inner skin of the cell lattice or through the outer skin of the cell lattice.

Clause 16: The cell lattice of clause 8, wherein the diameter of the apertures ranges from approximately 0.005 inches to 0.2 inches.

Clause 17: The cell lattice of clause 8, wherein each of the plurality of apertures are spaced apart from the remaining apertures by a distance greater than or equal to two times the diameter of the apertures.

Clause 18: A method of manufacturing a face plate of a golf club head comprising: printing at least a portion of a face plate having a cell lattice, the cell lattice including: an inner skin; an outer skin; a plurality of walls having a plurality of axes extending centrally through the walls between the inner skin and the outer skin, wherein the walls extend from the axes at an angle less than or equal to approximately 45 degrees; and a wall thickness that varies relative to position from the inner skin and the outer skin; a plurality of cells defined by the plurality of walls, the plurality of cells positioned between the inner skin and the outer skin; and a plurality of apertures for removal of excess material in the cell lattice, the plurality of apertures positioned through the inner skin or the outer skin, the plurality of apertures including at least a first aperture positioned near a center of the cell lattice and a the remaining apertures positioned around the perimeter of the cell lattice; removing excess powdered material from the cell lattice; and filling in the plurality of apertures.

Clause 19: The method of manufacturing the face plate of a golf club head of clause 18, wherein removing excess powdered material includes applying compressed air to the plurality of apertures positioned near the perimeter of the cell lattice, applying force or pressure to the face plate, and applying compressed air to the plurality of apertures positioned near the center of the cell lattice.

Clause 20: The method of manufacturing the face plate of a golf club head of clause 18, wherein the diameter of the apertures ranges from approximately 0.005 inches to 0.2 inches, and each of the plurality of apertures are spaced apart from the remaining apertures by a distance greater than or equal to two times the diameter of the apertures.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described in connection with a driver-type golf club, the apparatus, methods, and articles of manufacture described herein may be applicable to other types of golf club such as a fairway wood-type golf club, a hybrid-type golf club, an iron-type golf club, a wedge-type golf club, or a putter-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A golf club head comprising:

a top rail, a sole, a heel, a toe, a faceplate, a rear portion, and a hosel, a rear cavity formed between the faceplate and the rear portion, wherein the rear cavity is exposed to an exterior of the golf club head;

the rear portion defines a rear portion void extending through the rear portion in a heel-to-toe direction;

wherein the rear portion separates the rear portion void from the rear cavity;

wherein the rear portion void is filled with a cell lattice structure;

the cell lattice structure comprises a plurality of cross ribs extending across the rear portion;

wherein the plurality of cross ribs divides sections of the rear portion void to form a plurality of sub-voids; and wherein the plurality of cross ribs extends in a high-heel to low-toe direction.

2. The golf club head of claim 1, wherein the rear portion comprises a toe section, a heel section, and a center section;

wherein the rear portion void is formed in the center section of the rear portion.

3. The golf club head of claim 2, wherein the rear portion void is formed within a forward section of the rear portion.

4. The golf club head of claim 1, further comprising a tip weight and a toe screw weight, wherein:

the tip weight is located within a bore formed in the hosel; and the toe screw weight is located within a toe screw port formed in the toe of the golf club head.

5. The golf club head of claim 4, wherein the tip weight comprises a tip weight mass, the tip weight mass being at least 10 grams; and the toe screw weight comprises a toe screw weight mass, the toe screw weight mass being at least 15 grams.

6. The golf club head of claim 1, wherein the rear portion void comprises a rear portion void length measured in a heel-to-toe direction;

wherein the rear portion void length is between 1 and 2 inches.

7. The golf club head of claim 1, wherein the rear portion void comprises a rear portion void height measured in a sole-to-top rail direction;

wherein the rear portion void height is between 0.05 and 0.5 inch.

8. The golf club head of claim 1, wherein the golf club head is printed layer by layer using a powdered material using direct metal laser sintering, 3D printing, stereolithography, fused deposition, or electron beam melting to print each layer.

9. The golf club head of claim 8, wherein the powdered material is selected from a group consisting of Ti-9S, Ti-6-4, and Ti-8-1-1.

10. A golf club head comprising:

a top rail, a sole, a heel, a toe, a faceplate, a rear portion, and a hosel, a rear cavity formed between the faceplate and the rear portion, wherein the rear cavity is exposed to an exterior of the golf club head;

the rear portion defines a rear portion void extending through the rear portion in a heel-to-toe direction;

wherein the rear portion separates the rear portion void from the rear cavity;

wherein the rear portion void is filled with a cell lattice structure;

the cell lattice structure comprises a plurality of cross ribs extending across the rear portion;

wherein the plurality of cross ribs divides sections of the rear portion void to form a plurality of sub-voids;

wherein the plurality of cross ribs extends in a high-heel to low-toe direction;

wherein the plurality of cross ribs comprise a cross rib thickness between 0.01 inch to 0.10 inch;

wherein the rear portion comprises a rear aperture providing a pathway from the rear portion void to the exterior of the golf club head;

wherein the rear aperture comprises a diameter between 0.005 inch and 0.2 inch; and wherein the rear portion void is entirely enclosed within the rear portion, but for the rear aperture.

11. The golf club head of claim 10, wherein the rear aperture is filled in.

12. The golf club head of claim 11, wherein the rear aperture is filled via welding.

13. The golf club head of claim 10, wherein the rear aperture is circular.

14. The golf club head of claim 10, wherein the rear portion comprises a toe section, a heel section, and a center section;

wherein the rear portion void is formed in the center section of the rear portion.

15. A golf club head comprising:

a top rail, a sole, a heel, a toe, a faceplate located at a front end of the golf club head, a rear portion, and a hosel;

a ground plane tangent to the sole at an address position;

a rear cavity formed between the faceplate and the rear portion, wherein the rear cavity is exposed to an exterior of the golf club head;

the rear portion defines a rear portion void extending through the rear portion in a heel-to-toe direction;

wherein the rear portion separates the rear portion void from the rear cavity;

wherein the rear portion void is filled with a cell lattice structure;

the cell lattice structure comprises a plurality of cross ribs extending across the rear portion;

wherein the plurality of cross ribs extend parallel to one another in a diagonal direction;

a cross rib angle defined between one or more of the plurality of cross ribs and the ground plane;

wherein the cross rib angle is between 30 and 60 degrees; and wherein the plurality of cross ribs extends in a front-to-rear direction within the rear portion void and divides sections of the rear portion void to form a plurality of sub-voids.

16. The golf club head of claim 15, wherein one or more of the plurality of cross ribs extends in a high-heel to low-toe direction.

17. The golf club head of claim 15, wherein one or more of the plurality of cross ribs comprises a gap that allows passage between adjacent sub-voids.

18. The golf club head of claim 15, wherein the plurality of cross ribs comprise a cross rib thickness between 0.01 and 0.10 inch.

19. The golf club head of claim 15, wherein the cross rib angle is approximately 45 degrees.

* * * * *